(12) United States Patent
Matsunaga et al.

(10) Patent No.: US 6,724,491 B2
(45) Date of Patent: Apr. 20, 2004

(54) VISUAL DISPLACEMENT SENSOR

(75) Inventors: Tatsuya Matsunaga, Kyoto (JP); Masahiro Kawachi, Kyoto (JP)

(73) Assignee: Omron Corporation, Kyoto (JP)

( * ) Notice: Subject to any disclaimer, the term of this patent is extended or adjusted under 35 U.S.C. 154(b) by 61 days.

(21) Appl. No.: 09/937,480

(22) PCT Filed: Jan. 31, 2001

(86) PCT No.: PCT/JP01/00656
§ 371 (c)(1),
(2), (4) Date: Sep. 26, 2001

(87) PCT Pub. No.: WO01/57471
PCT Pub. Date: Aug. 9, 2001

(65) Prior Publication Data
US 2002/0154318 A1 Oct. 24, 2002

(30) Foreign Application Priority Data
Jan. 31, 2000 (JP) ..................................... 2000-027429
Nov. 19, 2000 (JP) ..................................... 2000-393787

(51) Int. Cl.$^7$ ............................................. G01B 11/14
(52) U.S. Cl. .................... 356/623; 250/559.38
(58) Field of Search ......................... 356/614–624, 356/3.01–3.09, 3.1–3.12; 250/559.38

(56) References Cited

U.S. PATENT DOCUMENTS 5,923,427 A * 7/1999 Dong .......................... 356/623
5,969,820 A * 10/1999 Yoshii et al. ................ 356/623
6,504,947 B1 * 1/2003 Nozaki et al. .............. 382/148

FOREIGN PATENT DOCUMENTS

| JP | 4-308976 | 10/1992 |
| JP | 5-15201 | 3/1993 |
| JP | 8-219721 | 8/1996 |

* cited by examiner

*Primary Examiner*—Richard A. Rosenberger
*Assistant Examiner*—Vincent P. Barth
(74) *Attorney, Agent, or Firm*—Foley & Lardner

(57) ABSTRACT

Provided is a visual displacement sensor which comprises a laser diode (112) for impinging a line beam onto an object to be measured at a prescribed angle, a two-dimensional CCD (122) for monitoring the object to be measured, on which the line beam is impinged, from a different angle, measurement object range defining means for defining one or more than one measurement object range (K11, K12) within a field of view of the two-dimensional CCD, measurement point coordinate determining means for determining one or more than one measurement point coordinate (A7) contained in the defined measurement object range according to an image captured by the two-dimensional CCD, and displacement measuring means for measuring a desired displacement according to the determined one or more than one measurement point coordinate.

65 Claims, 44 Drawing Sheets

A view showing the internal structure of the sensor head unit

An overall view of a visual displacement sensor

A view showing the internal structure of the sensor head unit

A block diagram (part 1)
showing the functional internal structure of the sensor main unit A view showing a mode of defining measurement object ranges A general flow chart schematically illustrating the operation of the displacement measurement by the sensor main unit A view illustrating an image captured by the CCD incorporated in the sensor head unit A view illustrating the process of
extracting measurement points in a measurement object range A view illustrating the relationship
between the line bright waveform and the image captured by the CCD An illustrative view showing the process of determining the threshold value An illustrative view showing the process of extracting the measuring point coordinate An illustrative view showing the process of generating the monitor display A view showing an exemplary monitor display showing the relationship between the image captured by the CCD and line bright waveform A view illustrating the characteristic computation for determining measurement point coordinates a view showing a conventional measurement result (a) selecting the number of ranges to be defined (b) defining measurement object range 0

A view illustrating the monitor screen when defining regions (part 1)

(a) defining measurement object range 0

(b) complete the defining of measurement object range 0
(acquire a relative reference position)

A view illustrating the monitor screen when defining regions (part 2)

A view illustrating the monitor screen when defining regions (part 3)

A view illustrating the monitor screen at the time
of measurement after two measurement object ranges are defined (a) measurement point coordinate extracted from the input image (b) measurement point coordinate extracted from the masked image A view illustrating the problem with the process
of extracting a measurement point coordinate using a masked image (a) provisional decision of measurement point coordinates (b) formal decision of measurement point coordinates A view illustrating the second embodiment of the process of extracting a measurement point coordinate using a masked image A block diagram (part 2)
showing the functional internal structure of the sensor main unit A view showing a mode of vertical changes in a measurement point A view showing the monitor screen
before and after the vertical change in the measurement point A view illustrating the positional relationship
between the sensor and measurement object when measuring a step A view showing the monitor screen for the measurement of a step (a) when the measurement object is at the reference position (b) when the measurement object has shifted laterally A view illustrating the problem associated with the lateral shifting of the measurement object when measuring a step A time chart showing the flow of the control process of tracking a lateral shift when measuring a step A view illustrating the process of composing a display for the image monitor (part 1)

A flow chart showing the calibration process for the computation of the thickness of a transparent member (part 1)

A flow chart showing the calibration process
for the computation of the thickness of a transparent member (part 2)

A flow chart showing the calibration process
for the computation of the thickness of a transparent member (part 3)

A view showing the monitor screen for the calibration operation for the computation of the thickness of a transparent member (part 1)

(a)

(b)

A view showing the monitor screen for the calibration operation
for the computation of the thickness of a transparent member (part 2)

(a)

(b)

(c)

A view showing the monitor screen for the calibration operation for the computation of the thickness of a transparent member (part 3)

A view showing the monitor screen for the calibration operation for the computation of the thickness of a transparent member (part 4)

(a)

(b)

A view showing the monitor screen for the calibration operation
for the computation of the thickness of a transparent member (part 5)

A view showing the monitor screen for the calibration operation for the computation of the thickness of a transparent member (part 6)

A view showing the algorithm for the calibration operation for the computation of the thickness of a transparent member

Fig.44

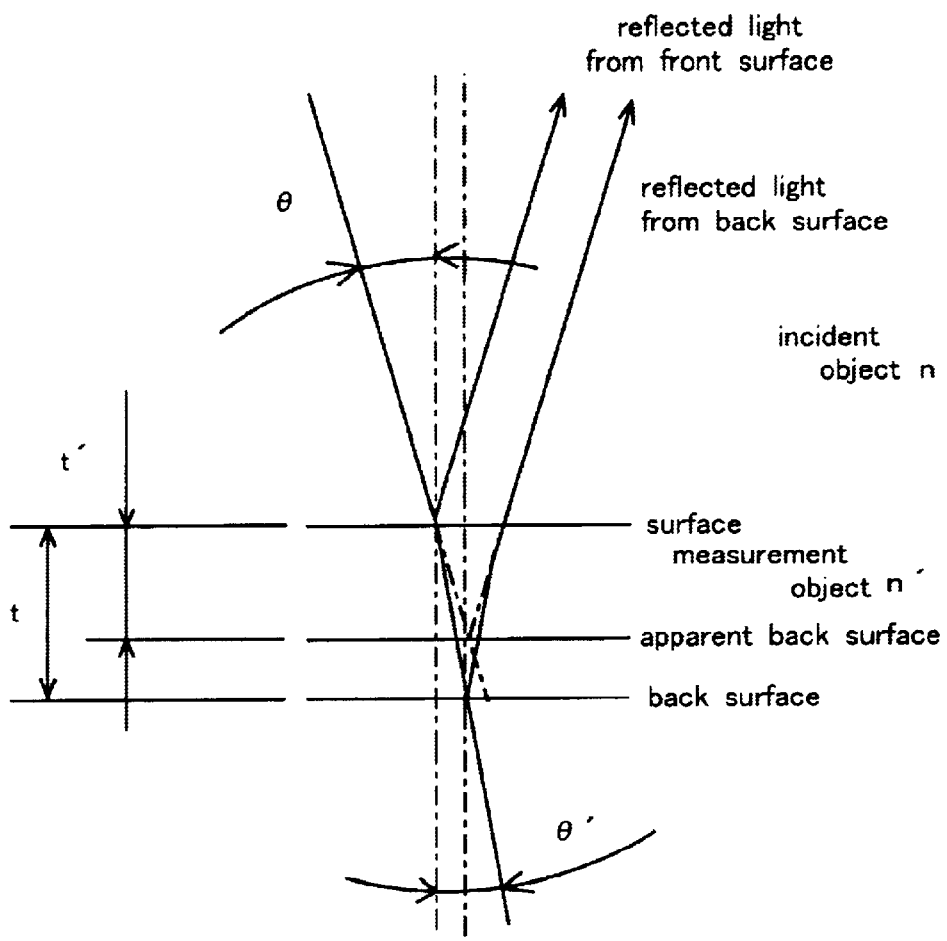

$$t = \frac{\tan \theta}{\tan(\sin^{-1}(\frac{n}{n'} \sin \theta))} t'$$

| t | : thickness of measurement object |
| t' | : sensor output value |
| θ | : sensor light beam incident angle |
| n | : refractive index of incident object (n=1 normally air) |
| n' | : refractive index of measurement object |

| refractive indices of typical transparent materials | |
|---|---|
| air : 1.002 | acrylic : 1.48~1.575 |
| glass : 1.48~1.55 | polycarbonate : 1.586 |
| water : 1.333 | |

A view illustrating the reason for requiring a calibration for the measurement of the thickness of a transparent member by using the visual displacement sensor

VISUAL DISPLACEMENT SENSOR

TECHNICAL FIELD

The present invention relates to a novel visual displacement sensor using a line beam for a measurement light and a two-dimensional imaging device for an imaging device, and in particular to a visual displacement sensor which can freely define the field of view of the imaging device serving as an object for extracting measurement point coordinates.

BACKGROUND OF THE INVENTION

The inventors of this application previously proposed a novel visual displacement sensor using a line beam for a measurement light and a two-dimensional imaging device for an imaging device.

According to such a visual line sensor, several advantages can be gained because a line beam is used as the measurement light, the displacement of a measurement object point can be measured as a line instead of a series of dots.

A visual displacement sensor of this type comprises, as essential elements, a light emitting device (such as a laser diode) for impinging a line beam onto an object to be measured at a prescribed angle, a two-dimensional imaging device (such as a two-dimensional CCD, for monitoring the object to be measured, on which the line beam is impinged, from a different angle, measurement point coordinate determining means for determining a measurement point coordinate according to a reflected line beam light image in an image captured by the two-dimensional imaging device, and displacement measuring means for measuring a desired displacement according to the determined measurement point coordinate.

If the measurement condition is ideal, the number of reflected line beam light image that appears in the, field of view of the two-dimensional imaging device should agree with the expected number. In other words, if the measurement object consists of an opaque member and has no steps on its surface, there should be only one reflected line beam light image in the field of view of the two-dimensional imaging device. When the measurement object consists of a transparent member such as a glass plate or when the measurement object consists of an opaque member but has a step or the like on its surface, the number of the reflected line beam light images that appear in the field of view of the two-dimensional imaging device should agree with the expected number which is determined by the number of laminated glass plates and/or the number of steps.

The displace measurement algorithm for measuring the desired displacement according to the determined measurement point coordinate can function properly and measure the desired displacement only when the sensor is placed under an expected measurement condition. In other words, if the number of reflected line beam light images in the field of view of the two-dimensional imaging device docs not agree with the expected number, the measurement of the desired displacement would run into a serious difficulty.

Also, the measurement point coordinate determining algorithm for determining a measurement point coordinate according to the reflected line beam light image in the image that is captured by a two-dimensional imaging device can function properly only when the sensor is placed under an expected measurement condition. In other words, if the gradation level of the reflected line beam light image does not fall in a prescribed range, the determination of the measurement point coordinate would run into a serious difficulty.

Therefore, according to a visual displacement sensor of this kind, if a spurious reflected line beam light image appears in the field of view of the two-dimensional imaging device due to an improper measurement condition, and the number of measurement point coordinates exceeds the expected number, the displacement measurement algorithm may fail to measure the desired displacement in a normal fashion.

Furthermore, according to a visual displacement sensor of this kind, if the measurement object consists of a transparent member having metallic film having a high reflectivity formed over the back surface thereof as is the case with a glass plate of a CRT or an LCD panel, because in spite of the automatic gradation adjustment function the gradation level for each and every one of the reflected line beam light image that appear in the field of view of the two-dimensional imaging device in a mutually spaced relationship in the direction of displacement measurement may fail to fall within a prescribed range, the measurement point coordinate determining algorithm incorporated in the sensor may fail to determine the measurement coordinates, and the desired displacement the measurement point coordinate may fail to be determined in a normal fashion as a result as far as those reflected line beam light image having gradation levels falling out of the prescribed range are concerned.

Additionally, according to a visual displacement sensor of this kind, when measuring a measurement object consisting of a step by impinging a line beam across the step, if there is a large difference in reflectivity between the upper and lower surfaces of the step, in spite of the operation of the automatic gradation adjustment function, it becomes impossible to contain the gradation level of the reflected line beam light image which appears in the field of view of the two-dimensional imaging device as two mutually separated lines in the direction perpendicular to the direction of displacement measurement within a prescribed range over the entire reflected line beam light image. Therefore, the part of the reflected line beam light image having a gradation level falling out of the prescribed range prevents the measurement point coordinate determining algorithm incorporated in the sensor from properly determining the measurement point coordinate, and the desired displacement fails to be measured in a normal fashion as a result.

The present invention was made in view of such problems of the visual displacement sensor using a line beam for a measurement light and a two-dimensional imaging device for a measurement imaging device, and its primary object is to provide a visual displacement sensor which can determine a measurement point coordinate by using a displacement measurement algorithm incorporated in the sensor so that a desired displacement may be put back into a measurable state by a simple supportive operation of the operator even when a spurious reflective line beam image appears within the field of view of the two-dimensional imaging device due to an improper measurement condition, and the number of measurement point coordinates exceeds an expected number.

Another object of the present invention is to provide a visual displacement sensor which can determine a measurement point coordinate by using a displacement measurement algorithm incorporated in the sensor so that a desired displacement may be put back into a measurable state by a simple supportive operation of the operator even with respect to the part of the reflected line beam light image having a gradation level falling out of the prescribed range when it has become impossible to contain the gradation level of the reflected line beam light image which appears in the field of view of the two-dimensional imaging device as two mutually separated lines in the direction of displacement measurement within a prescribed range over the entire reflected line beam light image, in spite of the operation of the automatic gradation adjustment function, in such a case as when the measurement object consists of a transparent plate having metallic film having a high reflectivity level formed over its back surface as is the case with the glass plate of a CRT or an LCD panel.

Yet another object of the present invention is to provide a visual displacement sensor which can determine a measurement point coordinate by using a displacement measurement algorithm incorporated in the sensor so that a desired displacement may be put back into a measurable state by a simple supportive operation of the operator even with respect to the part of the reflected line beam light image having a gradation level falling out of the prescribed range when it has become impossible to contain the gradation level of the reflected line beam light image which appears in the field of view of the two-dimensional imaging device as two mutually separated lines in the direction perpendicular to the direction of displacement measurement within a prescribed range over the entire reflected line beam light image in spite of the operation of the automatic gradation adjustment function, in such a case as when the measurement object consisting of a step is measured by impinging a line beam across the step and there is a large difference in reflectivity between the upper and lower surfaces of the step.

Yet another object of the present invention is to provide a visual displacement sensor which can continue to measure the thickness of a glass plate and the size of a step in a stable manner even when the position of the glass plate for thickness measurement changes in the direction of the thickness and the position of the measurement object for step size measurement moves in the direction of the length of the reflected image of the line beam that is impinged on the measurement object.

Yet another object of the present invention is to provide a visual displacement sensor which can notify the operator the cause in an accurate manner through guide display even when the measurement is rendered impossible due to various reasons such as the presence of external light, the difference in reflectivity between the front and back surfaces of a transparent member, and the difference in reflectivity between the upper and lower surfaces of a step.

Other objects of the advantages of the present invention will become apparent for a person skilled in the art from the following description.

BRIEF SUMMARY OF THE INVENTION

According to an aspect of the present invention, the visual displacement sensor of the present invention comprises a light emitting device for impinging a line beam onto an object to be measured at a prescribed angle, a two-dimensional imaging device for monitoring the object to be measured, on which the line beam is impinged, from a different angle, measurement object range defining means for defining one or more than one measurement object range within a field of view of the two-dimensional imaging device, measurement point coordinate determining means for determining one or more than one measurement point coordinate contained in the defined measurement object range according to an image captured by the two-dimensional imaging device, and displacement measuring means for measuring a desired displacement according to the determined one or more than one measurement point coordinate.

According to this structure, even when a spurious reflective line beam image appears within the field of view of the two-dimensional imaging device due to an improper measurement condition such as external light, and the number of measurement point coordinates exceeds an expected number, a desired displacement can be brought back into a measurable state by using a displacement measurement algorithm incorporated in the sensor simply by the operator defining a measurement object range so as to exclude the light image due to the external light.

The one or more than one measurement object range defined by the measurement object range defining means may be defined with respect to a direction of displace measurement in the field of view of the two-dimensional imaging device, a direction perpendicular to a direction of displace measurement in the field of view of the two-dimensional imaging device, or both a direction of displace measurement and a direction perpendicular to a direction of displace measurement in the field of view of the two-dimensional imaging device.

According to a preferred embodiment of the present invention, the measurement point coordinate determining means determines one or more than one measurement point according to an image extracted from the image captured by the two-dimensional imaging device by masking the area other than the defined one or more than one measurement object range.

According to a preferred embodiment of the present invention, the measurement point coordinate determining means provisionally determines one or more than one measurement point according to an entire image captured by the two-dimensional imaging device, and finally determines one or more than one measurement point by comparing the provisionally determined one or more than one measurement point with a counterpart in the defined one or more than one measurement object range.

According to a preferred embodiment of the present invention, the sensor additionally comprises monitor image editing means for displaying information on a state of the raw image captured by the two-dimensional imaging device on the image monitor screen. In this case, the information on a state of the raw image may comprise the raw image itself and/or a line bright waveform corresponding to the raw image.

According to a preferred embodiment of the present invention, the sensor additionally comprises monitor image editing means for displaying information on a state of the masked image extracted from the raw image captured by the two-dimensional imaging device by masking a part thereof other than the defined measurement object range on the image monitor screen. In this case, the information on a state of the masked image may comprise the masked image itself and/or a line bright waveform corresponding to the masked image.

According to a preferred embodiment of the present invention, the sensor additionally comprises monitor image editing means for displaying information corresponding to the measurement object range defined in the field of view of the two-dimensional imaging device on the image monitor screen. In this case, the information corresponding to the measurement object range may consist of a value indicating a boundary and/or boundary position of the measurement object range on the raw image or masked image.

According to a preferred embodiment of the present invention, the sensor additionally comprises monitor image editing means for displaying information corresponding to the measurement point coordinate determined in the field of view of the two-dimensional imaging device on the image monitor screen. In this case, the information corresponding to the measurement point coordinate may consist of a value indicating a measurement point coordinate position and/or measurement point coordinate on the raw image or masked image.

According to a preferred embodiment of the present invention, the sensor additionally comprises a graphical user interface (GUI) for enabling the defining, changing and canceling of the measurement object range in the field of view of the two-dimensional imaging device with an operation on the image monitor screen.

According to another aspect of the present invention, the visual displacement sensor of the present invention comprises a light emitting device for impinging a line beam onto an object to be measured at a prescribed angle, a two-dimensional imaging device for monitoring the object to be measured on which the line beam is impinged from a different angle, measurement object range defining means for defining more than one measurement object range having a designated position and length in the direction of displacement measurement within a field of view of the two-dimensional imaging device, measurement point coordinate determining means having a gradation adjusting function for determining one or more than one measurement point coordinate contained in the defined measurement object range according to an image captured by the two-dimensional imaging device and adjusting at least one line beam light image gradation if the corresponding measurement object range contains one or more line beam light image, and displacement measuring means for measuring a desired displacement according to the determined one or more than one measurement point coordinate.

According to this structure, even when it has become impossible to contain the gradation level of the reflected line beam light image which appears in the field of view of the two-dimensional imaging device as two mutually separated lines in the direction of displacement measurement within a prescribed range over the entire reflected line beam light image, in spite of the operation of the automatic gradation adjustment function, in such a case as when the measurement object consists of a transparent plate having metallic film having a high reflectivity level formed over its back surface as is the case with the glass plate of a CRT or an LCD panel, simply by the operator defining measurement object ranges independently for the individual reflected line beam light images, the measurement point coordinate can be determined even with respect to the part of the reflected line beam light image having a gradation level falling out of the prescribed range by using a displacement measurement algorithm incorporated in the sensor, and a desired displacement can be brought back into a measurable state as a result.

According to a preferred embodiment of the present invention, the sensor further comprises a range automatic tracking means for tracking a change in a measurement displacement with respect to a reference surface of a measurement object and moving at least one measurement object range in a direction of displacement measurement direction.

According to yet another aspect of the present invention, the visual displacement sensor of the present invention comprises a light emitting device for impinging a line beam onto an object to be measured at a prescribed angle, a two-dimensional imaging device for monitoring the object to be measured on which the line beam is impinged from a different angle, measurement object range defining means for defining more than one measurement object range having a designated position and length in a direction perpendicular to the direction of displacement measurement within a field of view of the two-dimensional imaging device, measurement point coordinate determining means having a gradation adjusting function for determining one or more than one measurement point coordinate contained in the defined measurement object range according to an image captured by the two-dimensional imaging device and adjusting at least one line beam light image gradation if the corresponding measurement object range contains one or more line beam light image, and displacement measuring means for measuring a desired displacement according to the determined one or more than one measurement point coordinate.

According to this structure, even when it has become impossible to contain the gradation level of the reflected line beam light image which appears in the field of view of the two-dimensional imaging device as two mutually separated lines in the direction perpendicular to the direction of displacement measurement within a prescribed range over the entire reflected line beam light image, in spite of the operation of the automatic gradation adjustment function, in such a case as when the measurement object consisting of a step is measured by impinging a line beam across the step and there is a large difference in reflectivity between the upper and lower surfaces of the step, simply by the operator defining measurement object ranges separately for the upper and lower surfaces of the step, the measurement point coordinate can be determined even with respect to the part of the reflected line beam light image having a gradation level falling out of the prescribed range by using a displacement measurement algorithm incorporated in the sensor, and a desired displacement can be brought back into a measurable state as a result.

According to yet another aspect of the present invention, the visual displacement sensor of the present invention comprises a light emitting device for impinging a line beam onto an object to be measured at a prescribed angle, a two-dimensional imaging device for monitoring the object to be measured on which the line beam is impinged from a different angle, measurement object range defining means for defining more than one measurement object range having a designated position and length in both the direction of displacement measurement and a direction perpendicular to the direction of displacement measurement with a two-dimensional expanse within a field of view of the two-dimensional imaging device, measurement point coordinate determining means having a gradation adjusting function for determining one or more than one measurement point coordinate by taking into account the defined measurement object range according to an image captured by the two-dimensional imaging device and adjusting the gradation of each line beam light image, and displacement measuring means for measuring a desired displacement according to the determined one or more than one measurement point coordinate.

According to this structure, even when it has become impossible to contain the gradation level of the reflected line beam light image which appears in the field of view of the two-dimensional imaging device as two mutually separated lines in the direction of displacement measurement within a prescribed range over the entire reflected line beam light image, in spite of the operation of the automatic gradation adjustment function, in such a case as when the measurement object consists of a transparent plate having metallic film having a high reflectivity level formed over its back surface as is the case with the glass plate of a CRT or an LCD panel, simply by the operator defining measurement object ranges independently for the individual reflected line beam light images, the measurement point coordinate can be determined even with respect to the part of the reflected line beam light image having a gradation level falling out of the prescribed range by using a displacement measurement algorithm incorporated in the sensor, and a desired displacement can be brought back into a measurable state as a result. Additionally, according to this structure, even when it has become impossible to contain the gradation level of the reflected line beam light image which appears in the field of view of the two-dimensional imaging device as two mutually separated lines in the direction perpendicular to the direction of displacement measurement within a prescribed range over the entire reflected line beam light image, in spite of the operation of the automatic gradation adjustment function, in such a case as when the measurement object consisting of a step is measured by impinging a line beam across the step and there is a large difference in reflectivity between the upper and lower surfaces of the step, simply by the operator defining measurement object ranges separately for the upper and lower surfaces of the step, the measurement point coordinate can be determined even with respect to the part of the reflected line beam light image having a gradation level falling out of the prescribed range by using a displacement measurement algorithm incorporated in the sensor, and a desired displacement can be brought back into a measurable state as a result.

According to yet another aspect of the present invention, the visual displacement sensor of the present invention comprises a light emitting device for impinging a line beam onto an object to be measured at a prescribed angle, a two-dimensional imaging device for monitoring the object to be measured, on which the line beam is impinged, from a different angle, measurement object range defining means for defining one or more than one measurement object range within a field of view of the two-dimensional imaging device, measurement point coordinate determining means for determining one or more than one measurement point coordinate contained in the defined measurement object range according to an image captured by the two-dimensional imaging device, displacement measuring means for measuring a desired displacement according to the determined one or more than one measurement point coordinate, and defined range moving means for moving at least one of the one or more than one measurement object range that are defined according to information derived from an image captured by the two-dimensional imaging device.

According to a preferred embodiment of the present invention, when it its determined that the reference surface has moved according to the image captured by the two-dimensional imaging device, the defined range moving means moves the measurement object range corresponding to a surface forming a pair with the reference surface in the direction of displacement measurement following the movement of the reference surface.

According to a preferred embodiment of the present invention, the determination that the reference surface has moved is made in response to a change in the displacement measured by using the measurement object range defined in advance according to the reference surface.

According to a preferred embodiment of the present invention, when it its determined that a boundary line of a step on the measurement object has moved according to the image captured by the two-dimensional imaging device, the defined range moving means moves a pair of measurement object ranges defined on either side of the step boundary line in a direction perpendicular to the direction of displacement measurement following the movement of the step boundary line.

According to a preferred embodiment of the present invention, the determination that the step boundary line has moved is made in response to a movement of an intersection between the measured displacement along the length of the line beam and a prescribed displacement threshold value in a direction perpendicular to the direction of displacement measurement.

In this case, the prescribed displacement threshold value may be defined so as to follow the measured value of the reference step surface forming the step.

According to yet another aspect of the present invention, the visual displacement sensor of the present invention comprises test measurement means for measuring a thickness of a transparent member having a known thickness as a test, thickness teaching means for teaching the thickness of the transparent member, and computational calibration means for calibrating an arithmetic equation for computing the thickness of the transparent member according to the thickness measured as a test and the taught thickness.

According to a preferred embodiment of the present invention, the sensor further comprises monitor image editing means for displaying operation guide information required for measuring the thickness as a test or for teaching the thickness on an image monitor screen in an interactive manner.

According to this structure, the calibration for the measurement of the thickness of a transparent member by using a displacement sensor of this kind can be substantially simplified for the user.

BRIEF DESCRIPTION OF THE DRAWINGS

Now the present invention is described in the following with reference to the appended drawings, in which:

FIG. 44 is a view illustrating the reason for requiring a calibration for the measurement of the thickness of a transparent member by using the visual displacement sensor.

DETAILED DESCRIPTION OF THE PREFERRED EMBODIMENTS

A preferred embodiment of the visual displacement sensor of the present invention is now described in the following with reference to the appended drawings.

Figure 1:
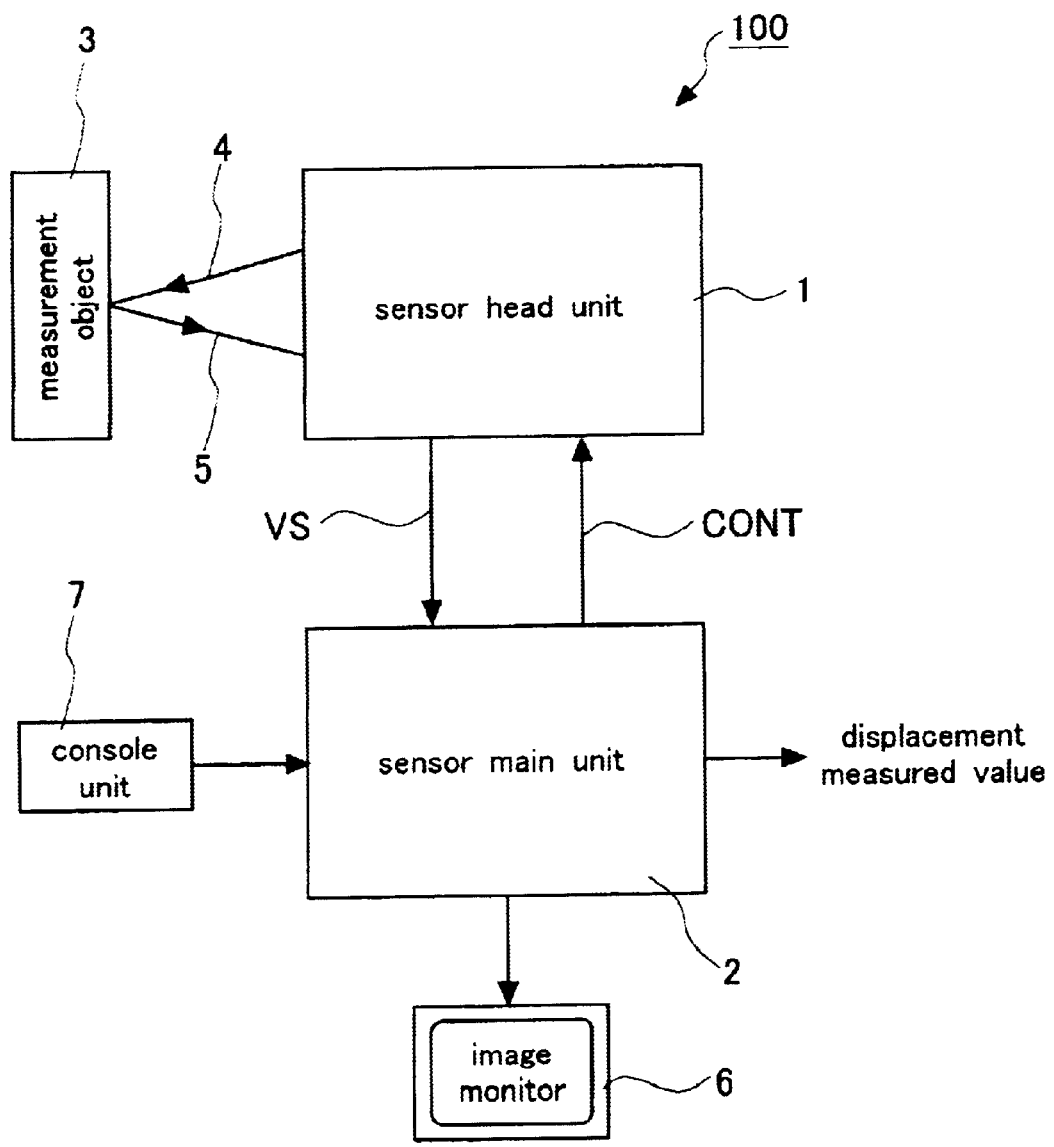
FIG. 1 is an overall view of a visual displacement sensor.

FIG. 1 is a block diagram showing the overall electric structure of a concrete embodiment of the visual displacement sensor of the present invention. As shown in the drawing, this visual displacement sensor 100 comprises a sensor head unit 1, a sensor main unit 2, an image monitor 6 and a console unit 7.

The sensor head unit 1 impinges a line beam serving as a measurement light on the surface of a measurement object 3 and captures the image of the surface of the measurement object 3 with a two-dimensional imaging device so as to generate a video signal VS of the surface of the measurement object including the reflected line beam light image. The light emitting and receiving system may be either a regular reflective system or a diffusive reflective system.

In the drawing, numeral 4 denotes an incident light image of the line beam (light beam having a linear cross section), numeral 5 denotes a reflected light image of the line beam, and VS denotes a video signal. The sensor main unit 2 measures the desired displacement (such as a travel and dimension) from the position of the line beam light image in the image captured by the sensor head unit 1 according to a prescribed distance measurement principle (such as triangulation), and produces a measured value of the displacement.

Figure 2:
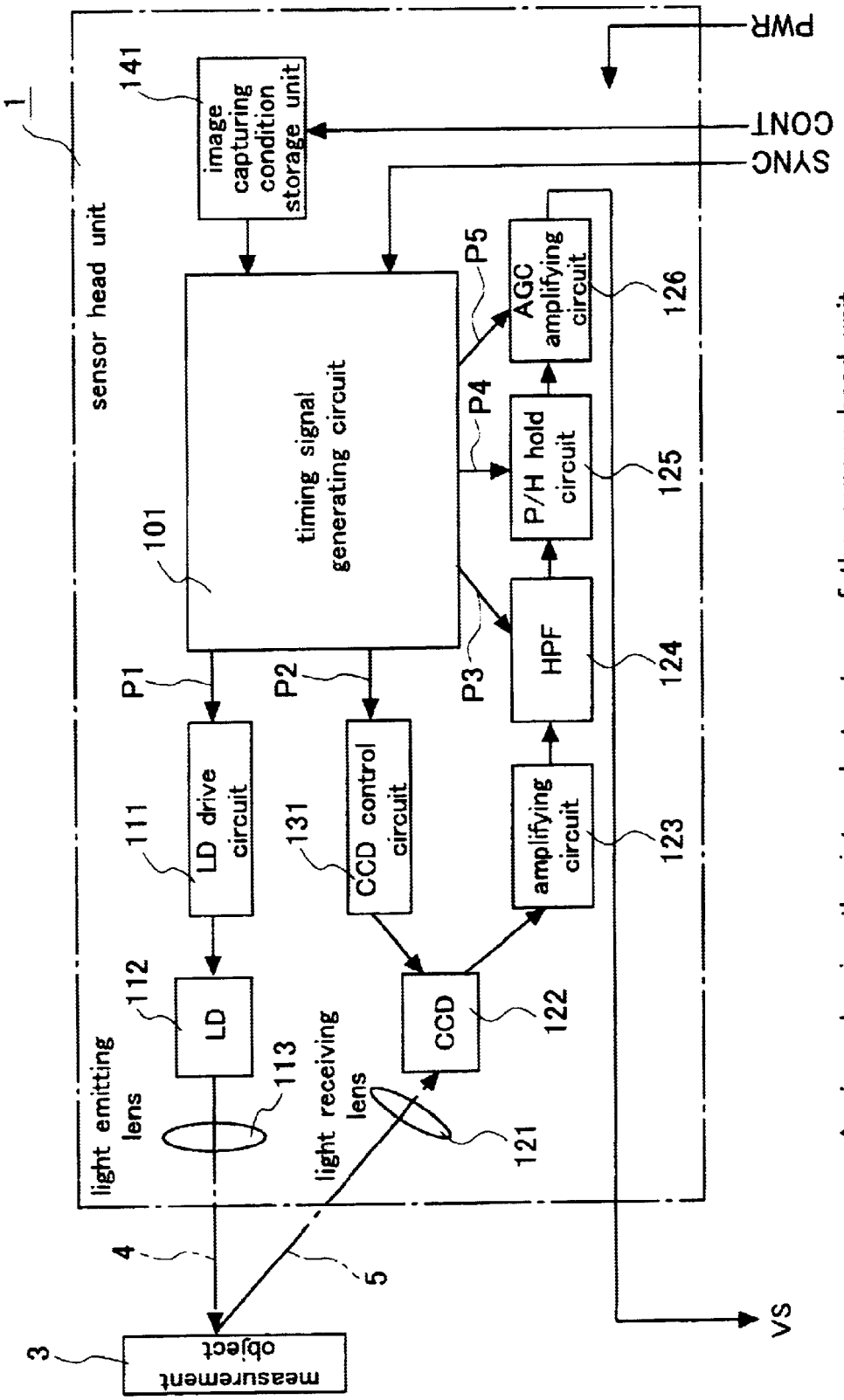
FIG. 2 is a view showing the internal structure of the sensor head unit.

The detailed internal structure of the sensor head unit 1 is shown in FIG. 2. As shown in the drawing, the sensor head unit 1 is incorporated with a light emitting system (an LD drive circuit 111, LD 112 and light emitting lens 113), a light receiving system (a light receiving lens 121, CCD 122, amplifying circuit 123, HPF 124, P/H circuit 125 and AGC amplifying circuit 126).

The light emitting system is described in the following. A timing signal generating circuit 101 generates an LD drive pulse signal P1 to activate a laser diode (LD hereinafter) 121. In response to the LD drive pulse signal P1, the LD drive circuit 111 causes the LD 121 to emit light intermittently. The timing signal generating circuit 101 controls the peak power of the pulsed laser light via the ID drive circuit 111. The pulsed light emitting from the LD 112 is impinged upon the surface of the measurement object 3 as a measurement light (incident light 4) via the light emitting lens 113. As a result, a linear light image (line beam light image) is formed on the surface of the measurement object 3 by the impingement of the measurement light.

The light receiving system is described in the following. The line beam (reflected light 5) reflected by the measurement object 3 is received by a CCD two-dimensional image sensor (CCD hereinafter) 122 serving as an imaging device via the light receiving lens 121. In other words, the image of the surface of the measurement object 3 is captured by the CCD 122 from a different angle, and is converted into a video signal containing the reflected light image of the line beam.

The LD 112, CCD 122, light emitting lens 113 and light receiving lens 121 are positioned relative to one another in such a manner that the line beam light image on the light receiving surface of the CCD 122 changes in response to the desired displacement (such as the distance between the sensor head unit 1 and measurement object 3). The positional relationship can be determined, for instance, according to the light section method based on triangulation.

The video signal produced from the CCD 122 is amplified by the amplifying circuit 123 for each pixel, and the drift in the zero level signal among the pixels is removed by the high pass filter (HPF) 124 and peak hold (P/H) circuit 125 so that each pixel signal represents a correct intensity of the received light. Then, the signal level is appropriately controlled by the AGC amplifying circuit 126, and is forwarded to the sensor main unit 2 as a video signal VS.

The drive mode of the CCD 122 including the shutter speed is controlled by the pulse signal P2 forwarded from the timing signal generating circuit 101 via a CCD control circuit 131. Similarly, the pulse signals P3 to P5 control the filter timing of the high pass filter (HPF) 124, the peak hold timing of the peak hold circuit (P/H) 125, and the gain and switching timing of the AGC amplifying circuit 126.

A measurement condition storage unit 141 stores a plurality of patterns of measurement conditions which include the CCD shutter time, LD light emitting time, LD peak power and AGC amplifying circuit gain, and an optimum measurement condition is selected by a received light control signal CONT forwarded from the sensor main unit 2.

The image monitor is used for displaying the measurement result, operation guide, reflected line beam light image, line bright waveform, measurement object range profile, raw image captured by the CCD and so on, and may consist of a CRT, LCD panel or the like. The console unit 7 is provided with keys for executing various operations with the aid of the GUI, and forwarding various commands to the sensor main unit 2.

Figure 3:
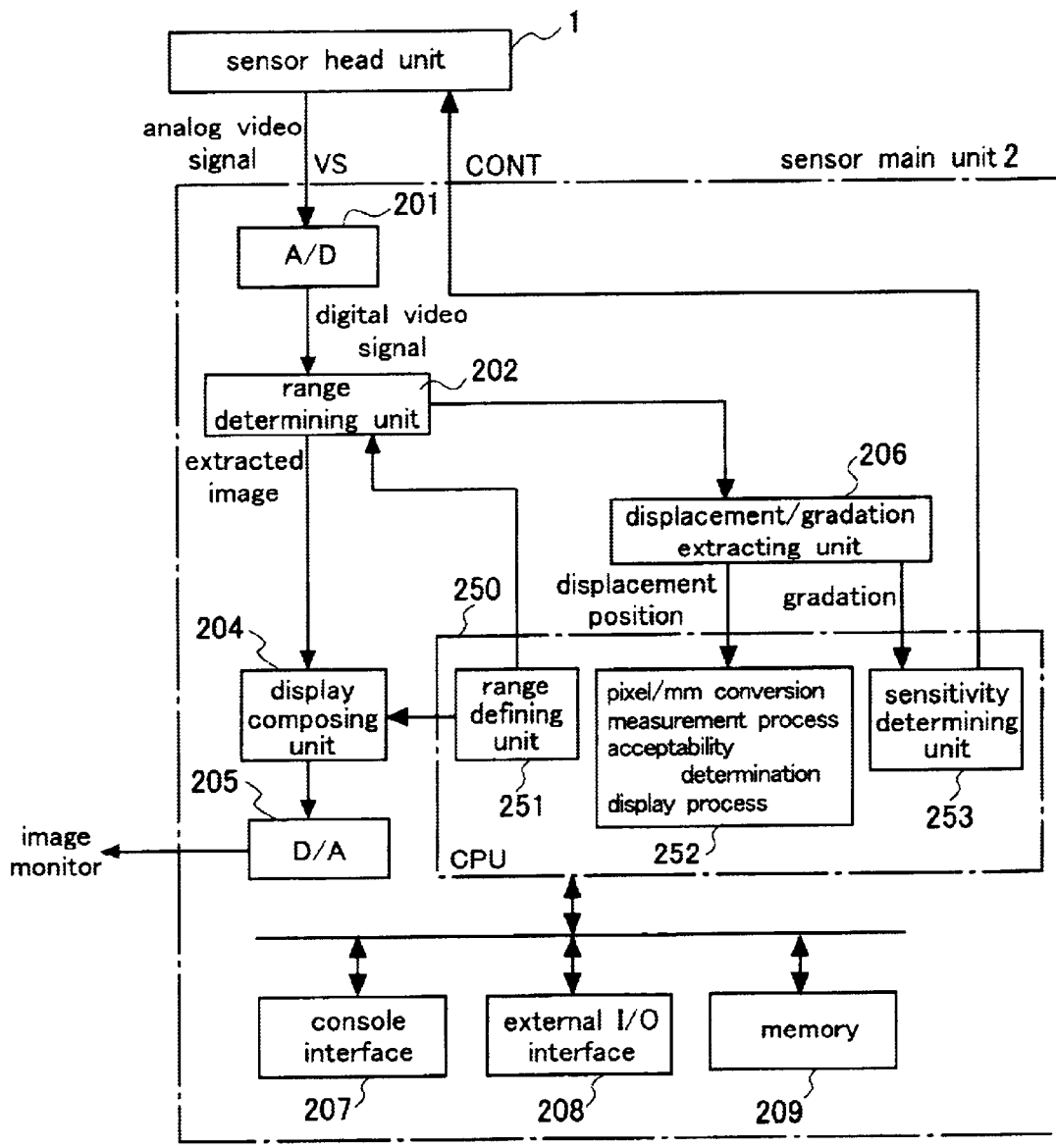
FIG. 3 is a block diagram (part 1) showing the functional internal structure of the sensor main unit.

FIG. 3 shows a simplified block diagram (part 1) of the internal structure of the sensor main unit 2. As shown in this drawing, the sensor main unit 2 (first embodiment) comprises an A/D converter 201, a range determining unit 202, image memory 203, display composing unit 204, a D/A converter 205, a displacement/gradation extracting unit 206, a console interface 207, an external I/O interface 208, memory 209 and a CPU 250.

The CPU 250 essentially consists of a microprocessor, and, in this embodiment, achieves three functions with the aid of software. One of them consists of a range defining unit 251 which defines a measurement object range within the field of view Z of the two-dimensional CCD forming the sensor head unit 1 in response to a prescribed operation of the console unit 7. The measurement object range is a part of the entire image captured by the two-dimensional CCD that is going to be the object of measurement. The measurement object range defined by the range defining unit 251 is notified to the range determining unit 202 which uses it as a reference for the range determining process. The range defining unit 251 is adapted to define the measurement object range having an arbitrary expanse in each of the X and Y directions of the two-dimensional CCD. In other words, according to the displacement sensor using a two-dimensional CCD of this kind, a measurement direction X is defined along the long side of the rectangular field of view Z of the two-dimensional CCD and the line beam light image is assigned to a perpendicular direction Y so that the height or displacement along the direction of the length of the line beam can also be measured. In the range defining process, the measurement direction can be defined not only in the direction of the long side of the rectangular region but also in the direction perpendicular thereto. Additionally, one or more than one measurement object range can be defined so that a desired number of regions each having a desired size can be defined in the entire pixel region in a discrete manner.

Various modes of defining measurement object ranges are shown in FIGS. 4(a) to 4(h). Z denotes the field of view (or light receiving surface) of the CCD 122 serving as a two-dimensional imaging device, X denotes the direction of displacement measurement, and Y denotes a direction perpendicular to the direction of displacement measurement (also referred to as "line direction" because it coincides with the lengthwise direction of the reflected line beam light image).

K1 shown in FIG. 4(a) consists of a single measurement object range having a position and length defined in the direction of displacement measurement X, and K2 shown in FIG. 4(b) consists of a single measurement object range having a position and length defined in the line direction Y.

K11 and K12 shown in FIG. 4(c) consist of a pair of measurement object ranges each having a position and length defined in the direction of displacement measurement X, and K21 and K22 shown in FIG. 4(d) consist of a pair of measurement object ranges each having a position and length defined in the line direction Y.

K111 and K121 shown in FIG. 4(e) consist of a pair of measurement object ranges each having a position and length defined in both the displacement measurement direction X and the line direction Y. In this example, the position and length in the line direction Y is common to both K111 and K121.

K211 and K221 shown in FIG. 4(f) consist of a pair of measurement object ranges each having a position and length defined in both the displacement measurement direction X and the line direction Y. In this example, the position and length in the displacement measurement direction X is common to both K211 and K221.

K01 and K02 shown in FIG. 4(g) consist of a pair of measurement object ranges each having a position and length defined in both the displacement measurement direction X and the line direction Y. In this example, the position and length in the displacement measurement direction X and the line direction Y are both different between K211 and K221.

K001, K002 and K003 shown in FIG. 4(h) consist of three measurement object ranges each having a position and length defined in both the displacement measurement direction X and the line direction Y.

In defining measurement object ranges shown in FIGS. 4(a) to 4(h), the definition in the displacement measurement direction X may be defected by the pixel number of the CCD, and the definition in the line direction Y may be effected by the horizontal scan line number of the CCD.

The range determining unit 202 selectively gates the digital video signal forwarded from the sensor head unit 1 via the A/D converter 201 in response to the range defined by the range defining unit 251. In other words, if one or more than one measurement object range is defined, an extracted image is generated by passing the digital video signal according to the timing determined by the measurement object range and extracting the pixel trains corresponding to the measurement object range. The extracted image thus obtained is forwarded to the display composing unit 204.

The extracted image forwarded from the range determining unit 202 is combined with a graphic diagram indicating the boundary of the measurement object range forwarded from the range defining unit 251 in the display composing unit 204, and the obtained composite image is forwarded to an image monitor 6 via the D/A converter 205 to be displayed on the image monitor screen not shown in the drawing along with the raw image data that was captured by the two-dimensional CCD 122 and subjected to the masking process in the range determining unit 202 and the line bright waveform indicating the gradation distribution (brightness distribution) for each display line. The display mode is described in more detail hereinafter with reference to sample monitor displays.

The image data extracted by the range determination unit 202 is also forwarded to the displacement/gradation extracting unit 206. The displacement/gradation extracting unit 206 obtains a displacement position (pixel coordinate indicating the measurement point) and gradation according to the extracted image obtained from the range determination unit 202, and supplies them to a computing unit 252 of the CPU 250. The computing unit 252 is also provided with various arithmetic computing functions such as pixel/mm conversion for converting each pixel to a coordinate corresponding displacement (mm), measurement process computation for performing various standard arithmetic operations (average value computation, maximum value computation, minimum value computation and step size computation, etc.), acceptability determination for determining the acceptability of each product according to the measured value, and display process computation for editing the display data for the image monitor.

The displacement position and gradation data supplied from the displacement/gradation extracting unit 206 is used for such computations. More specifically, in the pixel/mm conversion unit, the actual displacement is given in mm from the displacement position and gradation. The measurement process computing unit gives various measurement values such as maximum, minimum and peak hold values through corresponding predetermined measurement computing processes according to the one or more than one displacement that was obtained.

The acceptability determining unit determines the acceptability of each product to be tested by comparing the displacement and other measured values obtained in the foregoing processes with predetermined reference tolerance values. Additionally, the display processing unit edits the measurement results, displacement, acceptability result into image data for display, and forwards it to the image monitor via the display composing unit 204 and D/A converter 205.

The gradation data (such as the gradation of the reflected line beam line image of a particular horizontal scan line) obtained by the displacement/gradation extracting unit 206 is forwarded to a sensitivity determining unit 253 for sensitivity determination computation and is converted into the received light control data CONT for the sensor head unit 1 according to the thus obtained sensitivity data. The received light of the sensor head unit 1 is controlled by the received light control data CONT.

The mode of operation of the sensor main unit 2 of the displacement sensor described above is now described in the following with reference to FIGS. 5 to 12.

Figure 4:
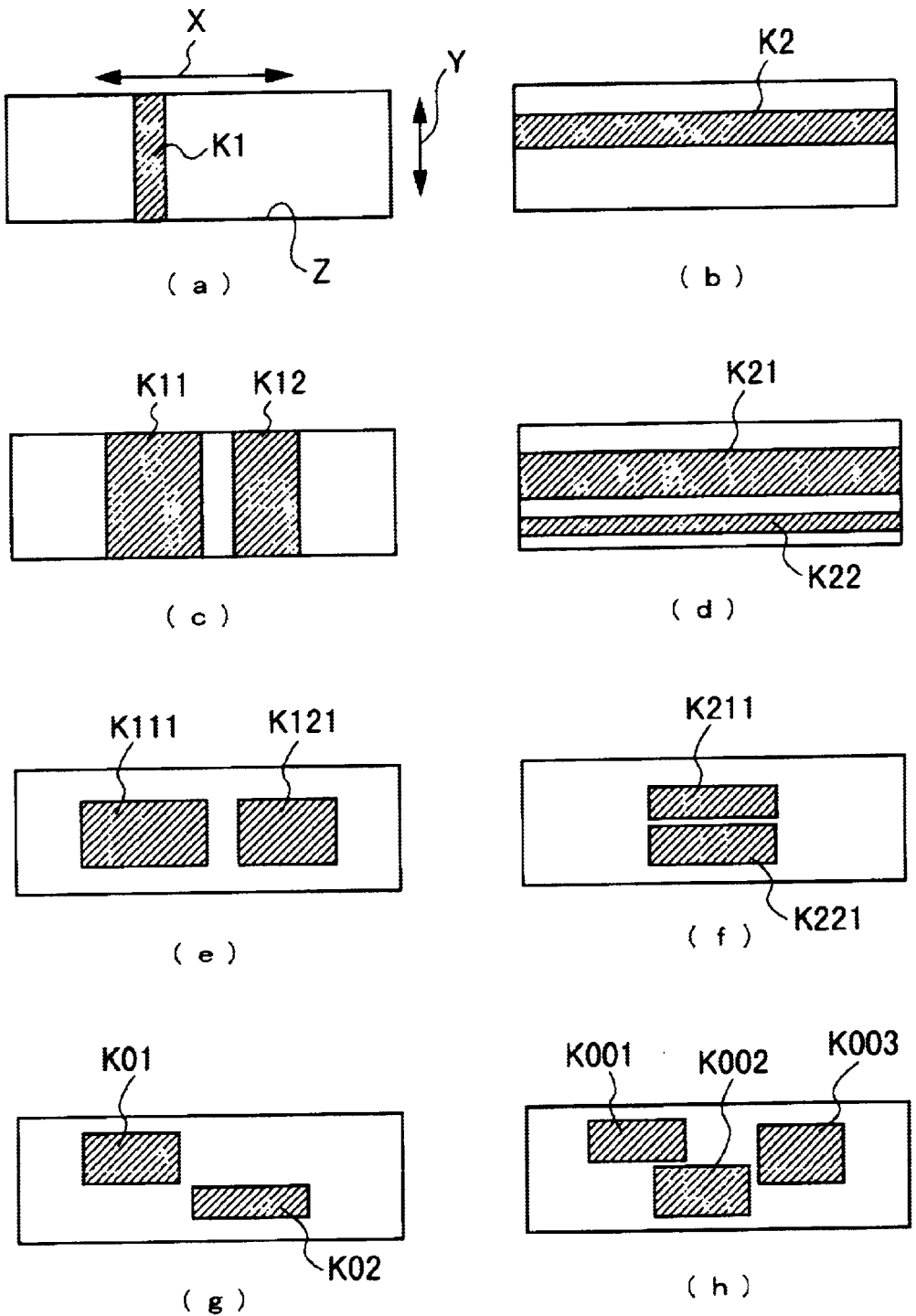
FIG. 4 is a view showing a mode of defining measurement object ranges.
Figure 5:
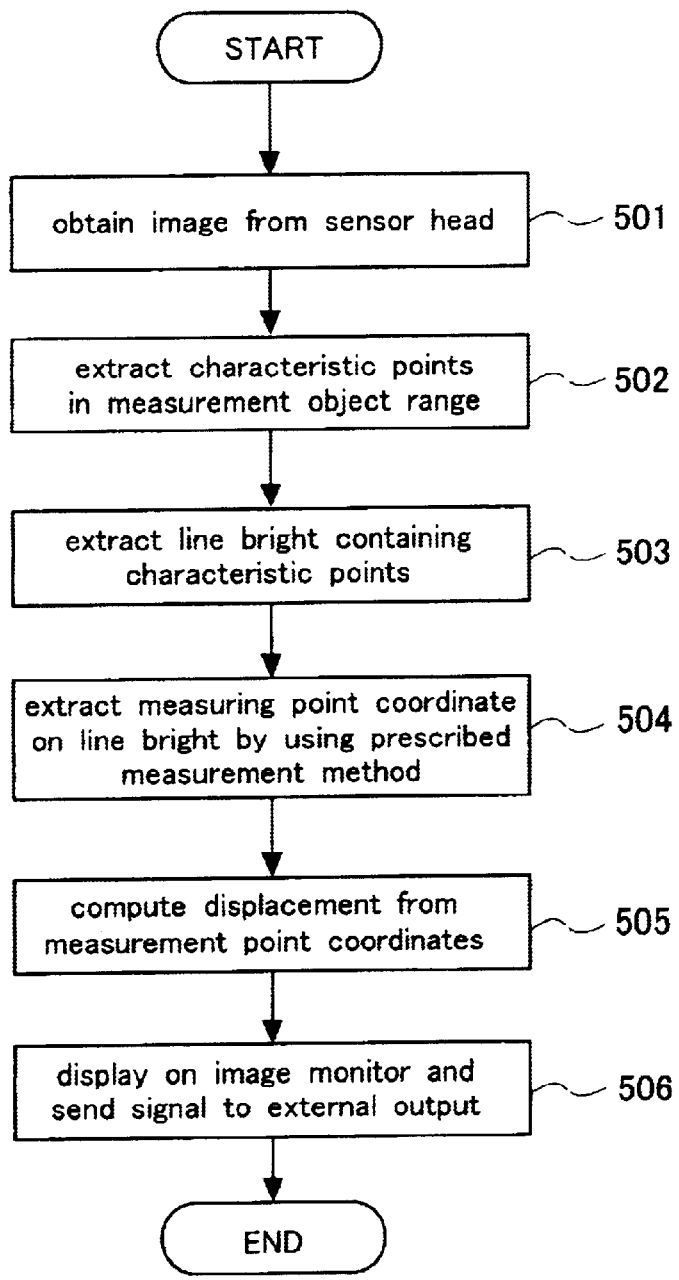
FIG. 5 is a general flow chart schematically illustrating the operation of the displacement measurement by the sensor main unit.

The general flow chart of FIG. 4 illustrates the mode of displacement measuring operation of the sensor main unit 2. Referring to this drawing, in the first step, the image obtained by the CCD 122 in the sensor head unit 1 is fed to the sensor main unit 2 (step 501).

Figure 6:
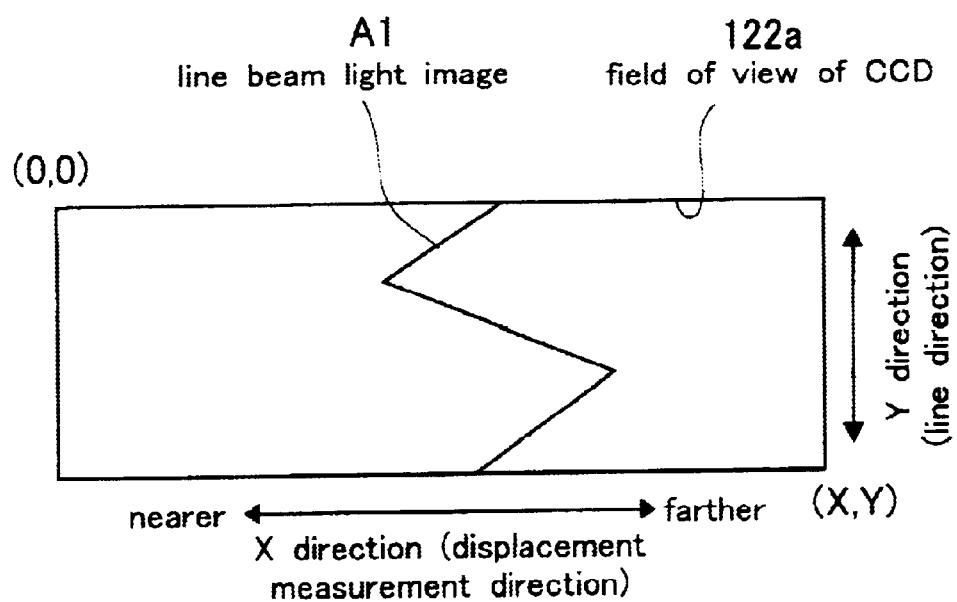
FIG. 6 is a view illustrating an image captured by the CCD incorporated in the sensor head unit.

The image obtained by the CCD 122 in the sensor head unit 1 is illustrated in FIG. 6. As shown in the drawing, the CCD incorporated in the sensor head unit 1 has a field of view 122a in the shape of an elongated rectangle. The X direction extending along the long side of this field of view 122a corresponds to the displacement measurement direction, and the Y direction extending along the short side corresponds to the line direction. The field of view 122a of the sensor includes a reflected line beam light image A1 in a zigzag shape (due to the irregularities in the surface of the measurement object). With respect to the displacement measurement direction, the left side in the drawing corresponds to the direction nearer to the sensor head and the right side corresponds to the direction farther from the sensor head.

Figure 7:
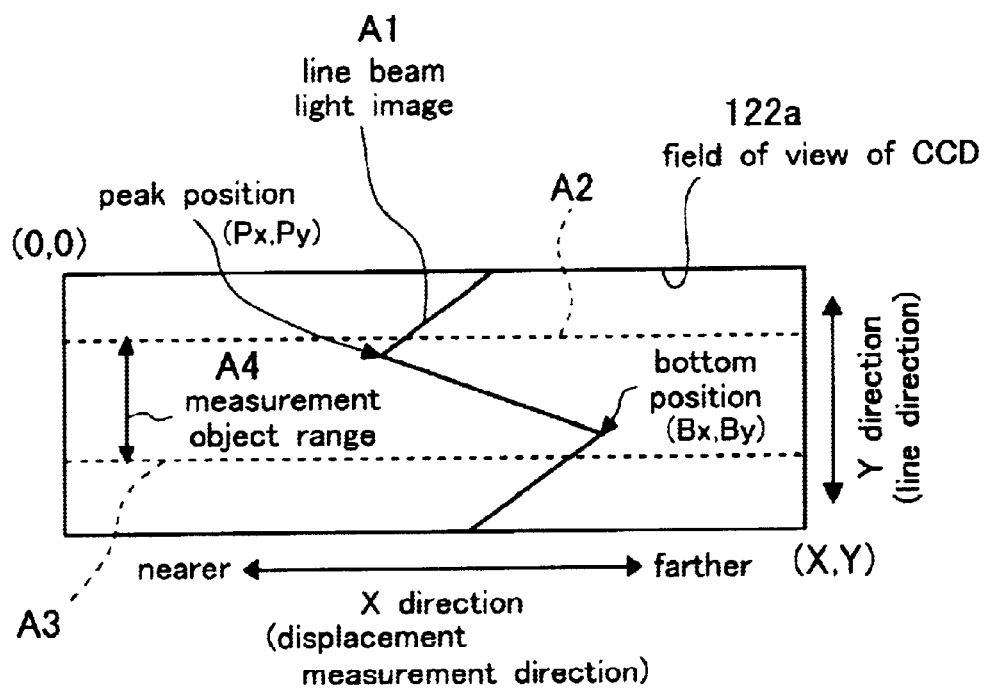
FIG. 7 is a view illustrating the process of extracting measurement points in a measurement object range.

Referring to FIG. 5 once again, characteristic points in the range of measurement are extracted (step 502). The process of extracting measurement points in the measurement object range is illustrated in FIG. 7. As shown in the drawing, a measurement object range A4 is indicated in the field of view 122a of the sensor by a pair of dotted lines A2 and A3 which extend laterally across the field of view 122a in parallel to each other. In this process of extracting characteristic points, by using a prescribed algorithm for extracting characteristic points from this measurement object range A4, a peak position (Px, Py) and a bottom position (Bx, By) are extracted. As discussed later, the start point A4 and the end point A5 defining the measurement object range A4 are designated by the user operating the console unit 7 with the aid of the GUI (graphical user interface).

Figure 8:
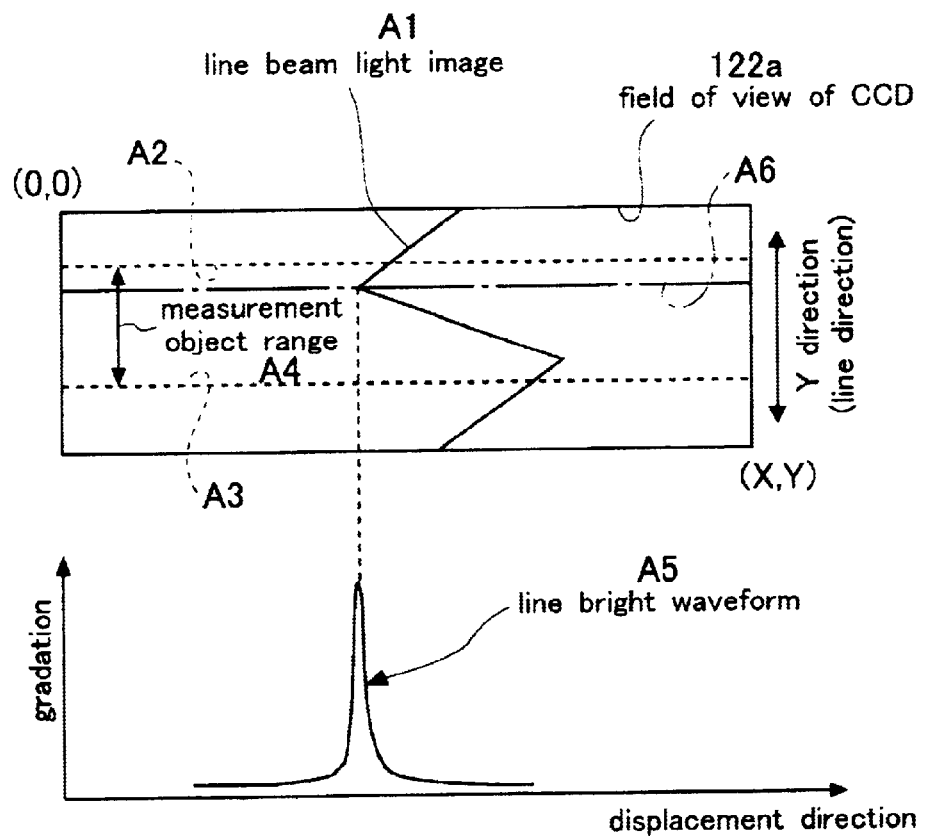
FIG. 8 is a view illustrating the relationship between the line bright waveform and the image captured by the CCD.

Referring to FIG. 5 again, the line bright waveform of the horizontal scan line containing each characteristic point is extracted in the following step (step 503). The relationship between the image obtained by the CCD and the line bright waveform is illustrated in FIG. 8. As shown in this drawing, during the process of extracting the line bright waveform, the brightness of the received light for each pixel on the horizontal scan line A6 containing the peak position is extracted as indicated by the chain dot line, and the line bright waveform AS shown in the drawing is generated by arranging the received light brightness for each pixel along the direction of displacement measurement. As shown in FIG. 8, this line brightness waveform AS is shown in the orthogonal coordinate system having the displacement on the abscissa axis and the gradation on the ordinate axis.

Figure 9:
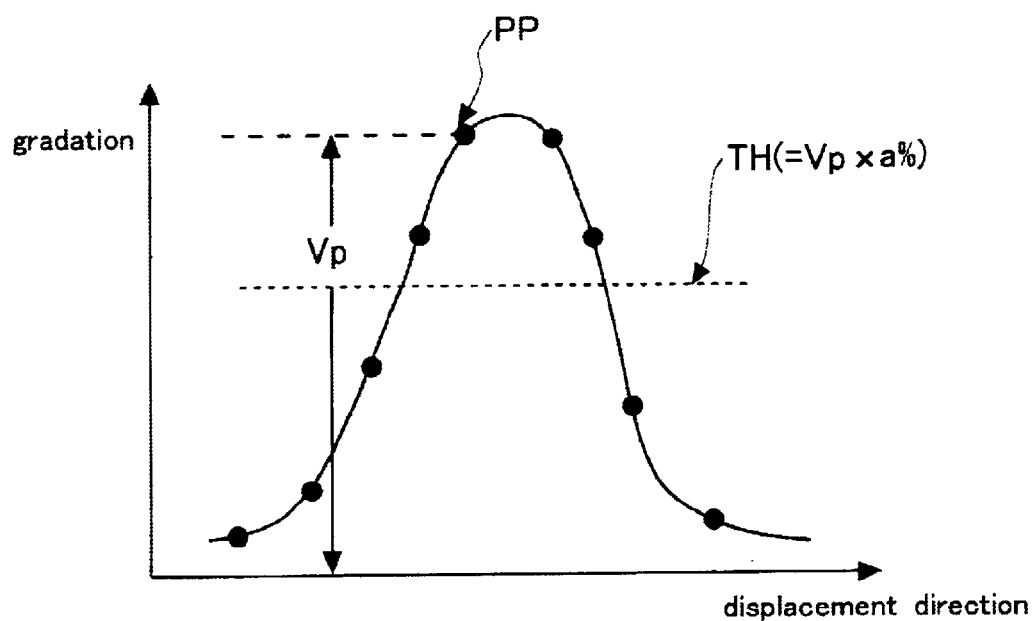
FIG. 9 is an illustrative view showing the process of determining the threshold value.
Figure 10:
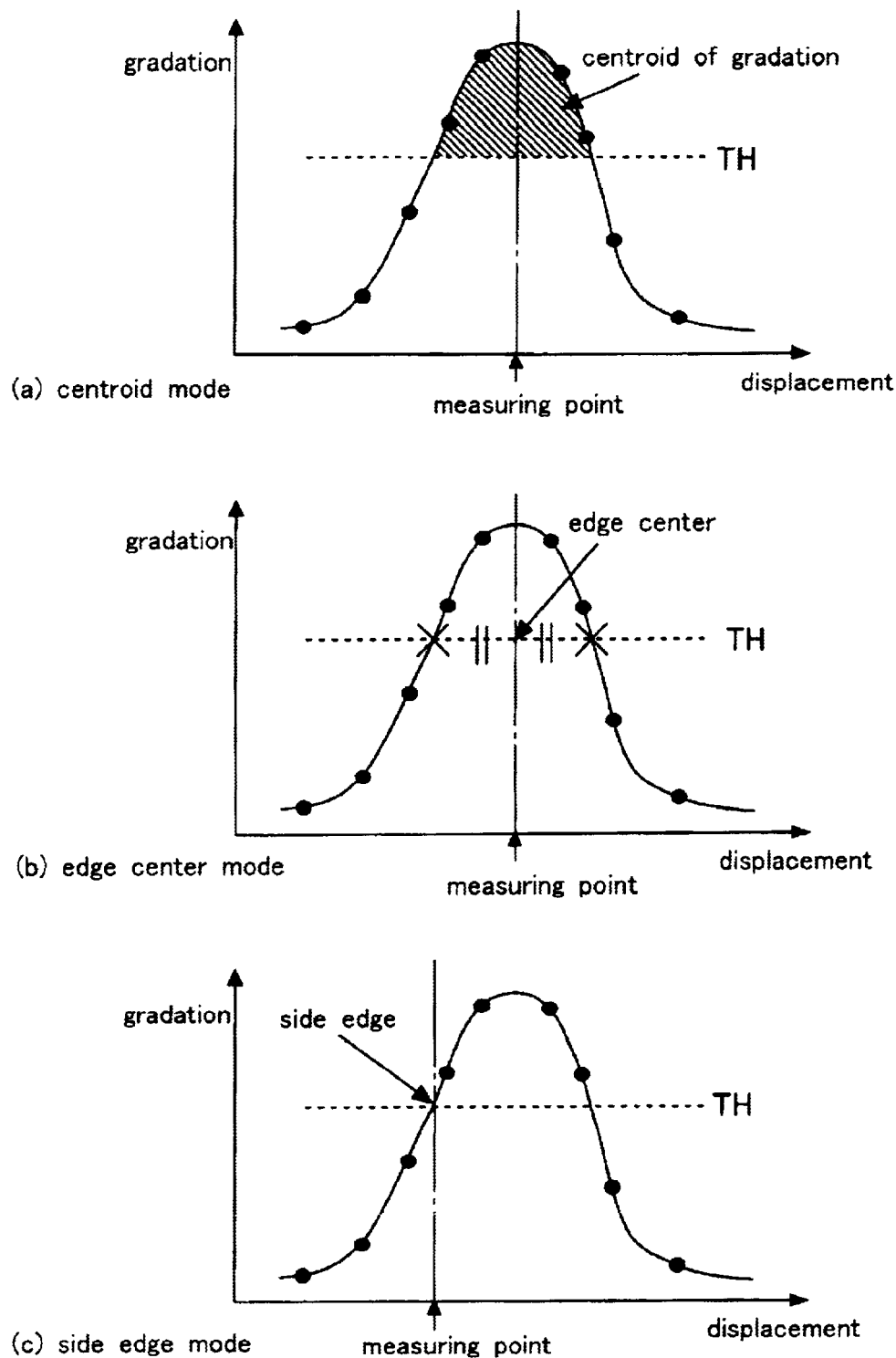
FIG. 10 is an illustrative view showing the process of extracting the measuring point coordinate.

Referring to FIG. 5 once again, the measuring point coordinate on the line bright waveform is extracted according to the prescribed extraction algorithm in the following step (step 504). The process of extracting the measuring point coordinate is conducted via the processes of determining a threshold value and extracting the measuring point coordinate. An exemplary method of determining a threshold value is illustrated in FIG. 9. As shown in the drawing, the threshold value TH is determined as a percentile ratio a % with respect to the brightness Vp of the pixel PP demonstrating the peak value. In other words, it is automatically determined by the formula TH=Vp×a %. The process of extracting the measuring point coordinate is illustrated in FIG. 10. There are three modes available for the process of extracting a measuring point coordinate, or the area centroid method, edge center method and side edge method. As shown in FIG. 10(a), according to the area centroid method, the measurement point is obtained as the centroid of the gradation area exceeding the threshold value TH. According to the edge center mode, the measurement point is determined as the center of two points obtained as the intersections between the line bright waveform and the threshold level TH. According to the side edge mode, the measurement point is obtained as an intersection between a side edge of the line bright waveform with the threshold level TH.

Referring to FIG. 5 once again, in the following step, the displacement is computed from the measured coordinates (step 505). For instance, when the optical system is based on the triangulation, this displacement computing process produces the displacement according to the formula (displacement Z)=A×B/(C×X), where X is the coordinate in the direction of displacement measurement, and A, B and C are constants that are determined by the optical system.

Referring to FIG. 5 once again, the obtained displacement (or a determination result if necessary) is forwarded to the image monitor 4 and external equipment 6 (step 506).

Figure 11:
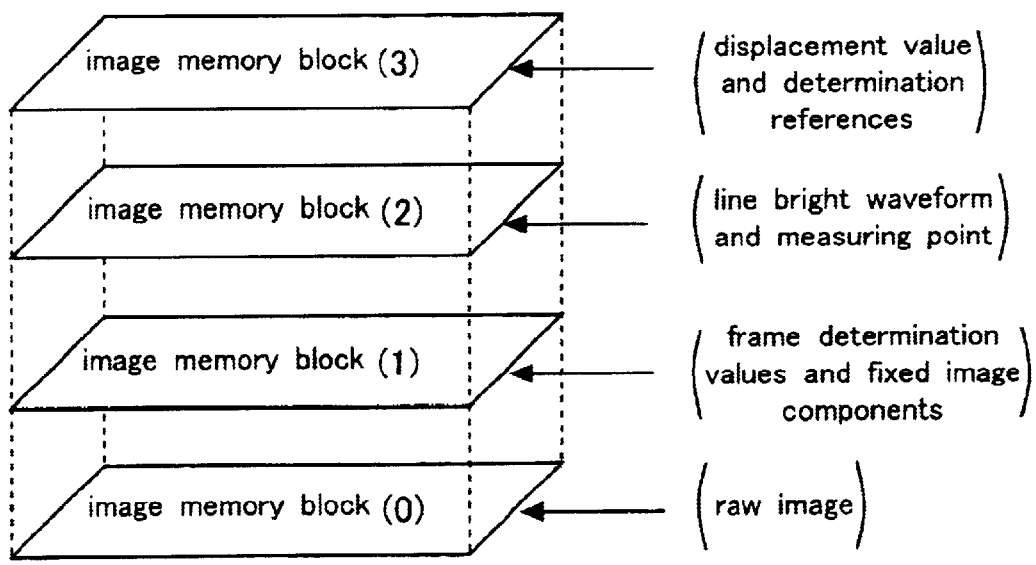
FIG. 11 is an illustrative view showing the process of generating the monitor display.

The process of generating the images on the monitor display is illustrated in FIG. 11. As shown in this drawing, four layers of image memory (0) to (3) are used. Image memory (0) stores the raw image obtained from the sensor head unit 1, image memory (1) stores a screen frame, a determination value and a fixed image component, image memory (2) stores a line bright waveform and a measured value, and image memory block (3) stores a displacement value and a determination reference. The data in these memory layers is read out in a superimposed relationship, in a parallel relationship or individually by the action of a CRT controller or the like, and displayed on the screen of the image monitor 6.

Figure 12:
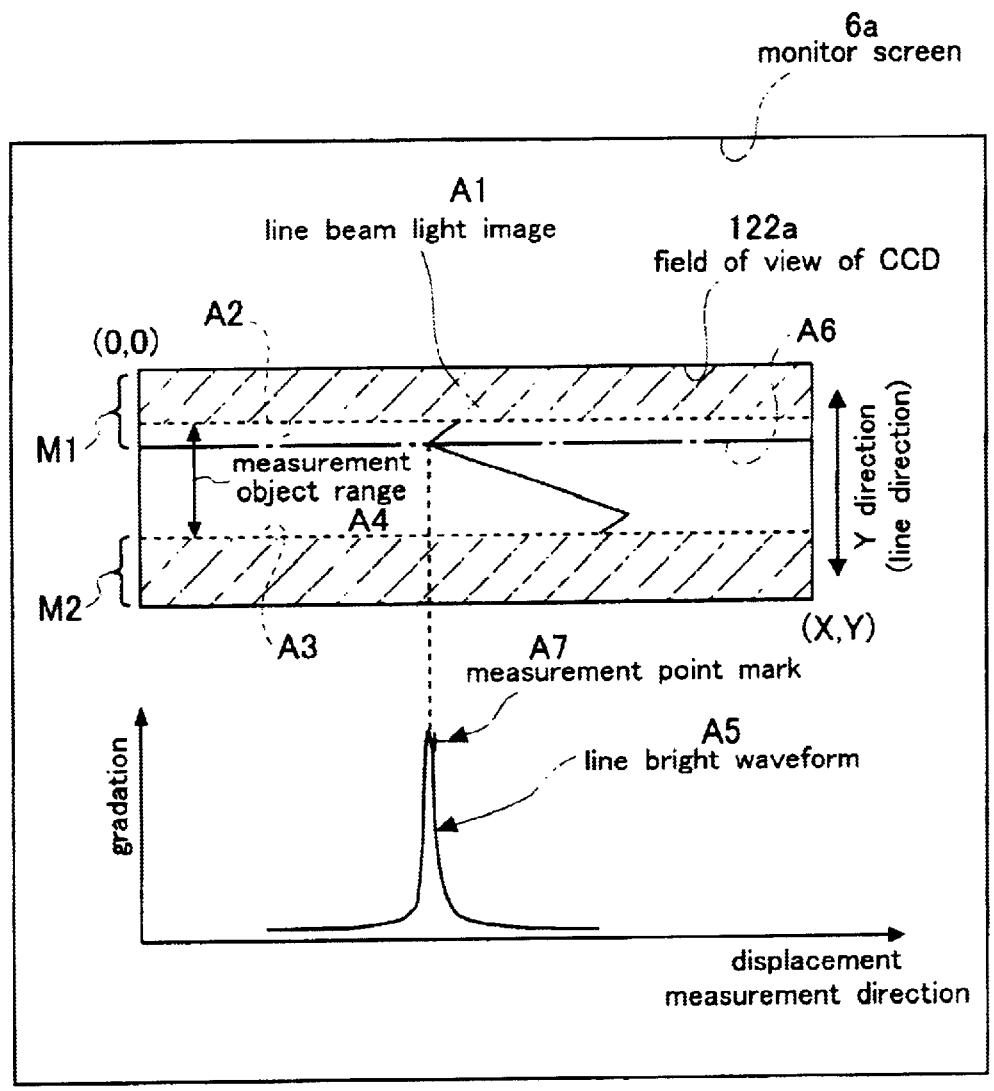
FIG. 12 is a view showing an exemplary monitor display showing the relationship between the image captured by the CCD and line bright waveform.

FIG. 12 illustrates the monitor screen showing the relationship between the image captured by the CCD and the line bright waveform. In this drawing, 6a denotes the monitor screen of the image monitor 6, A1 denotes the reflected line beam light image, A2 and A3 denote boundaries of the measurement object range, A4 denotes the measurement object range defined by the user, A5 denotes the line bright waveform of the peak line A6, A6 denotes the peak line, A7 denotes a cross marking the measurement point coordinate that is determined, and M1 and M2 are masked ranges.

As can be appreciated from the drawing, according to the displacement sensor of this embodiment, the measurement point coordinate is extracted only in the measurement object range A4. Therefore, even if there is any spurious light image outside the measurement object range A4, it would not prevent the measurement point coordinate from being accurately extracted, and an accurate measurement is ensured. Also, because the object of the computation for extracting the measurement point is limited to the image data contained in the measurement object range A4, the time required to the computation is reduced, and the response speed of the sensor is increased. Because the masked ranges M1 and M2 other than the measurement object range A4 are not displayed on the monitor screen as indicated by the hatched areas, and the position of the reflected line beam light image is easier to identify on the monitor screen for the operator.

Only one measurement object range A4 is defined in this embodiment, but two or more measurement object ranges may be defined as described earlier in connection with FIG. 4. Also, each measurement object range may be defined in the displacement measurement direction X and/or in the line direction Y. The number of measurement point coordinates from each measurement object range may be one or more than one as desired.

According to the visual displacement sensor of the present invention, through the cooperation between the sensor head unit 1 shown in FIG. 2 and the sensor main unit 2 shown in FIG. 3, one or more than one measurement object range is defined in the field of view of a two-dimensional CCD serving as a two-dimensional imaging device, one or more than one measurement point coordinate contained in each defined measurement object range is determined, and a desired displacement is measured according to the one or more than one measurement point coordinate that are determined.

However, a plurality of measurement points within the field of view of the CCD can be all extracted only when the gradation of all of the light images corresponding to these measurement points is at an appropriate level. In other words, if there is an excessive difference in gradation between two reflected light images, in spite of an automatic control for the image capturing condition, it is difficult to set the gradation to a level suitable to measurement for both the reflected light images. If the gradation of the light image having a low gradation level is adjusted to an appropriate level, the gradation of the video signal for the other light image will saturate.

The inventors have resolved this problem by using a novel process of adjusting the gradation individually for each measurement object range.

Figure 13:
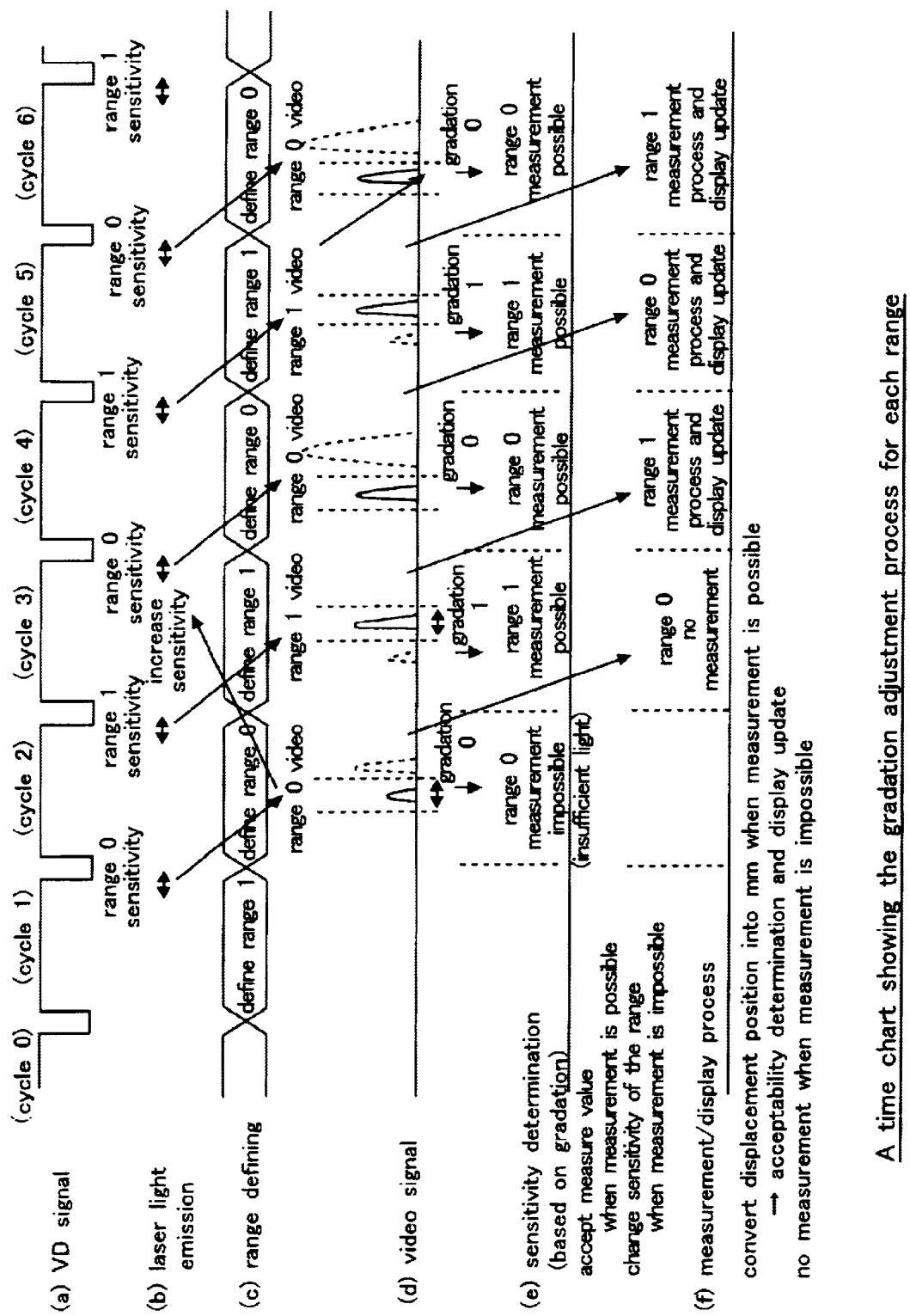
FIG. 13 is a time chart showing the gradation adjustment process for each range.

FIG. 13 is a time chart showing the gradation adjustment process for each range. As shown in the drawing, according to the displacement sensor of this embodiment, when one or more than measurement object range is defined in the field of view of the two-dimensional CCD, the gradation of the reflected light beam light image in each measurement object range is automatically adjusted to a gradation suitable for measurement at all times.

Suppose that two measurement object ranges A1 (range 0) and A2 (range 1) are defined within the field of view of the CCD each having a different position and length defined in the displacement measurement direction, and a reflected line beam light image is present in each of these ranges. By defining a separate measurement object range for each of the reflected line beam light image, the peak video signal in each measurement object range can be adjusted to a level suitable for measurement.

More specifically, referring to FIG. 13, as can be appreciated by comparing the VD signal train shown in (a) and the range defining signal train shown in (c), the sensitivity of the received light is controlled in a time shared fashion by switching range (area) 0 and range (area) 1 in an alternating fashion in each consecutive vertical cycle. As a result, where there are two video peaks in the field of view of the two-dimensional CCD, and one of them is significantly larger or smaller than the other, this automatic sensitivity adjustment function based on a time share basis allows the measurement point coordinate determining process to be executed at an appropriate gradation level for either peak.

Figure 15:
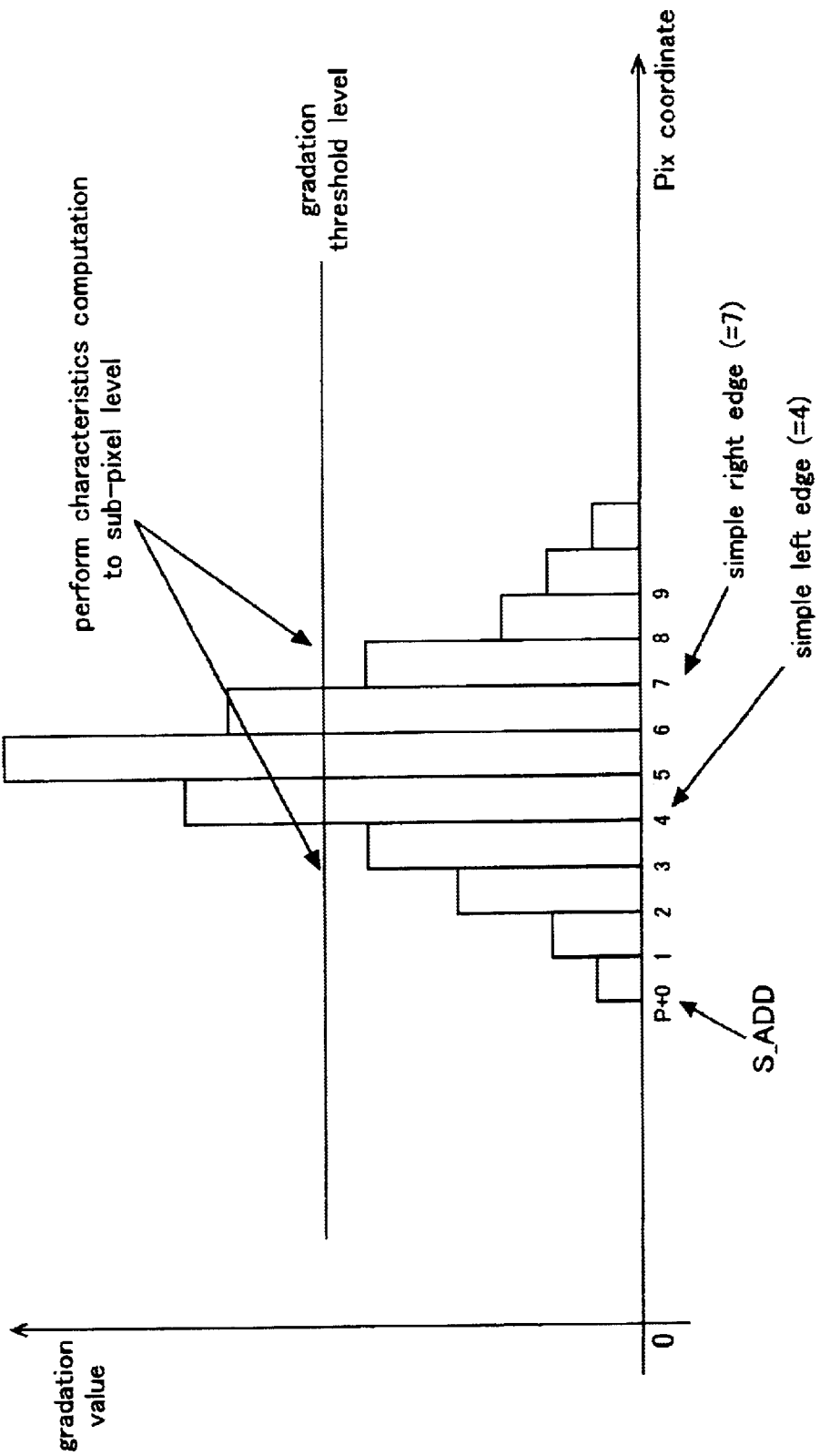
FIG. 15 is a view illustrating the characteristic computation for determining measurement point coordinates.
Figure 16:
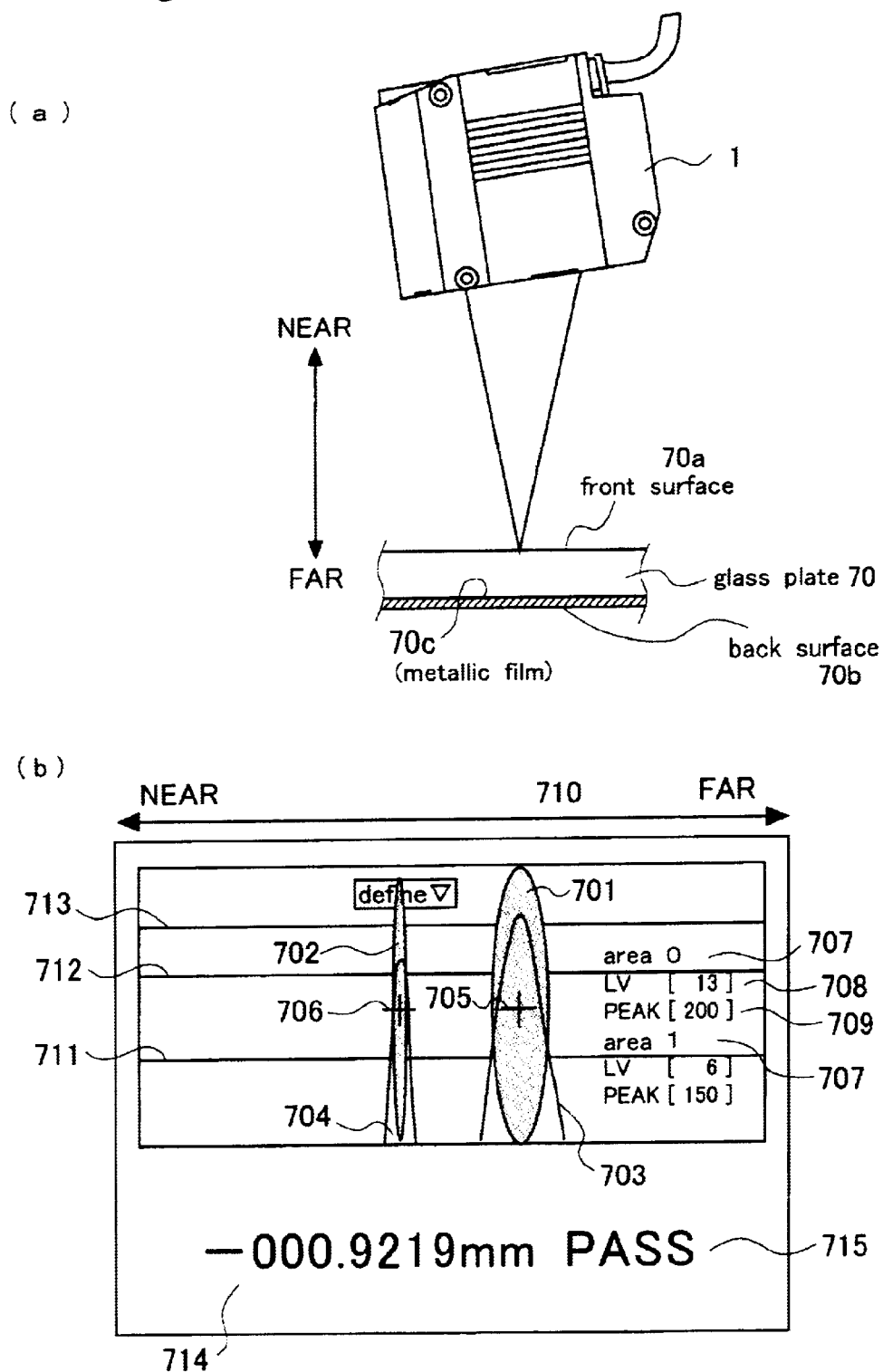
FIG. 16 is a view showing a conventional measurement result.
Figure 17:
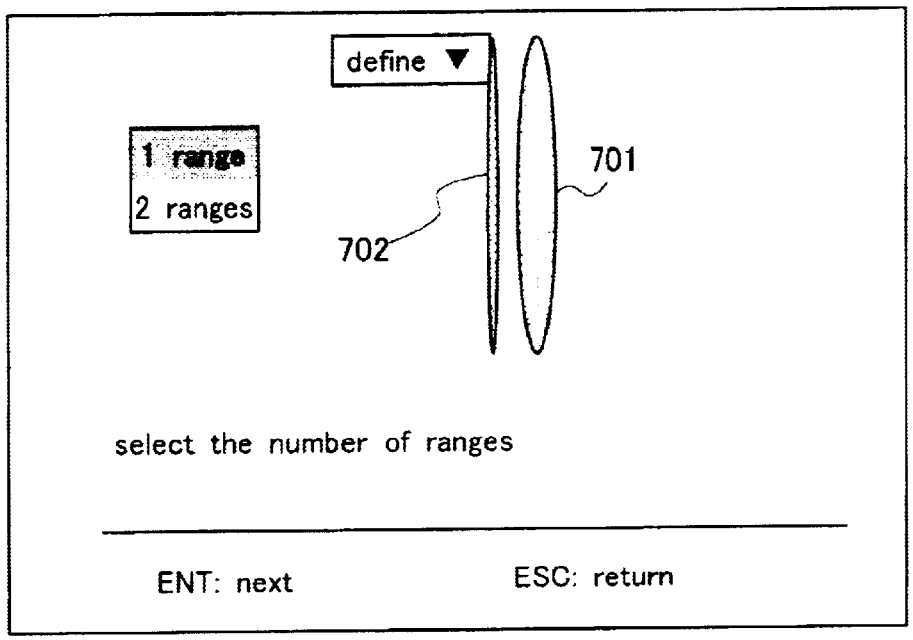
FIG. 17 is a view illustrating the monitor screen when defining regions (part 1)
Figure 17:
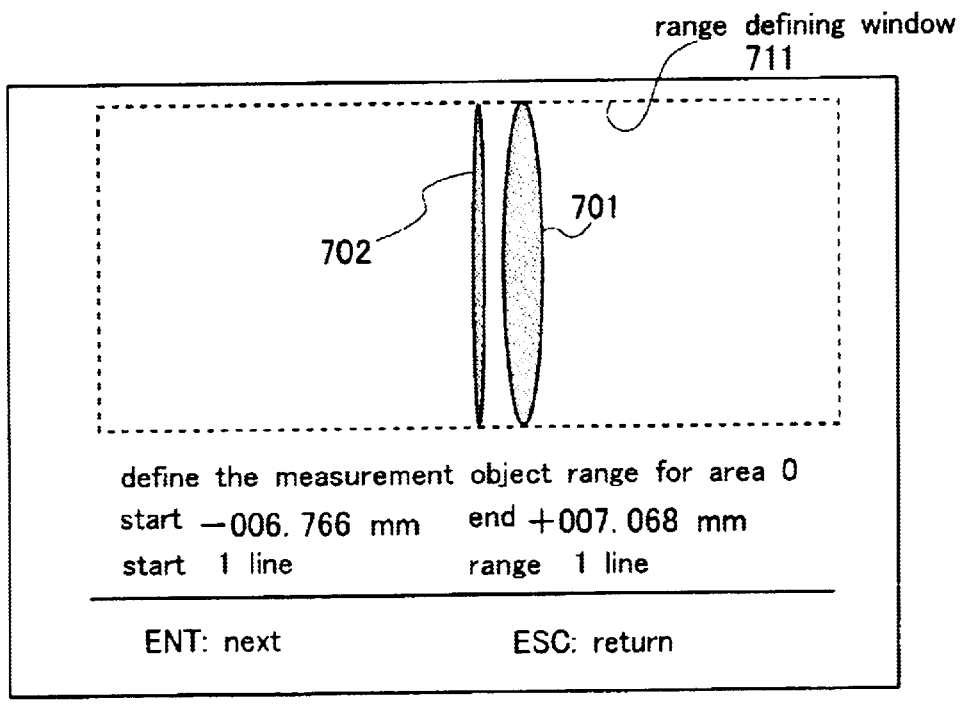
Figure 18:
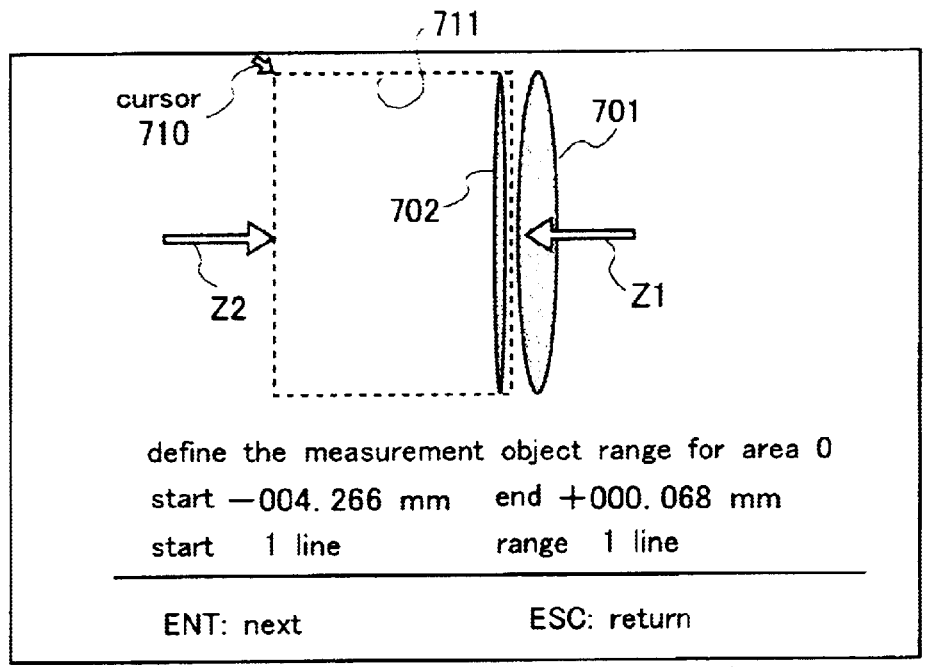
FIG. 18 is a view illustrating the monitor screen when defining regions (part 2)
Figure 18:
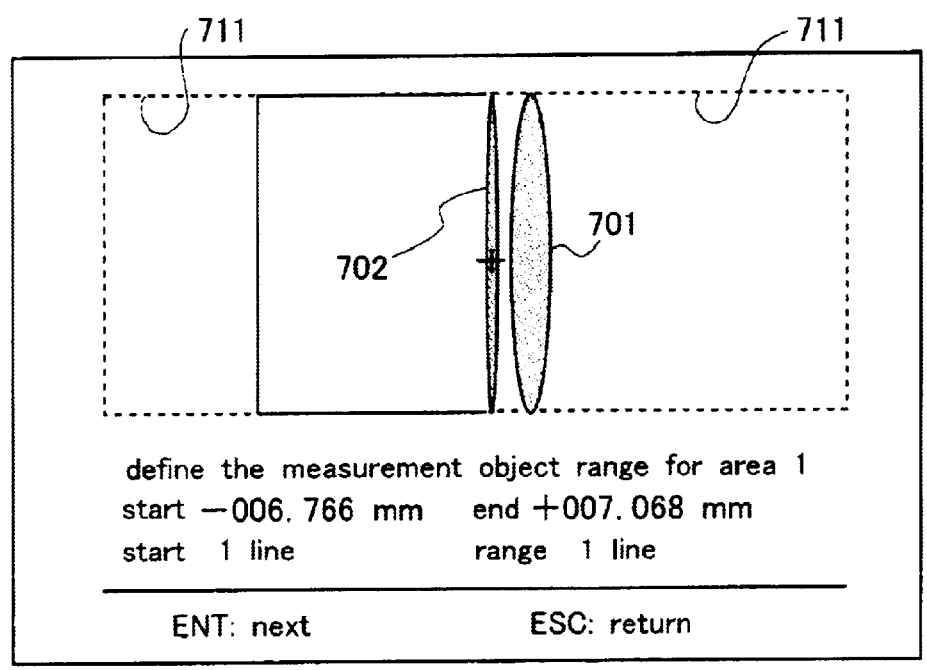

More specifically, in the example of FIG. 13, the image contained in range 0 lacks gradation in the second cycle, but the automatic adjustment of the gradation is performed sequentially. The gradation level is increased to an appropriate level by the fourth cycle, and the measurement point coordinate is extracted by using the characteristics computation as shown in FIG. 15, for instance. On the other hand, because the image contained in range 1 has an appropriate gradation from the beginning (cycle 3), the measurement point coordinate is determined as it is. Conventionally, when there were two such images having different gradation levels on the same screen, the gradation adjustment was performed as a whole, and one of the images had either excessive or insufficient gradation level, and the satisfactory determination of the measurement point coordinate was impossible. By automatically and individually adjusting the gradation for each of the ranges in this manner, each measurement point coordinate can be determined at an appropriate gradation level, and a desired measurement (such as the thickness of a transparent member) can be accomplished for either of the images.

In the computation for characteristic point extraction shown in FIG. 15, the lateral edges are obtained by comparing the gradation level of each pixel with a prescribed threshold value, and the measurement point coordinate is determined as a central point between the lateral edges to a sub-pixel level.

Figure 14:
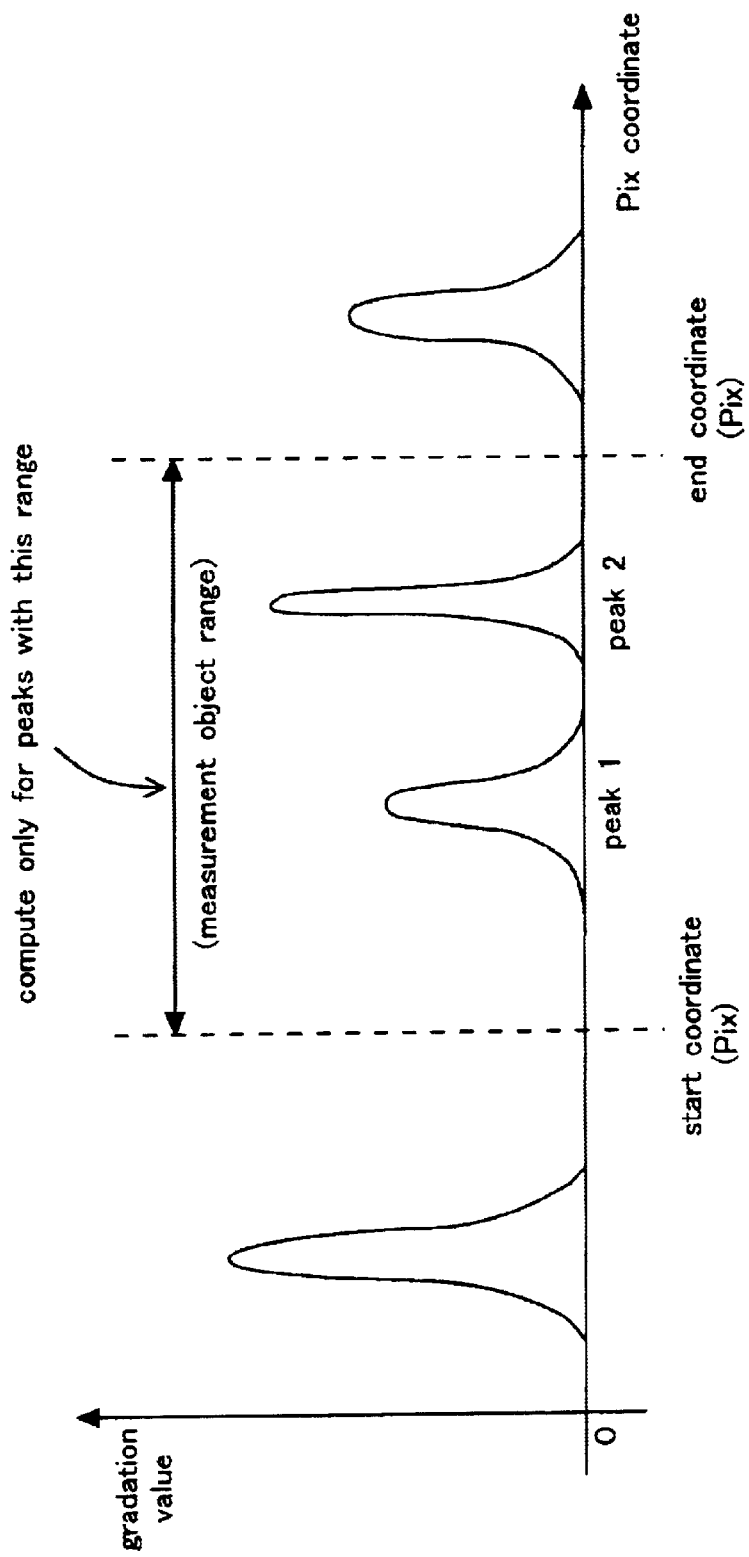
FIG. 14 is a view illustrating the relationship between the line bright waveform and measurement object range.

The range defining function of the present invention is not necessarily required to be conducted for each peak video signal, but each measurement object range may contain two or more peak video signals (peak 1 and peak 2) as shown in FIG. 14.

The actual process of measuring the thickness of a transparent object is now described in the following with reference to FIGS. 16 to 22 by using a specific image monitor screen and defining two or more measurement object ranges.

Referring to FIG. 16(a), a glass plate 70 has an exposed front surface 70a and a back surface 70b formed with a metallic coating as is often the case. Such a glass plate can be found in a CRT tube for a television set, and an LCD panel. When such a glass plate 70 is to be measured by the sensor head unit 1 of the visual displacement sensor, the difference in reflectivity is so great between the front surface and back surface that the displacement measurement of the back surface 70b may create some difficulty if the gradation of the front surface 70a is selected at an appropriate level.

As shown in the monitor display sample of FIG. 16(b), the front surface reflected light image 702 having a normal gradation is displayed as a narrow line, but the back surface reflected light image 701 having a saturated gradation is displayed as a broad line. The monitor display additionally includes a front surface line bright waveform 704 and a back surface line bright waveform 703. As can be appreciated from the peak of the back surface line bright waveform 703 reaching the gradation level 255 line 713, the back surface reflected light image 701 has too high a gradation level for it to be used for measurement. More specifically, even when the characteristic computation which was mentioned earlier with reference to FIG. 15 is attempted as a measurement point coordinate measurement algorithm, an appropriate measurement point coordinate cannot be obtained. In this drawing, numeral 701 denotes a back surface reflected light image, numeral 702 denotes a front surface reflected light image, numeral 703 denotes a back surface line bright waveform, numeral 704 denotes a front surface line bright waveform, numeral 705 denotes a back surface measurement point coordinate display, numeral 706 denotes a front surface measurement point coordinate display, numeral 707 denotes range display, numeral 708 denotes a sensitivity display, numeral 709 denotes peak value display, numeral 710 denotes a mode display, numerals 711, 712 and 713 denote lines indicating gradation levels 100, 200 and 255, numeral 714 denotes a measurement value display, and numeral 715 denotes an acceptability determination result display.

In this case, according to the displacement sensor of the present invention, the back surface reflected light image 701 and front surface reflected light image 702 are defined in separate measurement object ranges (area 0 and area 1).

More specifically, as shown in FIG. 17(a), the number of measurement object ranges to be defined is selected according to the guide on the monitor screen. Because two ranges are selected in this case, "two ranges (area 0 and area 1)" are selected by following a prescribed procedure.

Then, as shown in FIG. 17(b), a range defining window 711 appears on the monitor screen as indicated by the elongated rectangular dotted frame in the drawing. This range defining window 711 can be extended and shrunk laterally by performing a prescribed operation, and this allows a desired range in the displacement measurement direction.

Thus, as shown in FIG. 18(a), the right vertical line of the range defining window 711 is moved leftward as indicated by arrow Z1, and is placed immediately to the right of the front surface reflected light image 702. Then, with the left vertical line indicated by arrow Z2 placed as it is, the prescribed confirmation process is conducted. This concludes the defining process for range 0 as shown in FIG. 18(b).

Figure 19:
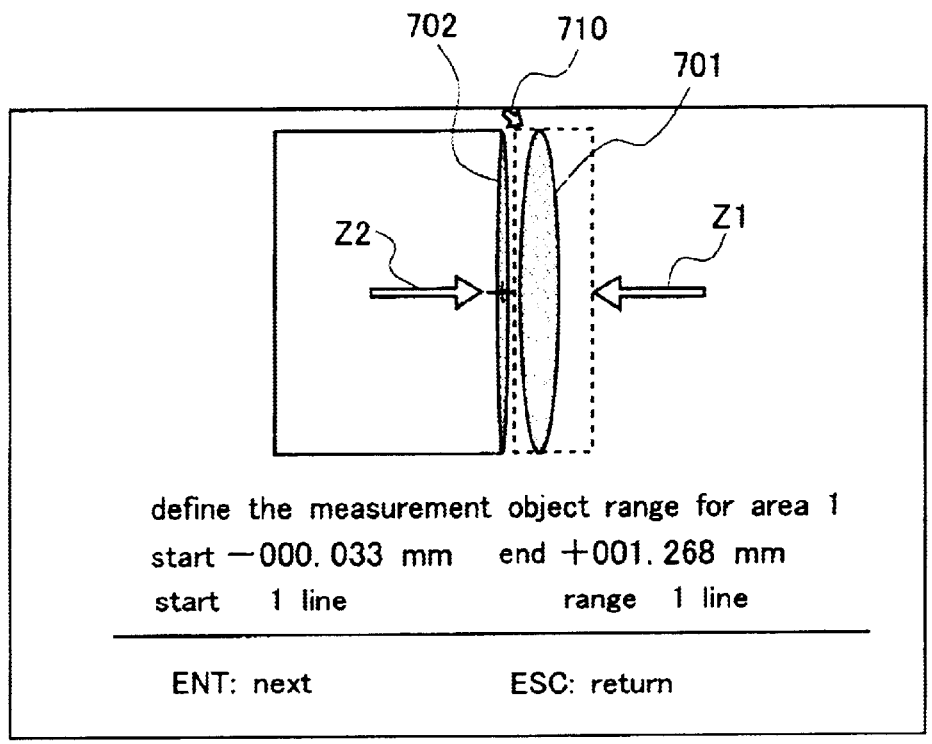
FIG. 19 is a view illustrating the monitor screen when defining regions (part 3)

Referring to FIG. 19, following the prescribed guide, the defining of the measurement object range of area 1 is started, and the defining of the measurement object range 1 is completed by surrounding the back reflected light image 701 with the right and left vertical lines defining the range defining window 711.

Figure 20:
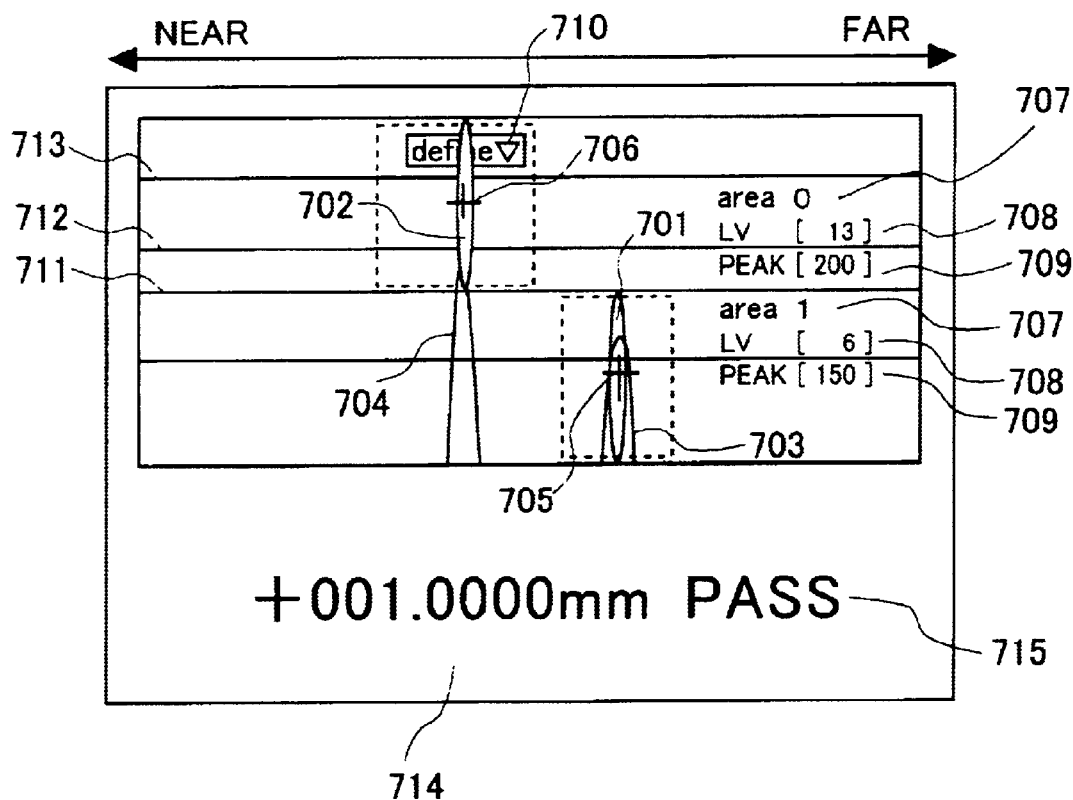
FIG. 20 is a view illustrating the monitor screen at the time of measurement after two measurement object ranges are defined.

Referring to FIG. 20, the captured images of range 0 and range 1 are displayed on the monitor screen one above the other. At the same time, the gradation automatic adjustment process is executed for each of the ranges in a time share manner as described in connection with the time chart of FIG. 13 so that an appropriate gradation is selected for each of the back reflected light image 701 and the front reflected light image 702 as indicated by the narrow solid lines. As can be appreciated from the back surface line bright waveform 703 drawn on the right hand side of the back surface reflected light image 701, the gradation of the peak waveform would not saturate, and is automatically adjusted to a level suitable for measurement.

A peak display and sensitivity display are shown on the right corner of the monitor screen for each of area 0 and area 1. More specifically, in the illustrated embodiment, area 0 has a sensitivity level "13" and a peak level "200", and area 1 has a sensitivity level "6" and a peak level "150".

Therefore, the operator can readily understand from these displays that the displacement has been properly measured for both the front and back surfaces by reducing the sensitivity when capturing the image of the back surface even though there is a substantial difference in reflectivity between the front and back surfaces of the glass plate.

In the measurement process involving the definition of measurement object ranges, the extraction of displacement and gradation is not necessarily performed with respect to an image extracted by a masking process in the range determining unit 202.

In other words, the measurement point coordinate extracting process using a masked image may create an inconvenience. Such a problem can be eliminated by the second embodiment of the measurement point extracting process which is described in the following.

Figure 21:
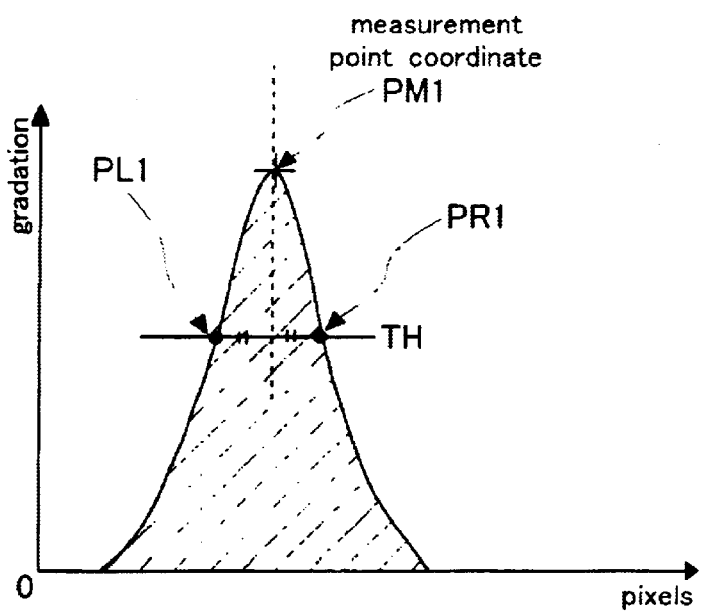
FIG. 21 is a view illustrating the problem with the process of extracting a measurement point coordinate using a masked image.
Figure 21:
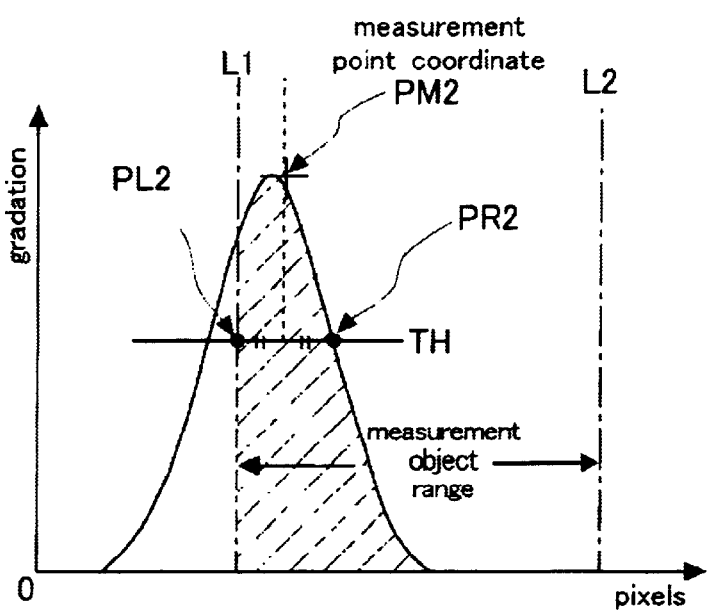
Figure 22:
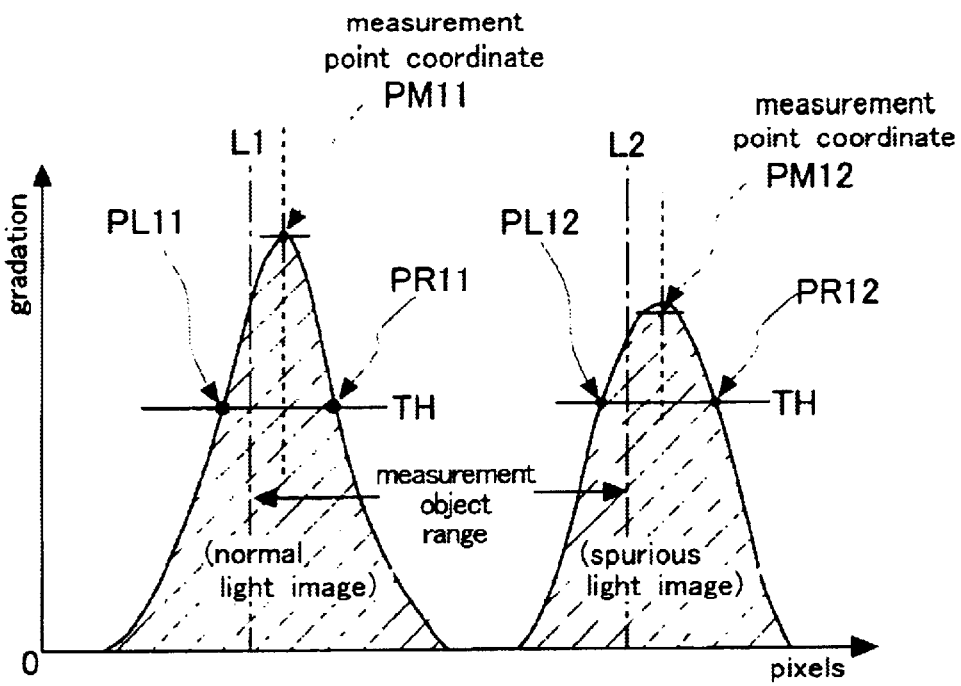
FIG. 22 is a view illustrating the second embodiment of the process of extracting a measurement point coordinate using a masked image.
Figure 22:
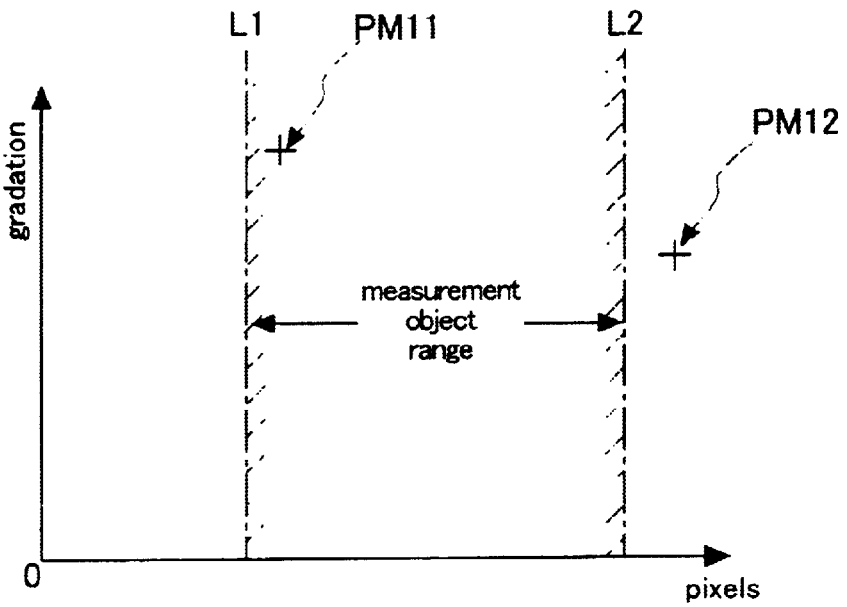

FIG. 21 (a) shows a measurement point coordinate extracted from the input image, and FIG. 21(b) shows a measurement point coordinate extracted from a masked image obtained by masking the input image. L1 and L2 denote the lateral boundaries of the measurement object range, TH denotes a threshold value, PL1 and PR1 denote a left and right edge at which the input image and the threshold level TH cross each other, and PM1 denotes a measurement point coordinate extracted from the input image by using the edge center algorithm. PL2 and PR2 denote a left and right edge at which the masked image and the threshold level TH cross each other, and PM2 denotes a measurement point coordinate extracted from the masked image by using the edge center algorithm.

As can be appreciated from the drawings, even when the reflected line beam light image is present inside the measurement object range, if it is located close to a boundary of the measurement object range, as shown by the white region in FIG. 21(b), the part of the light image located to the left of the left boundary line L1 outside the measurement object range is excluded from the reflected line beam light image. Therefore, the measurement point coordinate PM2 (see FIG. 21(b)) computed by the edge center algorithm based on the lateral edges PL2 and PR2 at which the masked image and the threshold level TH cross each other does not agree with the measurement point coordinate PM1 (see FIG. 21(a)) computed by the edge center algorithm based on the lateral edges PL1 and PR1 at which the input image and the threshold level TH cross each other. In the illustrated embodiment, the measurement point coordinate PM2 is located more to the right than the measurement point coordinate PM1.

To avoid such an inconvenience, each measurement point coordinate may be provisionally determined by using the raw image prior to the masking process for the extraction of displacement and gradation before it is finally determined only when a match is found in the comparison of the measurement point coordinate with the corresponding measurement object range.

To explain this in more specific terms, as shown in FIG. 22(a) suppose that a normal light image due to the reflected line beam light image and a spurious light image due to the reflection of external light are present in the field of view of the CCD, and that the normal light image is located inside the measurement object range near the left boundary line L1 while the spurious light image is located outside the measurement object range.

In such a case, according to the present invention, at first, the edge center algorithm is applied to the input image (instead of the masked image) to extract measurement point coordinates PM11 and PM12, and they are provisionally determined as the measurement point coordinates. In FIG. 22(a), L1 and L2 denote the left and right boundary lines of the measurement object range, TH denotes a threshold value, PL11 and PR11 denote the left and right edges at which the threshold level and the normal light image cross each other, and PL12 and PR12 denote the left and right edges at which the threshold level and the spurious light image cross each other.

According to the present invention, by comparing the provisionally determined measurement point coordinates PM11 and PM12 with the measurement object range, only those of the two measurement point coordinates PM11 and PM12 which are located inside the measurement object range are finally determined as the measurement point coordinates while those which are not are excluded as candidates for the true measurement point coordinates. Specifically, in the example of FIG. 22, only the measurement point coordinate PM11 is kept as the true measurement point coordinate while the measurement point coordinate PM12 is disregarded when finally determining the measurement point coordinate.

According to such a structure, because the measurement point coordinate PM12 due to the spurious light image is excluded, erroneous measurement due to external light can be avoided. Furthermore, because the finally determined measurement point coordinate PM11 is extracted from the input image, a higher level of precision can be attained as compared to the case where the finally determined measurement point coordinate PM11 is extracted from the masked image.

Figure 23:
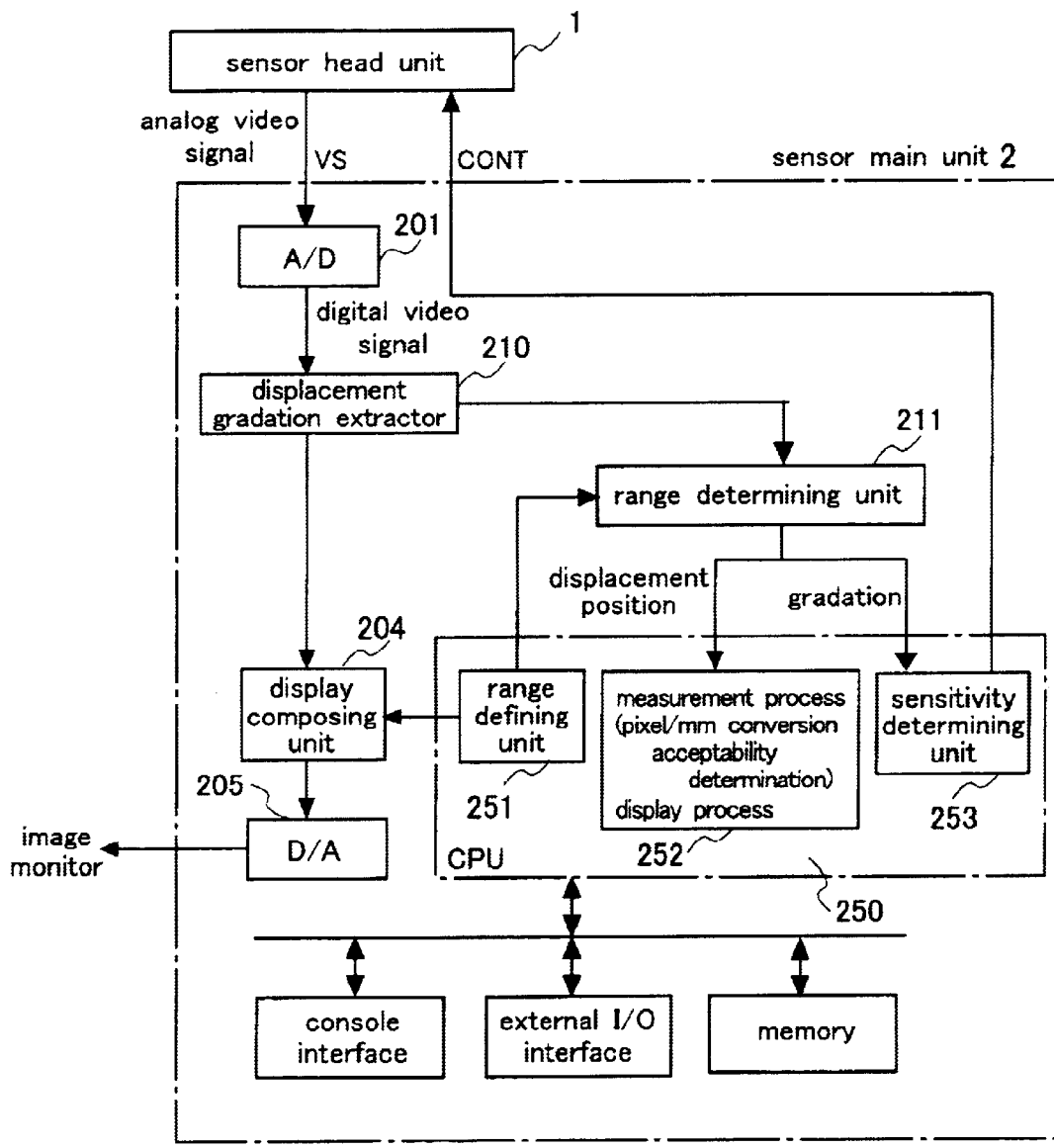
FIG. 23 is a block diagram (part 2) showing the functional internal structure of the sensor main unit.

The block diagram (part 2) of FIG. 23 schematically illustrating the internal structure of the sensor main unit shows the electric structure for executing such processes.

In the example illustrated in FIG. 23, the analog video signal VS obtained from the sensor head unit 1 is converted into a digital signal by the A/D converter 201, and is directly fed to the displacement/gradation extracting unit 210. The displacement/gradation extracting unit 210 extracts the displacement and gradation as described earlier according to the raw image which has not been subjected to any masking process, and the image containing the obtained displacement and gradation is forwarded to the display composing unit 204. Meanwhile, the obtained displacement and extracted gradation are finally forwarded to the range determining unit 211.

As a result, either the raw image itself or a line bright waveform extracted from the raw image is displayed on the screen of the image monitor while the displacement and gradation extracted by the gradation extracting unit 210 are finally determined by the range determining unit 211 if they are proper.

In other words, the displacement and gradation obtained by the displacement/gradation extracting unit 210 may contain external light or other spurious signals, but they are filtered by the range determining unit 211 so that only those that can be accommodated in the defined ranges are forwarded to the computing unit 252 and sensitivity determining unit 253 as the true displacement positions and gradations (finally determined state), and are used for the computation process and generation of received light intensity control signal CONT in a similar manner as described earlier.

As can be appreciated from the foregoing description, according to the measurement process involving the function of defining measurement object ranges of the present invention, a favorable result can be achieved when measuring the thickness of a glass plate 70 having metallic film 70c coated over the back surface 70b thereof.

However, it was discovered that a slight inconvenience can occur if the level of the measurement object such as the front surface 70a of the glass plate 70 fluctuates for various reasons even though measurement object ranges are individually defined for the front surface 70a and back surface 70b as long as the two ranges are fixed.

Figure 24:
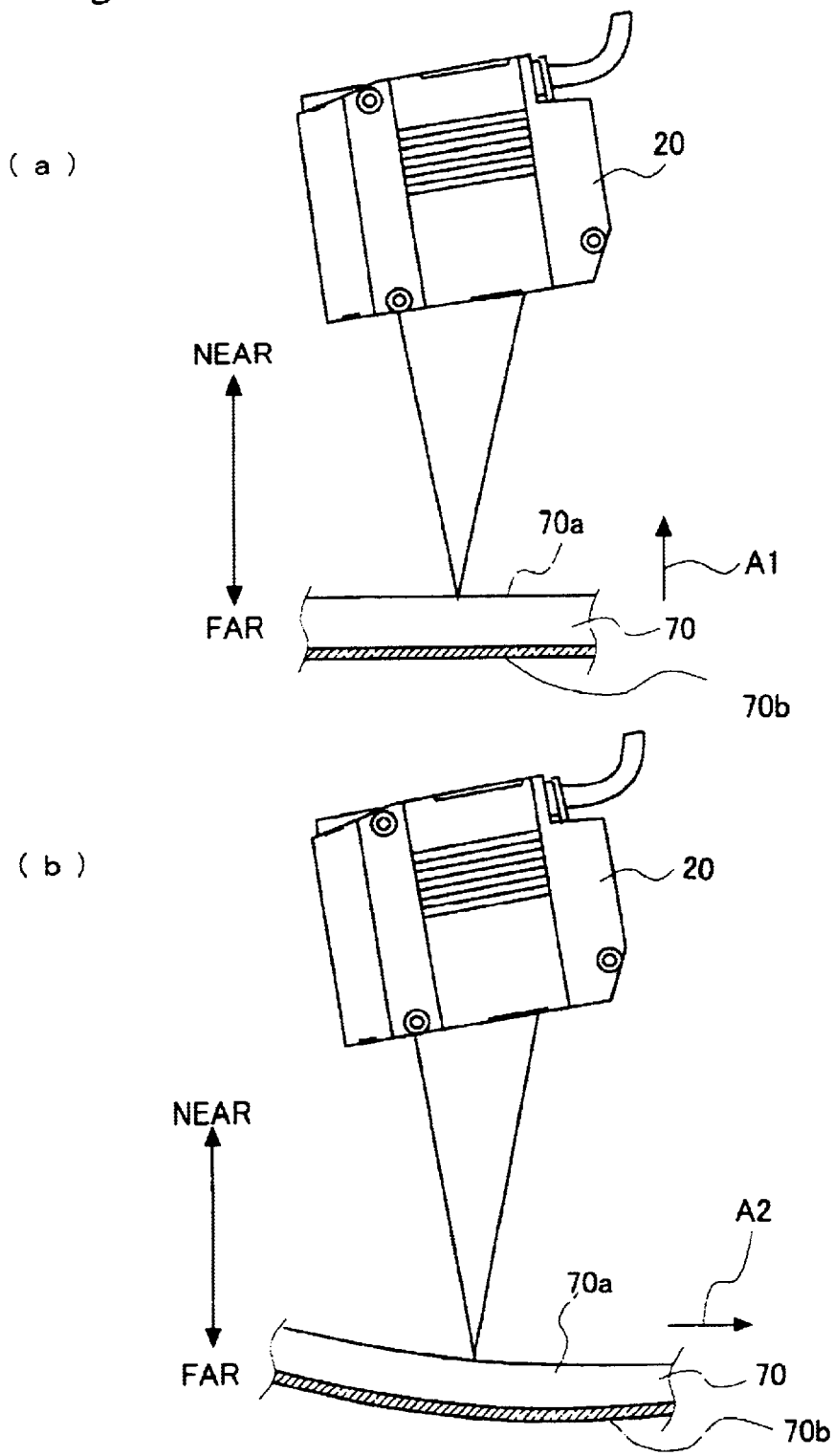
FIG. 24 is a view showing a mode of vertical changes in a measurement point.

More specifically, it can occur if the glass plate 70 has moved vertically as indicated by arrow A1 in FIG. 24(a) or if there is a warp or bend in the glass plate 70 carried by a conveyer as indicated by arrow A2. A typical glass plate having a warp or bend is a CRT for a television set.

Figure 25:
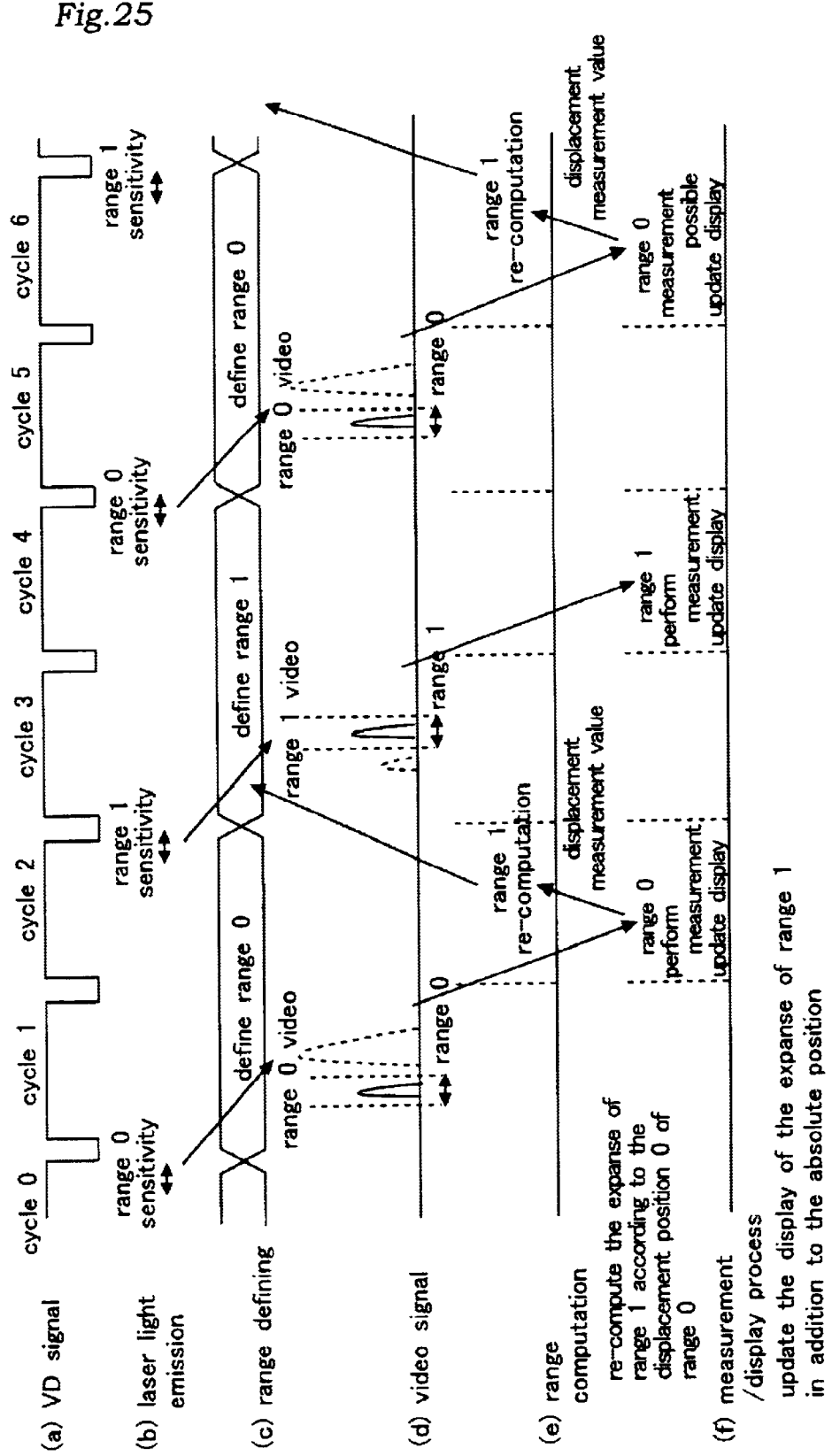
FIG. 25 is a time chart showing the process of tracking defined regions to the vertical change in the measurement point.

In such a case, according to the present invention, as shown in FIG. 25, the measurement value for the front surface 70a is always monitored, and the measurement object range is moved so as to correspond to the change in the measurement value for the front surface 70a. More specifically, as shown in FIG. 25, according to the present embodiment, the measurement object ranges are switched in an alternating manner for each vertical interval. The displacement (height) of range 0 corresponding to the front surface 70a is obtained during the first half of the two consecutive vertical intervals, and when there is any fluctuation in the displacement, the position of the measurement object range corresponding to the back surface 70b is recalculated during the latter half of the two consecutive vertical intervals assuming that the thickness is constant. As a result, in the definition of the next range 1, because the position of range 1 corresponding to the back surface 70b reflects the fluctuation, one can avoid the failure to execute the gradation automatic adjustment process when measuring the back surface due to the deviation of the position of the back surface away from the measurement object range.

More specifically, the lighting of the laser shown in FIG. 25 (b) as well as the shutter time and the gain of the AGC amplifying circuit is performed at the sensitivity for range 0 (glass plate front surface) in cycle 0, at the sensitivity for range 1 (glass plate back surface) in cycle 2, and at the sensitivity for range 0 (glass plate front surface) in cycle 4. The selection of ranges for the measurement object shown in FIG. 25(c) is set for range 0 (glass plate front surface) in cycles 1 and 2, for range 1 (glass plate back surface) in cycles 3 and 4, and range 0 (glass plate front surface) in cycles 5 and 6. The acquiring of the video signal shown in FIG. 25(d) is performed once every two cycles such as in cycles 1, 3 and 5. The measurement display process shown in FIG. 25(d) is performed once every two cycles, and the measurement is performed and the display is updated alternating between ranges 0 and 1. The range computation shown in FIG. 25(e) consists of re-computing the expanse of range 1 according to the displacement measurement value for region 0. The re-computed expanse of range 1 is reflected in the defining process for range 1 in the following cycle.

The laser lighting control shown in FIG. 25(b) is performed by reading an appropriate image capturing condition from the image capturing condition storage unit 141 in the sensor head unit 1 according to control signal CONT generated by the sensitivity determining unit 253, and controlling the light emitting and receiving systems via the timing signal generating circuit 101. The range defining process shown in FIG. 25c is effected by the range determining unit 202 executing a masking process according to the range defined by the range defining unit 251. The range computing process shown in FIG. 25(e) is effected by the range defining unit 251 re-computing the expanse of range 1 according to the displacement measurement value for range 0. Finally, the measurement display process shown in FIG. 25(f) is effected by the operation of the units for pixel/mm conversion process, measurement process, acceptability determination process and display process in the computing unit 252.

Figure 26:
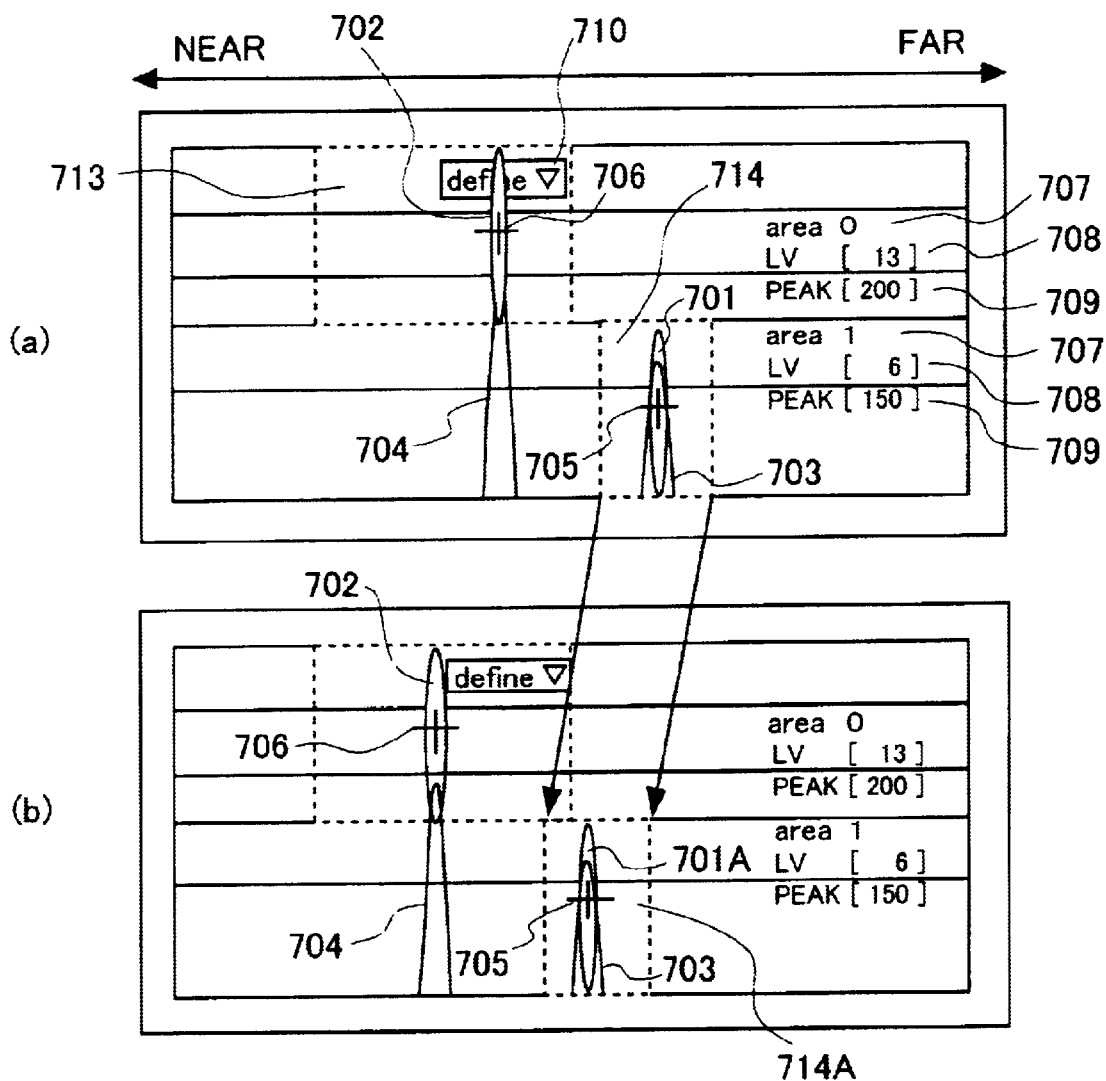
FIG. 26 is a view showing the monitor screen before and after the vertical change in the measurement point.

This is shown by an example of the display on the monitor screen in FIG. 26. More specifically, FIG. 26(a) shows the state before the height of the front surface of the glass plate fluctuates, and FIG. 26(b) shows the state after the height of the front surface of the glass plate has fluctuated for various reasons. As can be appreciated from this, the surface reflected light image 702 and back surface reflected light image 701 are kept as proper narrow lines if the front surface measurement object range 713 and back surface measurement object range 714 are properly defined, but the back surface reflected light image 701 falls out of the range so that it becomes impossible to recognize the back surface reflected light image and perform a measurement if the measurement object or the glass plate moves vertically for some reason and the back surface measurement object range 714 is kept fixed.

On the other hand, according to the method of recalculating the range described earlier, because the back surface measurement object range 714A is recalculated and properly defined, the back surface reflected light image 701A falls well into the newly defined back surface measurement object range 714A as shown in the lower part of FIG. 26(b) so that the gradation level is appropriately adjusted, and the thickness measurement can be conducted in a stable manner.

Thus, according to the present invention, by defining one or more than one measurement object range in the field of view of a two-dimensional imaging device such as a two-dimensional CCD, and masking peak waveforms due to external light and appropriately adjusting the gradation of a saturated image which may correspond to the highly reflective surface, a precise and favorable displacement measurement can be ensured at all times.

The displacement measurement process involving the definition of measurement object ranges according to the present invention can also define ranges in a direction perpendicular to the measurement direction or in the line direction of the line beam. Such an example is illustrated in FIGS. 27 and 28.

Figure 27:
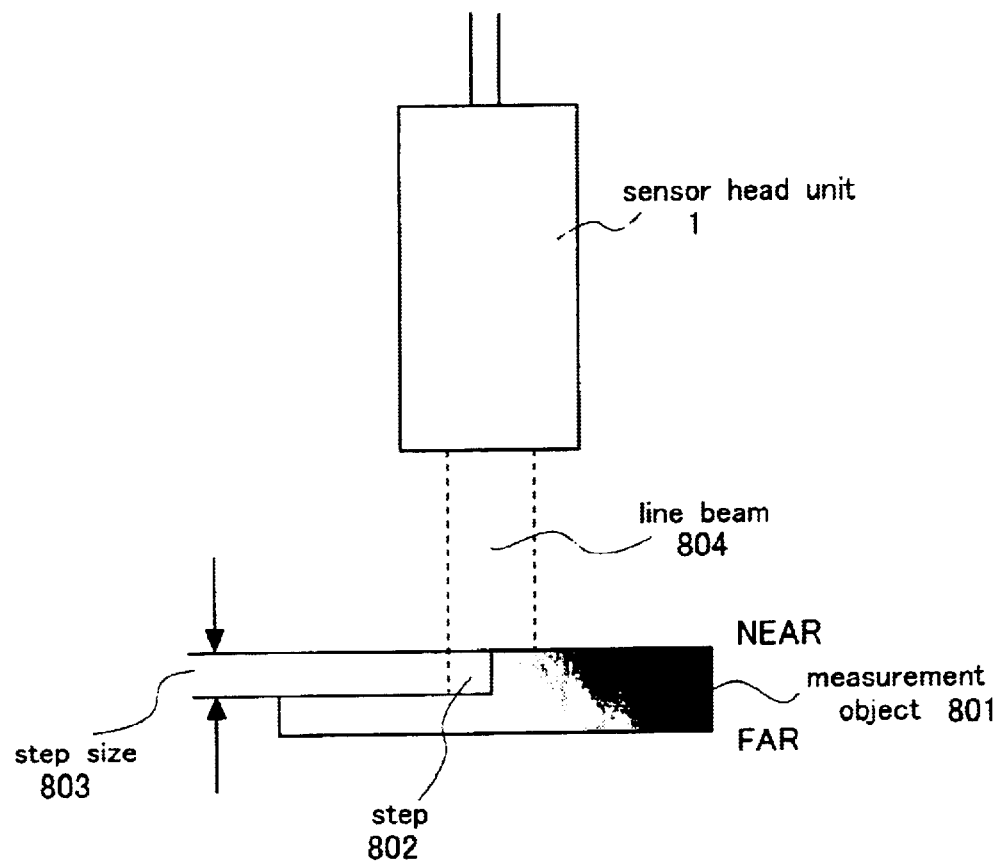
FIG. 27 is a view illustrating the positional relationship between the sensor and measurement object when measuring a step.
Figure 28:
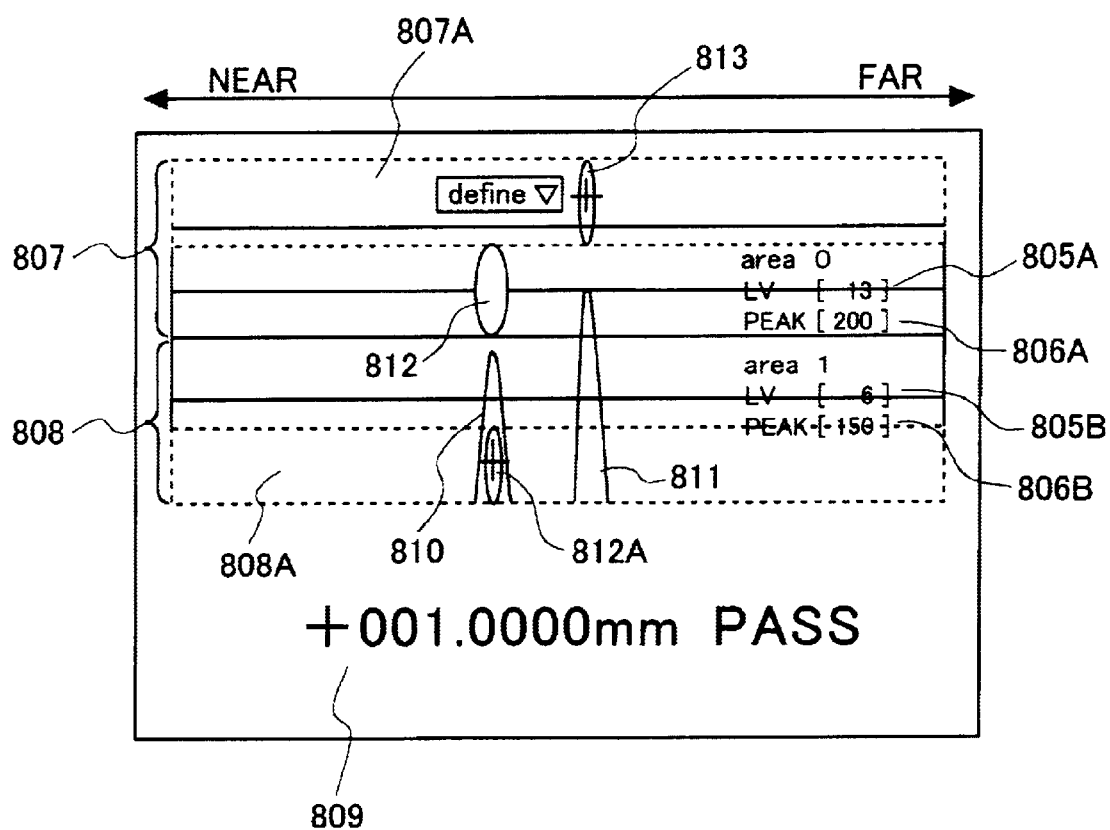
FIG. 28 is a view showing the monitor screen for the measurement of a step.

Referring to FIG. 27, numeral 1 denotes a sensor head unit, numeral 801 denotes a measurement object, numeral 802 denotes a step portion of the measurement object, and numeral 803 indicates a step size. A line beam 804 emitted from the sensor head unit 1 can measure the step size 803 by extending across the step portion 802.

If there is any difference in reflectivity between the upper and lower surfaces defining the step portion 802, the received light intensity for one of the surfaces saturates as was the case in the above described example, and the measurement cannot be successfully executed.

Even in such a case, by defining separate measurement object ranges for the upper and lower surfaces, the intensity of the reflected light can be automatically adjusted to a suitable level, and a measurement failure or large measurement error can be positively avoided.

The monitor screen at the time of measuring a step is illustrated in FIG. 28. In the drawing, numeral 805A denotes the sensitivity level of area 0, numeral 806A denotes the peak level of area 0, numeral 805B denotes the sensitivity level of area 1, numeral 806B denotes the peak level of area 1, numeral 807 denotes a first display area, numeral 808 denotes a second display area, numeral 807A denotes a measurement object range in the first display area which is surrounded by a dotted line in the drawing, numeral 808A denotes a measurement object range in the second display area which is surrounded by a dotted line in the drawing, numeral 809 denotes the display of the result of the step measurement, numeral 810 denotes the line bright waveform of the reflected light from the upper surface, numeral 811 denotes the line bright waveform of the reflected light from the lower surface, numeral 812 denotes the reflected light image from the upper surface, numeral 812A denotes the reflected light image from the upper surface after it has been subjected to the gradation adjustment, and numeral 813 denotes the reflected light image from the lower surface.

Thus, by independently defining the measurement object ranges 807A and 808A which are separated in the direction of the line beam within the field of view of the two-dimensional CCD, they are displayed substantially centrally in the second display area 808, the gradations of the line bright waveforms 810 and 811 corresponding to the upper reflected light and lower reflected light are both appropriately controlled, and both of the two surfaces can be measured in a reliable manner. In this case, of the respective horizontal scan line outputs that are produced from the two-dimensional CCD, the gradation control is appropriately conducted for the area corresponding to the measurement object range 808A and for the area corresponding to the measurement object range 807A at the same time, the peak values of the line bright waveforms of the respective ranges can be favorably controlled, and the precision of the measurement can be ensured.

Figure 29:
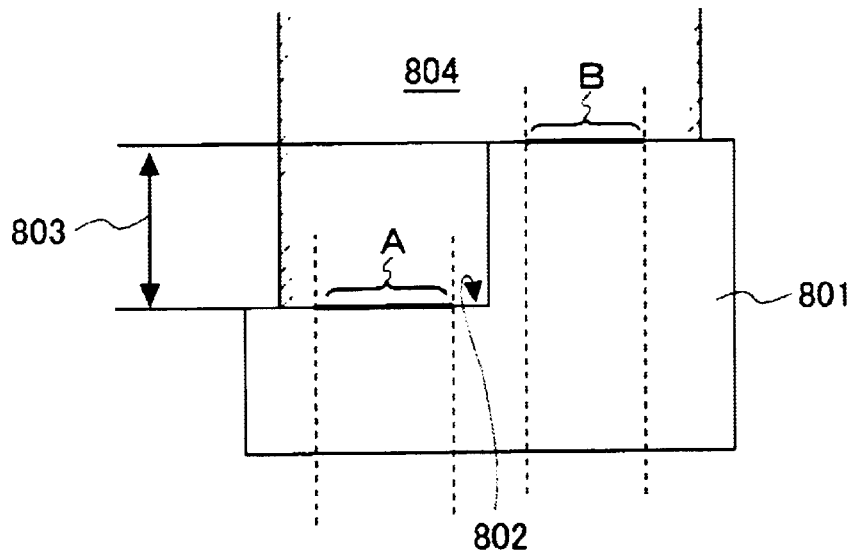
FIG. 29 is a view illustrating the problem associated with the lateral shifting of the measurement object when measuring a step.
Figure 29:
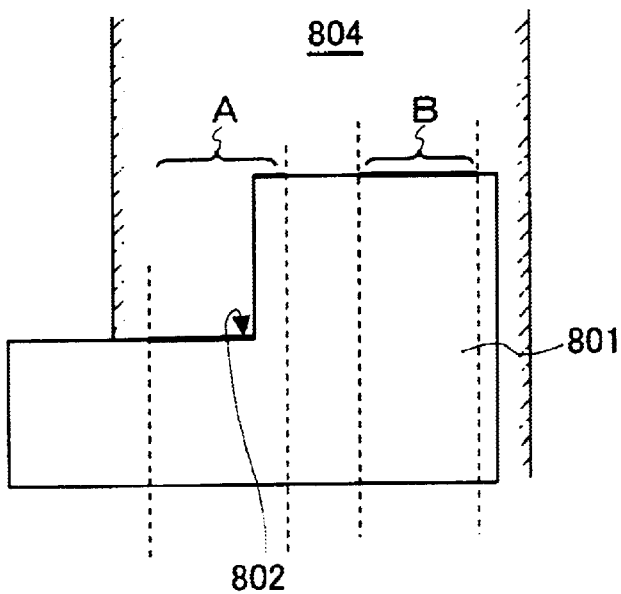

The lateral shift tracking control in the step measurement described above is now explained in the following. FIG. 29 illustrates the problem associated with the lateral shift of the measurement object when measuring a step thereof. In the drawing, numeral 801 denotes a measurement object, numeral 802 denotes a step 802, numeral 803 denotes a step size, and numeral 804 denotes a line beam. As shown in FIG. 29(a), when the measurement object 801 is at a reference position, two measurement object ranges A and B are defined in the lower and upper surfaces defining the step size 803. On the other hand, as shown in FIG. 29(b), when the measurement object 801 has moved laterally, the step 802 falls within the measurement object range A, and this causes a problem for the measurement of the step. This problem can be resolved by laterally moving the measurement object ranges A and B following the lateral shift of the measurement object 801.

Figure 30:
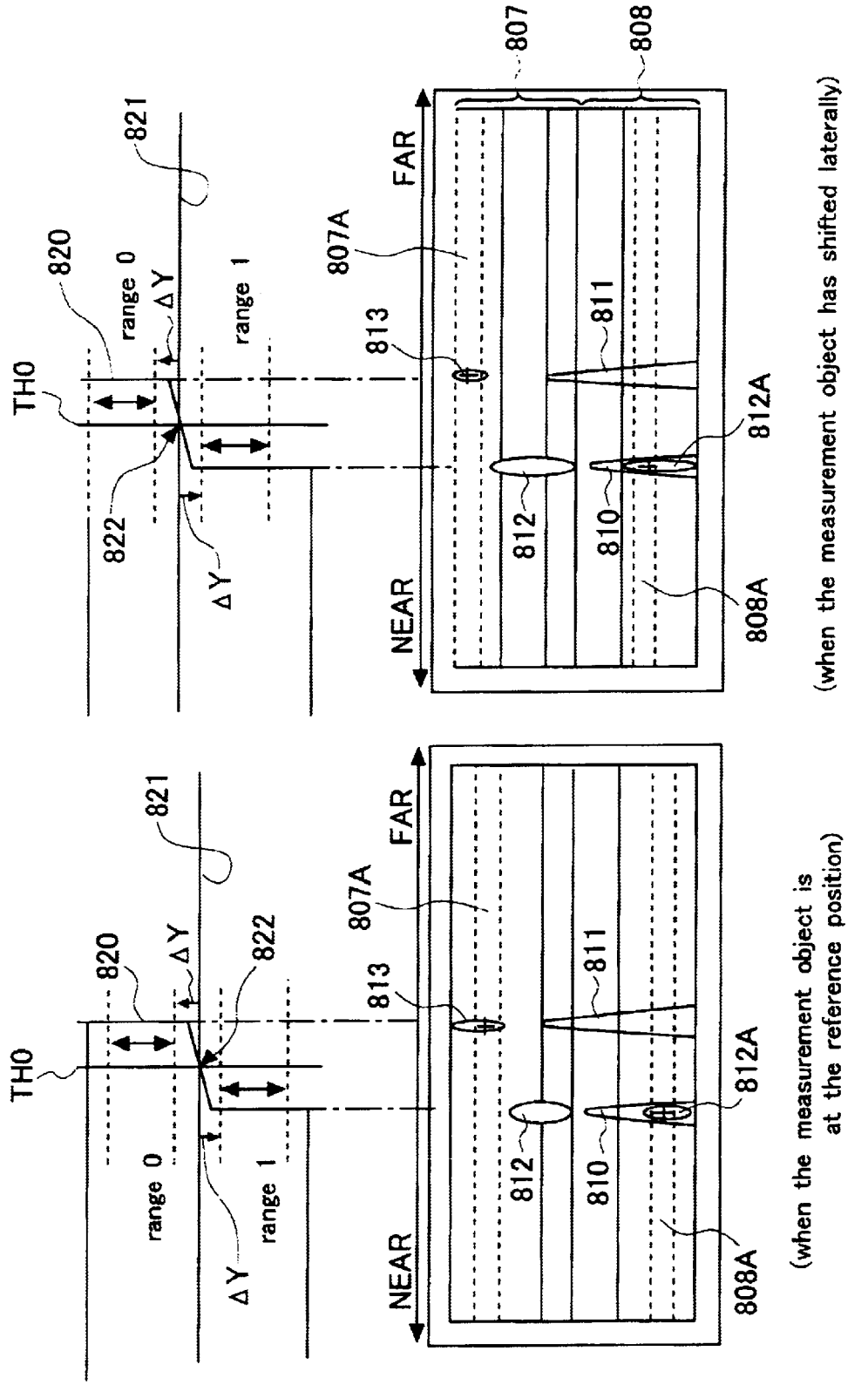
FIG. 30 is a view showing the control of tracking a lateral shift when measuring a step.
Figure 31:
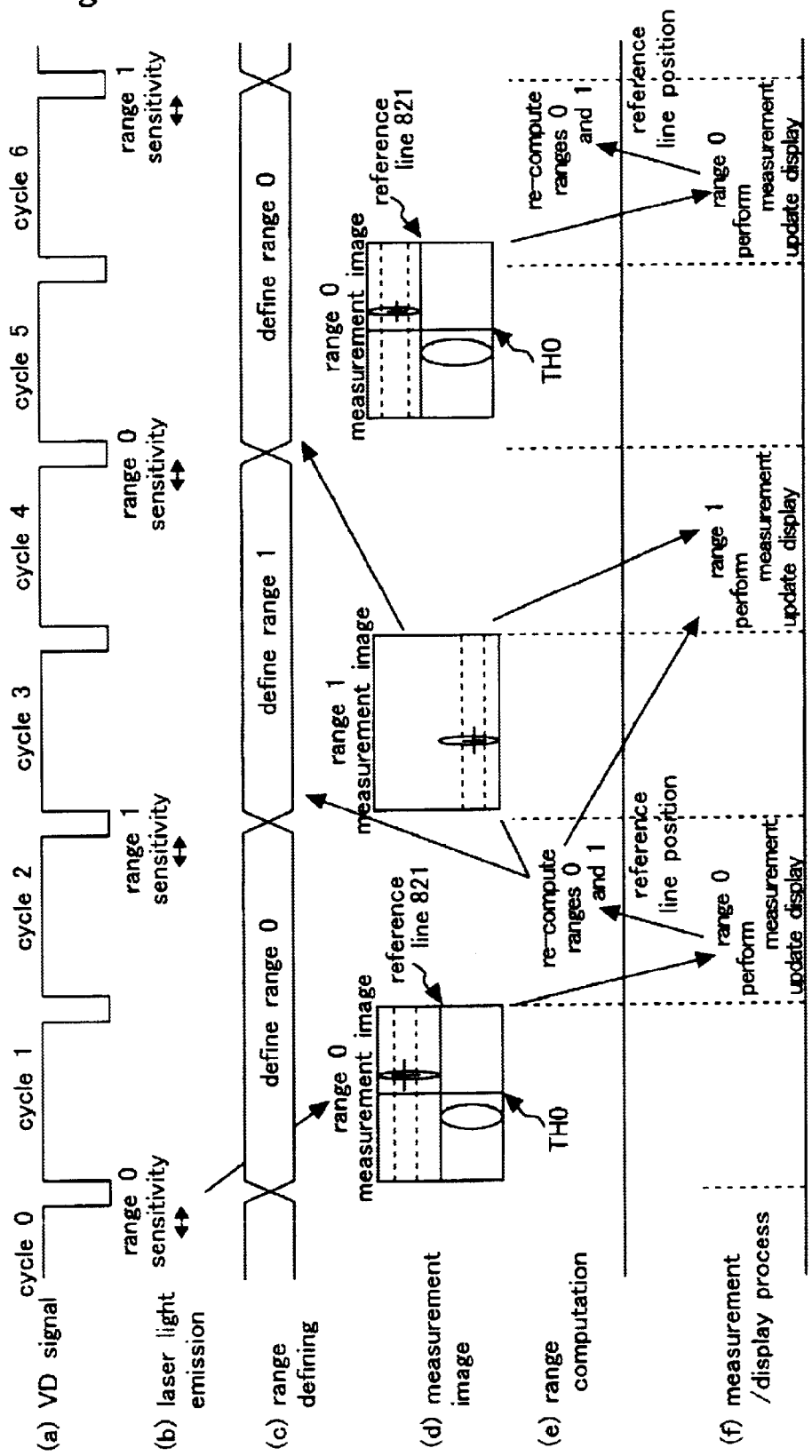
FIG. 31 is a time chart showing the flow of the control process of tracking a lateral shift when measuring a step.

FIG. 30 illustrates the lateral shift tracking control in the step measurement, and the time chart shown in FIG. 31 illustrates the flow of this control.

When the position of the step has moved laterally line the length of the line beam 804, a threshold value TH0 is defined for extracting a reference line 821 as a displacement value, and the reference line 821 is placed at an intersection 822 between the threshold value TH0 and a line 820 given as a measurement result of the entire scan lines in the measured image as shown in FIG. 30. A common edge detecting technology can be applied as the method for computing this reference line 821. Once this reference line is defined, by redefining the measurement object ranges 0 and 1 on either side of the reference line 821 so as to be spaced therefrom by delta Y, the shifting of the measurement object ranges 0 and 1 can be matched with the shifting of the measurement object 821, and the measurement object ranges 0 and 1 can be properly position on the lower and upper surfaces.

In other words, according to the present invention, when the measurement object 801 has moved in the line direction, the height of the measurement object is measured once again along the length of the line beam 804, and the position of the step 802 is determined as the position at which the measured height reaches the threshold level TH0 corresponding to a certain height. The measurement object ranges 0 and 1 are then re-defined on either side of the position of the step 802 appropriately spaced from the position of the step 802.

More specifically, referring to FIG. 31, the lighting of the laser and the sensitivity adjustment which is effected through the shutter time of the CCD and the gain control of the AGC amplifying circuit are controlled in a similar manner as the example described with reference to FIG. 25. The image captured by lighting the laser in cycle 0 is captured as a measurement image in cycle 1. A displacement measurement is performed on the range 0 measurement image as a measurement display process and the reference line 821 is computed according to the defined threshold value TH0 in cycle 2. As for the range computation, the expanse of ranges 0 and 1 are re-computed for the next measurement. Based on this re-computation, the profile display position for range 0 expanse and the range 1 expanse is changed in cycle 4 and cycle 5, respectively. In cycle 3 and 4, the range 1 measurement image is acquired according to range 1 expanse which was re-computed in cycle 2, and the measurement for range 1 is executed. Thereafter, re-computation and re-definition of ranges 0 and 1 are similarly repeated so that, even when the measurement object 801 has shifted in the line direction, ranges 0 and 1 would not cross the step 802, and are position appropriately and individually on the upper and lower surfaces, respectively.

The threshold value TH0 used for detecting the position of the reference line 821 may consist of a fixed value, but is more preferably variable so as to maintain the difference between the threshold value TH and the distance measurement value of either the upper or lower surface of the step (which is determined in advance as a reference surface) whereby the sensor is enabled to adapt itself to the shifting of the step position not only in the line direction but also in the distance direction of the reference surface (the overall vertical movement of the measurement object in which the step is formed).

According to the preferred embodiment of the present invention described above, within the field of view of the two-dimensional CCD, the measurement object range is defined in the direction of displacement measurement and a direction perpendicular thereto at an appropriate position and width, and by excluding masked portions from the measurement process, the influence of external light is removed. Not only the part included in the measurement object range is used for the measurement process but also the gradation thereof is automatically adjusted so that even when there is a large level difference between the line bright waveforms belong to a plurality of such measurement object ranges, by automatically adjusting their gradations in a time shared manner, the measurement point coordinate of each light image can be determined in a reliable manner. Therefore, according to the present invention, a significant practical improvement can be made when external light is present, when measuring a glass plate having metallic film formed over a surface, and when measuring a step defined between two surfaces having significantly different reflectivity.

Additionally, according to the present invention, because a plurality of measurement object ranges defined in the direction of displacement measurement or line direction can be moved in response to a change in the measurement value of either one of the ranges, the measurement object ranges can be kept accurately positioned on the desired positions on the measurement object even when the measurement object such as a glass plate has moved vertically during the process of measuring its thickness or when a step has moved laterally during the measurement of the step.

Figure 32:
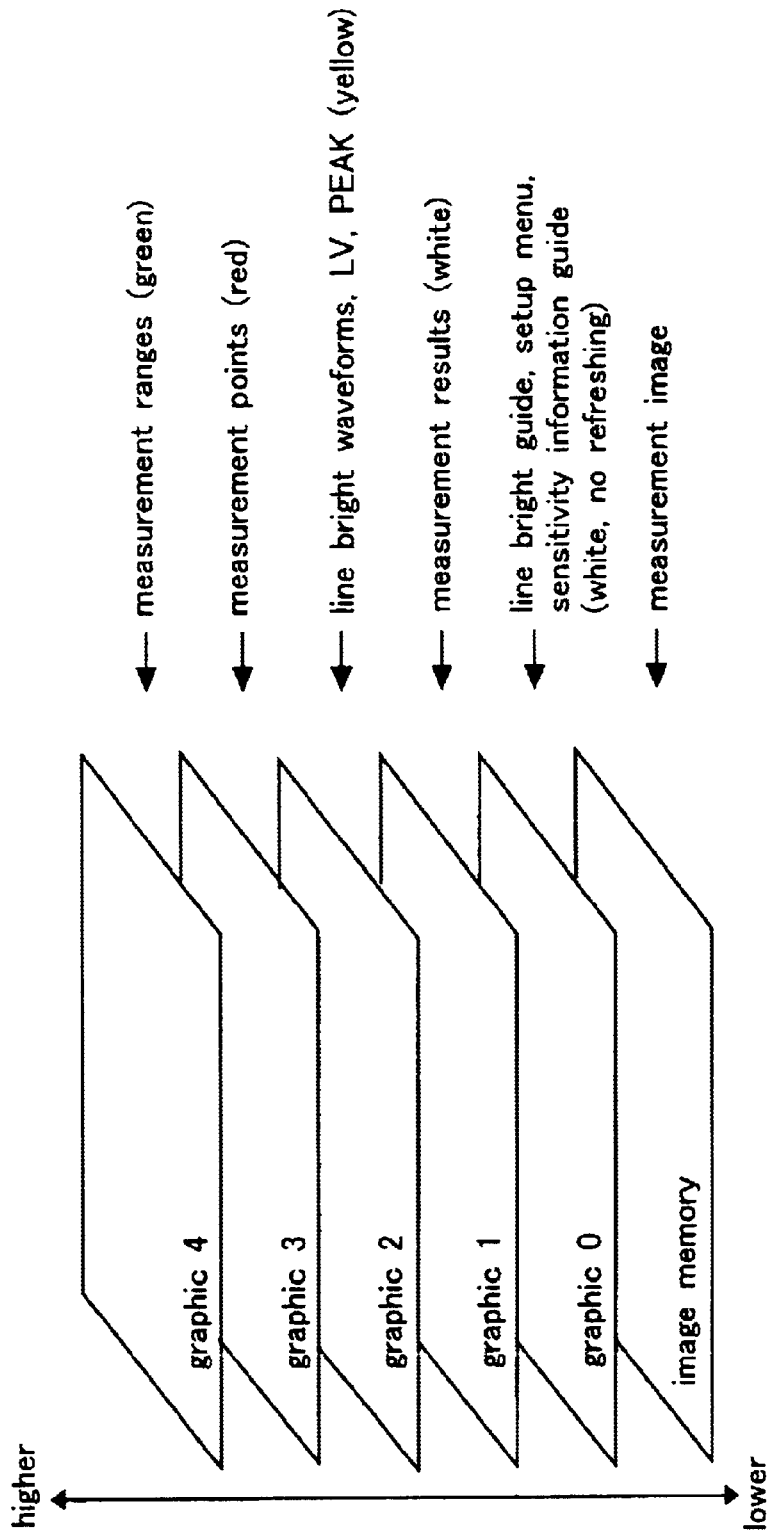
FIG. 32 is a view illustrating the process of composing a display for the image monitor (part 1)
Figure 33:
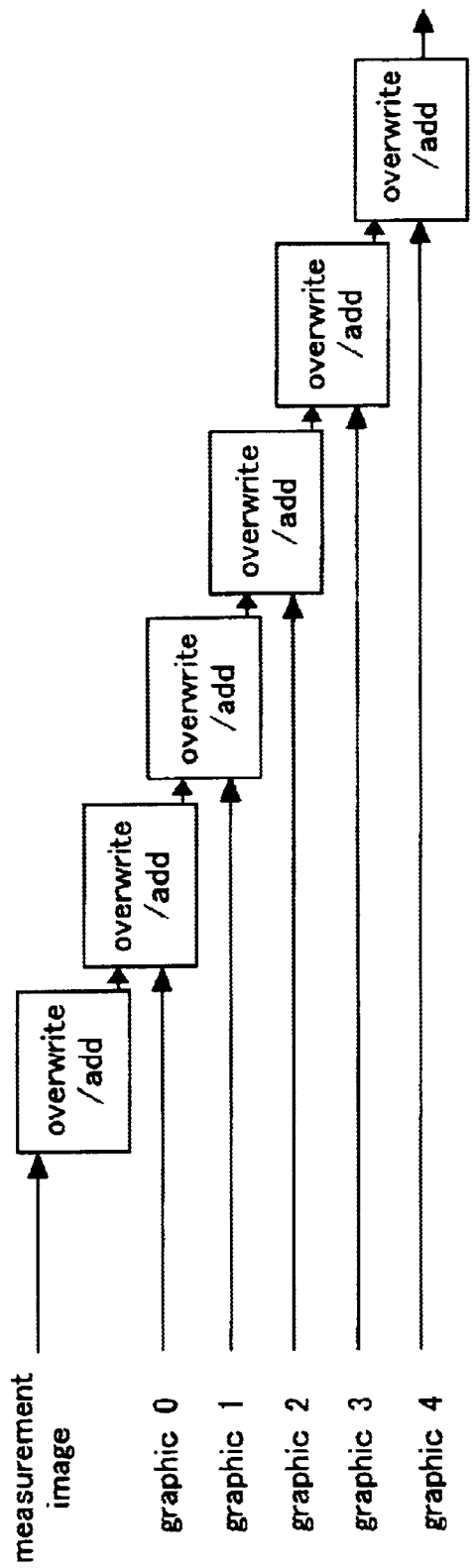
FIG. 33 is a view illustrating the process of composing a display for the image monitor (part 2)

The display composing process for the image monitor 6 is briefly described in the following with reference to FIGS. 32 and 33. The visual displacement sensor of this embodiment performs the image editing and display processes by using five layers of graphic memory (0 to 4) and one layer of image memory as shown in FIG. 32. Referring to FIG. 32, the image memory stores the measurement image as a background. The graphic memory (0 to 4) stores various graphic diagrams or graphic images. Specifically, graphic memory (0) stores a line bright waveform guide, a set up menu and a sensitivity information guide (white, no refreshing). Graphic memory (1) stores measurement results (white). Graphic memory (2) stores line bright waveforms, LV and PEAK (yellow). Graphic memory (3) stores a measurement point (red). Graphic memory (4) stores measurement ranges (green). The contents of the memory are overwritten one after another as shown in FIG. 33, and edited as the display image for the image monitor 6 and color displayed on the screen of the image monitor 6.

The measurement of the thickness of a glass plate was taken as an example in the foregoing description. In such a case, a calibration process for accounting for the refractive index of the glass would be required to be conducted in advance. Conventionally, a calibration process required a complex process, and the operator was required to accurately enter a numerical value corresponding to the refractive index of the transparent material of the measurement object according to a prescribed procedure, and this impaired the convenience of visual type displacement sensors of this kind.

The inventors have therefore proposed a displacement sensor which allows the calibration process to be conducted simply by means of an interactive interface.

Figure 35:
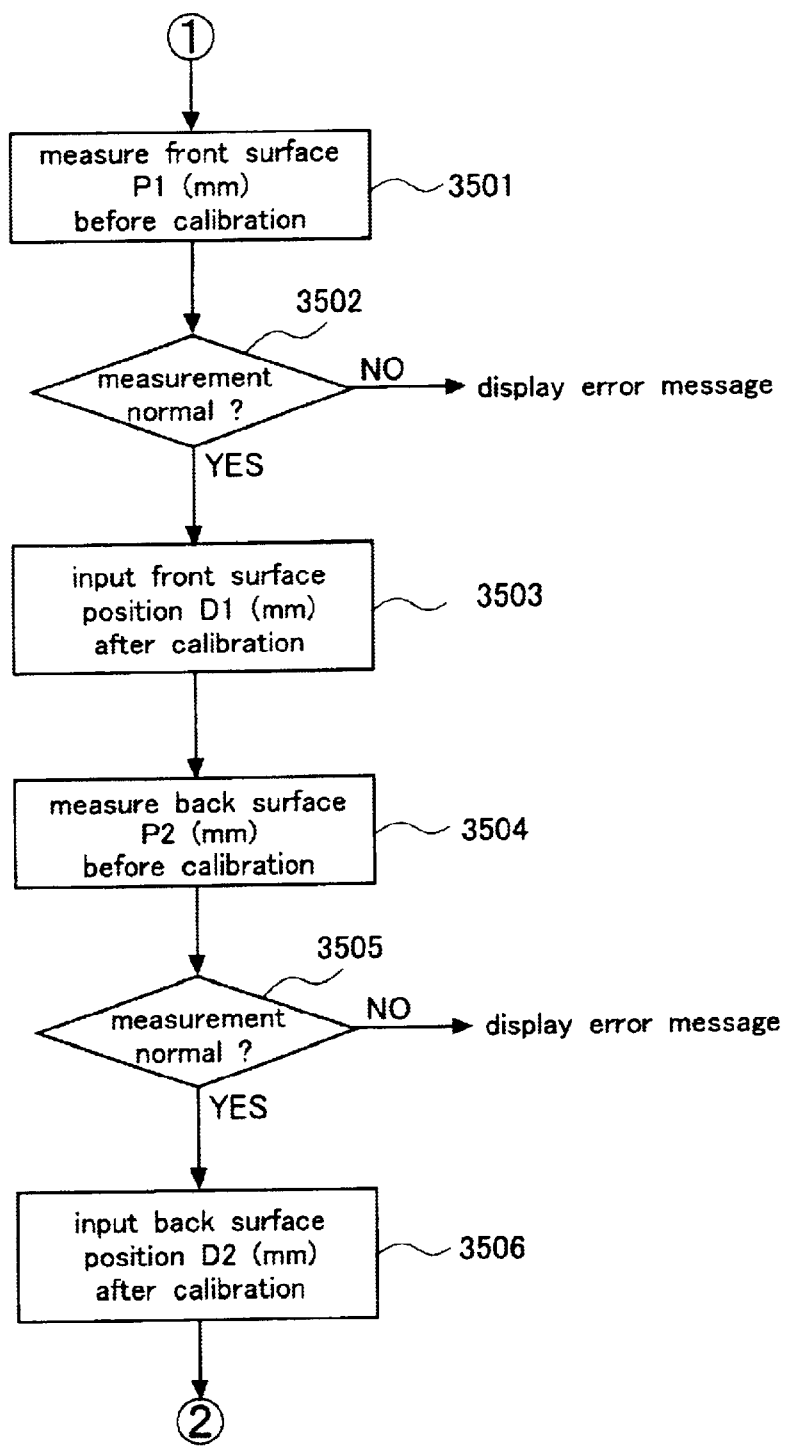
FIG. 35 is a flow chart showing the calibration process for the computation of the thickness of a transparent member (part 2)
Figure 36:
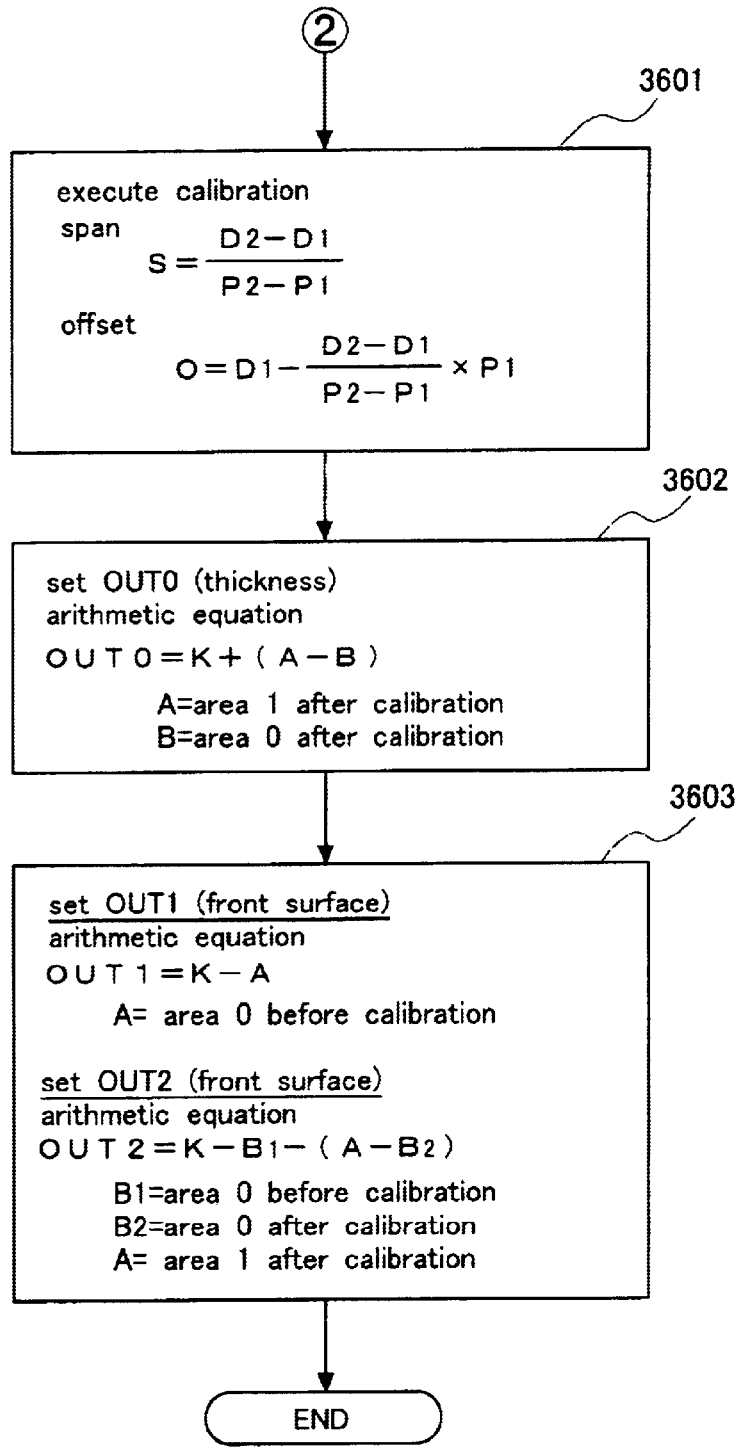
FIG. 36 is a flow chart showing the calibration process for the computation of the thickness of a transparent member (part 3)
Figure 37:
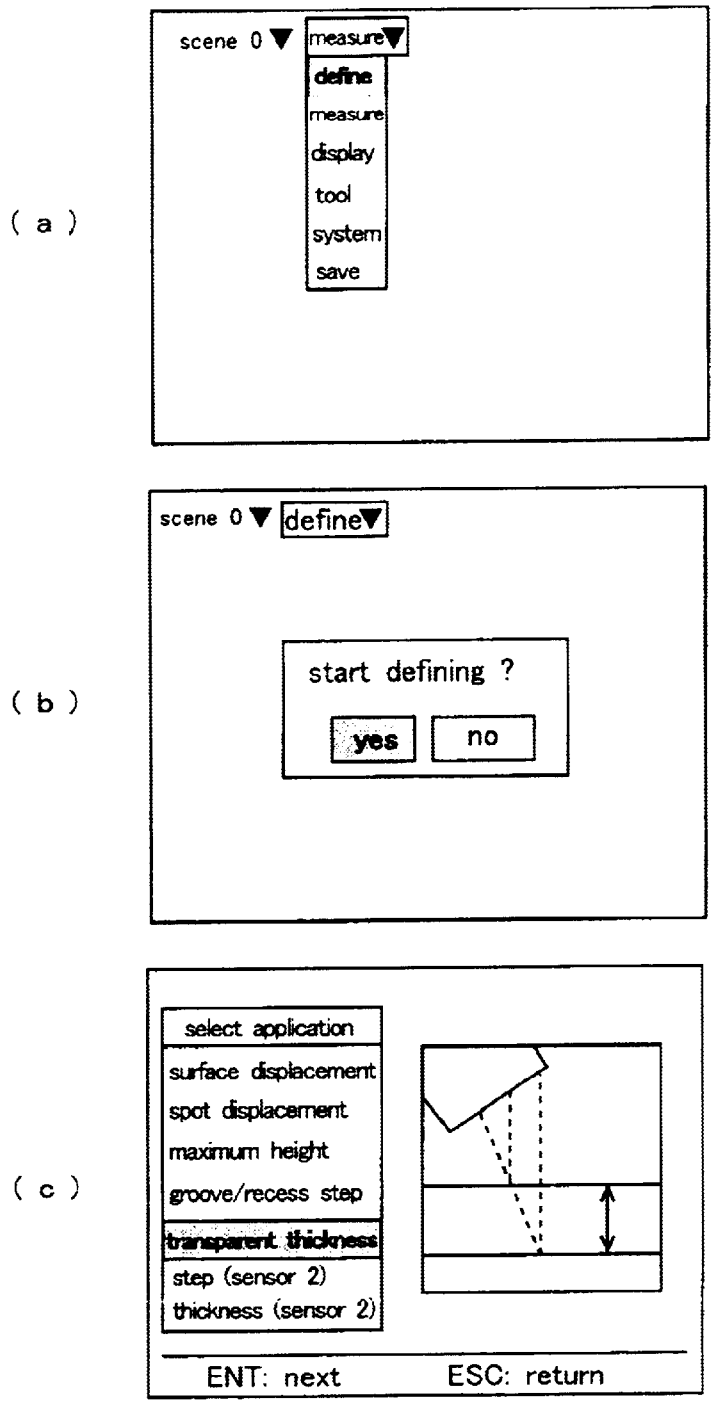
FIG. 37 is a view showing the monitor screen for the calibration operation for the computation of the thickness of a transparent member (part 1)
Figure 38:
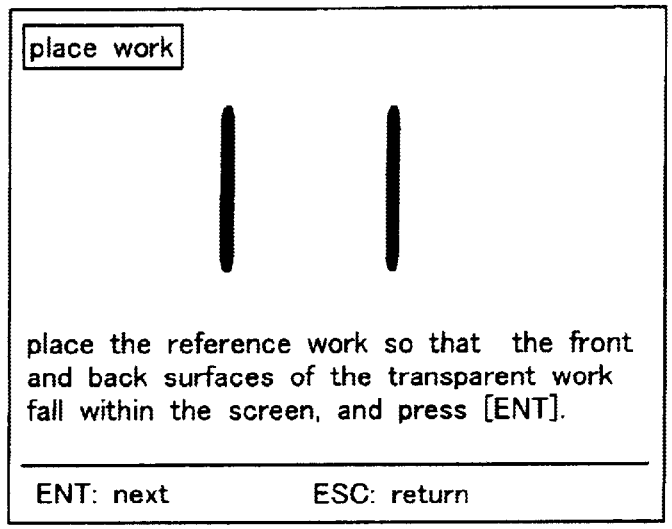
FIG. 38 is a view showing the monitor screen for the calibration operation for the computation of the thickness of a transparent member (part 2)
Figure 38:
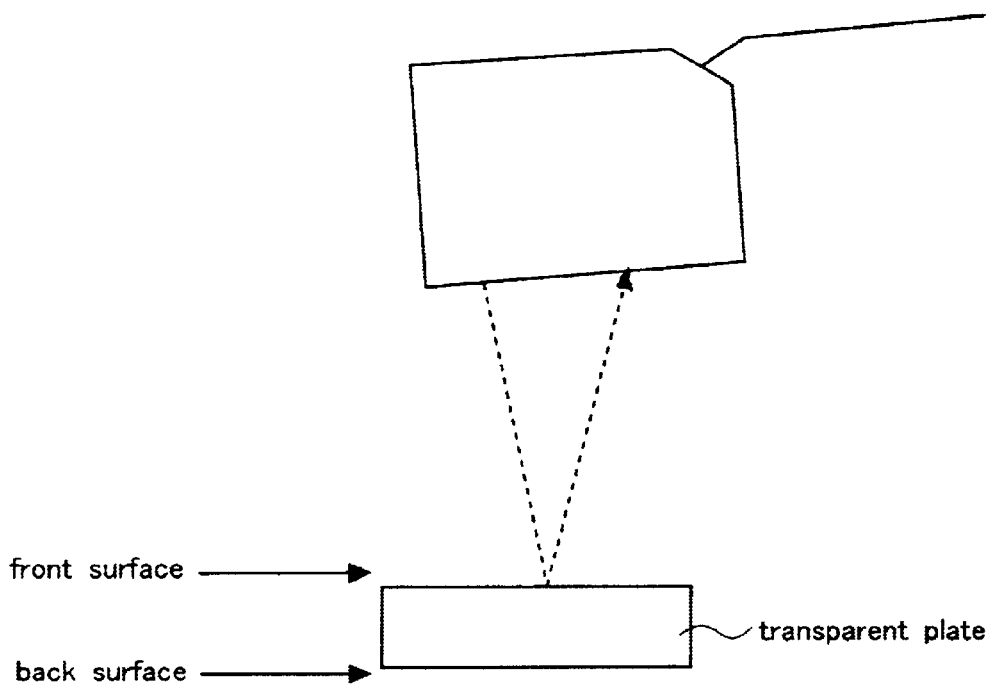
Figure 39:
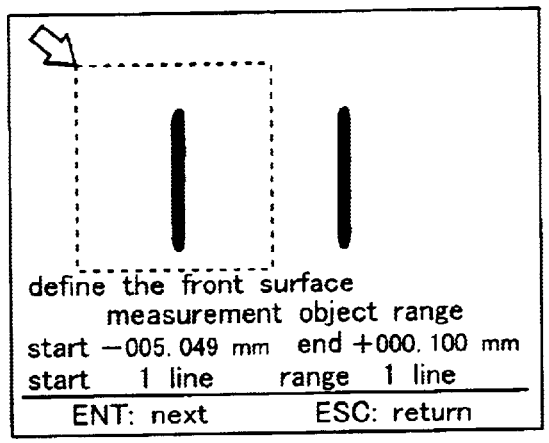
FIG. 39 is a view showing the monitor screen for the calibration operation for the computation of the thickness of a transparent member (part 3)
Figure 39:
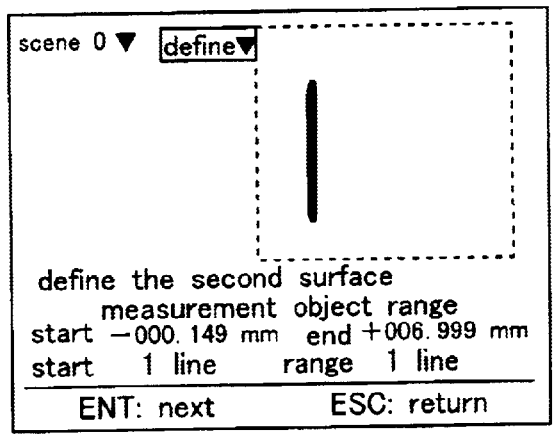
Figure 39:
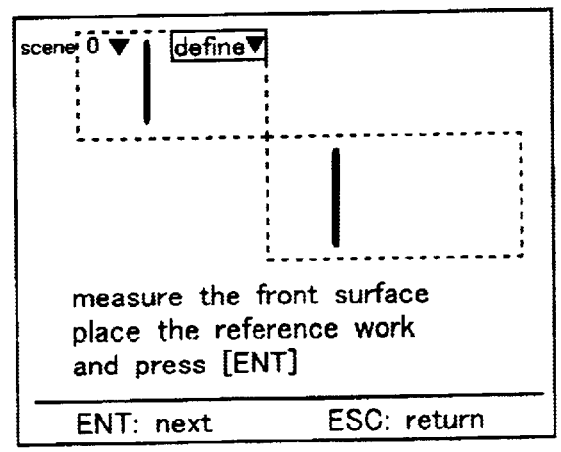
Figure 40:
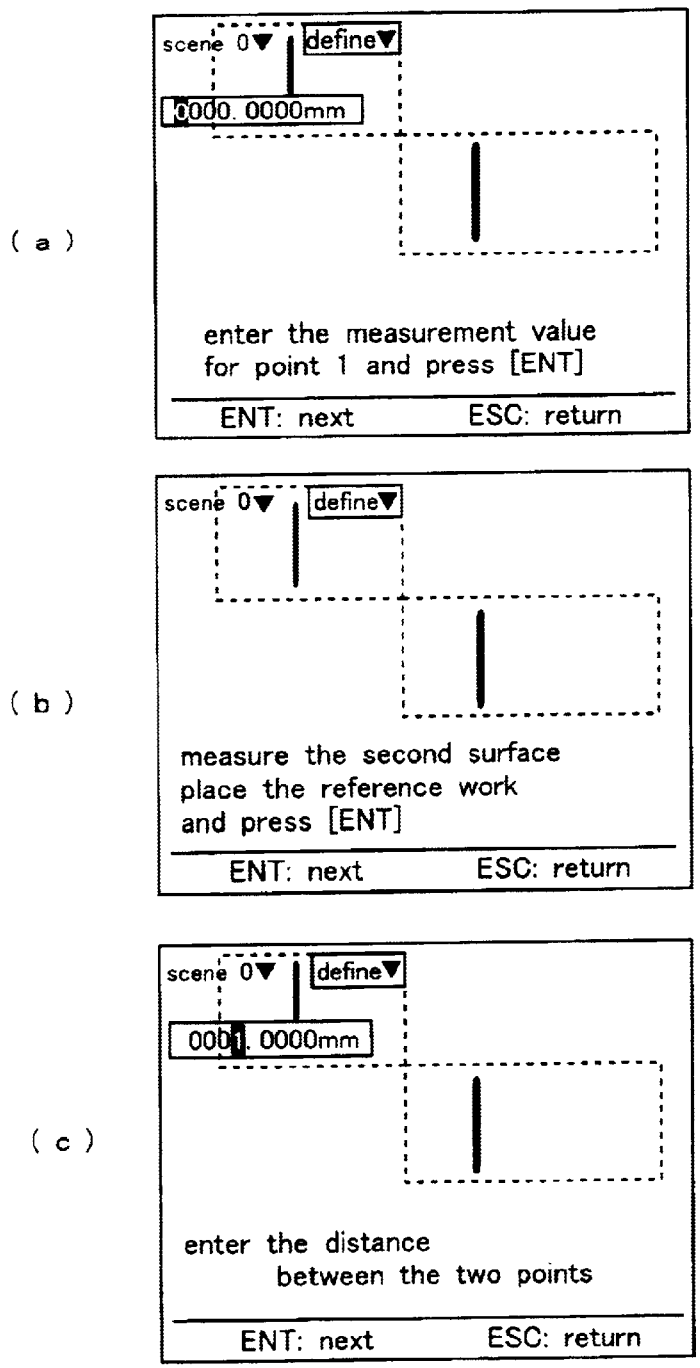
FIG. 40 is a view showing the monitor screen for the calibration operation for the computation of the thickness of a transparent member (part 4)
Figure 41:
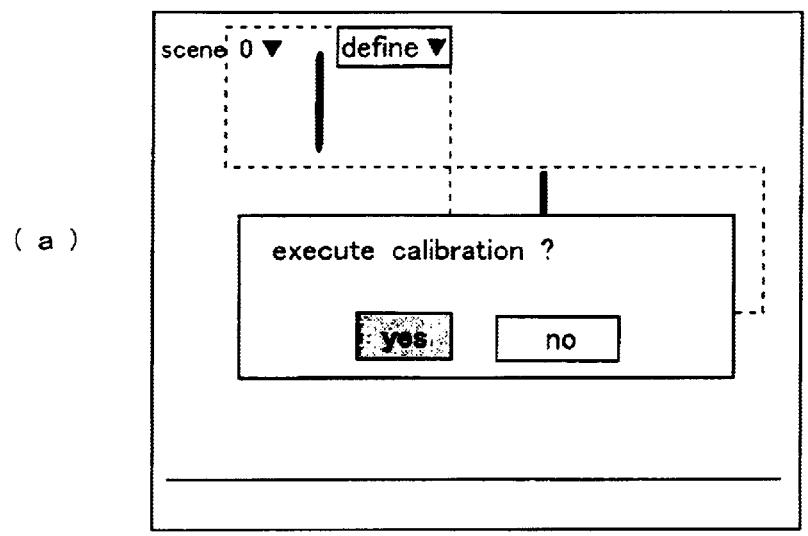
FIG. 41 is a view showing the monitor screen for the calibration operation for the computation of the thickness of a transparent member (part 5)
Figure 41:
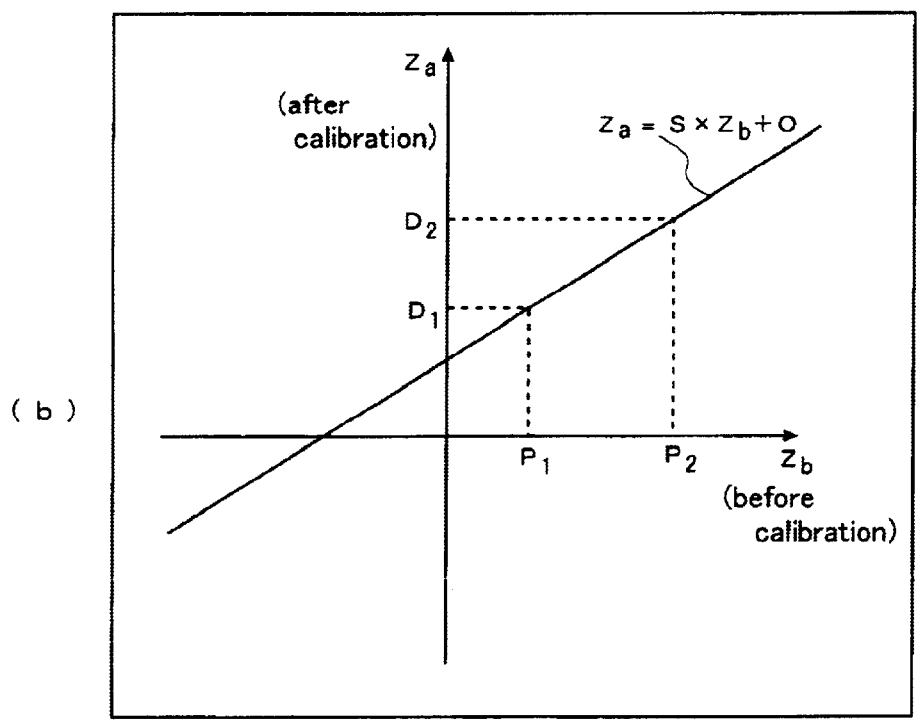
Figure 42:
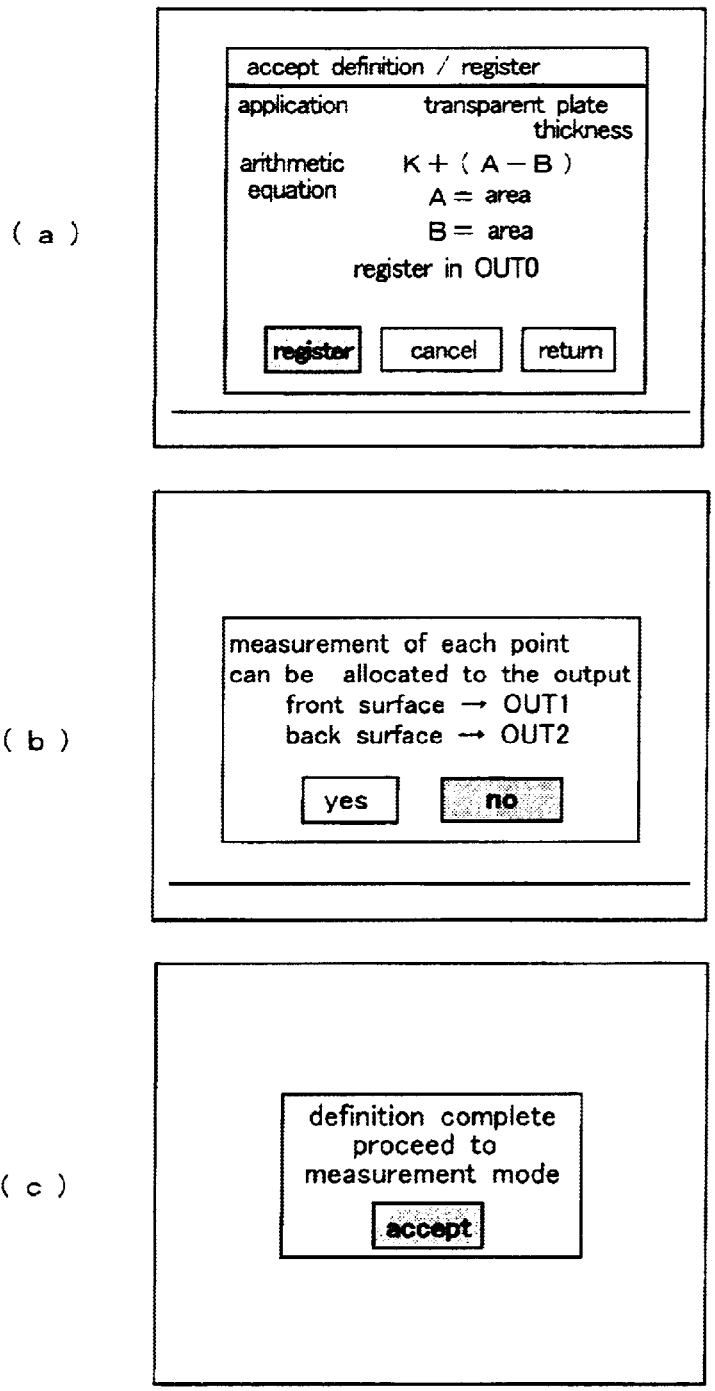
FIG. 42 is a view showing the monitor screen for the calibration operation for the computation of the thickness of a transparent member (part 6)

The calibration process for the computation of the thickness of a transparent member is systematically described in the following with reference to the flow charts shown in FIGS. 34 to 36, and the schematic views shown in FIGS. 37 to 43.

The reason for requiring the calibration process in the measurement of the thickness of a transparent member by using a visual type displacement sensor is briefly described in the following with reference to FIG. 44.

As shown in the drawing, when a measurement light consisting of a laser beam is incident upon a transparent plate, the laser beam incident to the surface is refracted in dependence on the refractive index of the material of the transparent plate. Therefore, there is a difference between the actual back surface and the apparent back surface. In a visual type displacement sensor, such a different turns into an error in the measurement point coordinate on the two-dimensional imaging device, and the thickness of the transparent member can be measured with any accuracy only when a certain corrective measure is taken.

Figure 43:
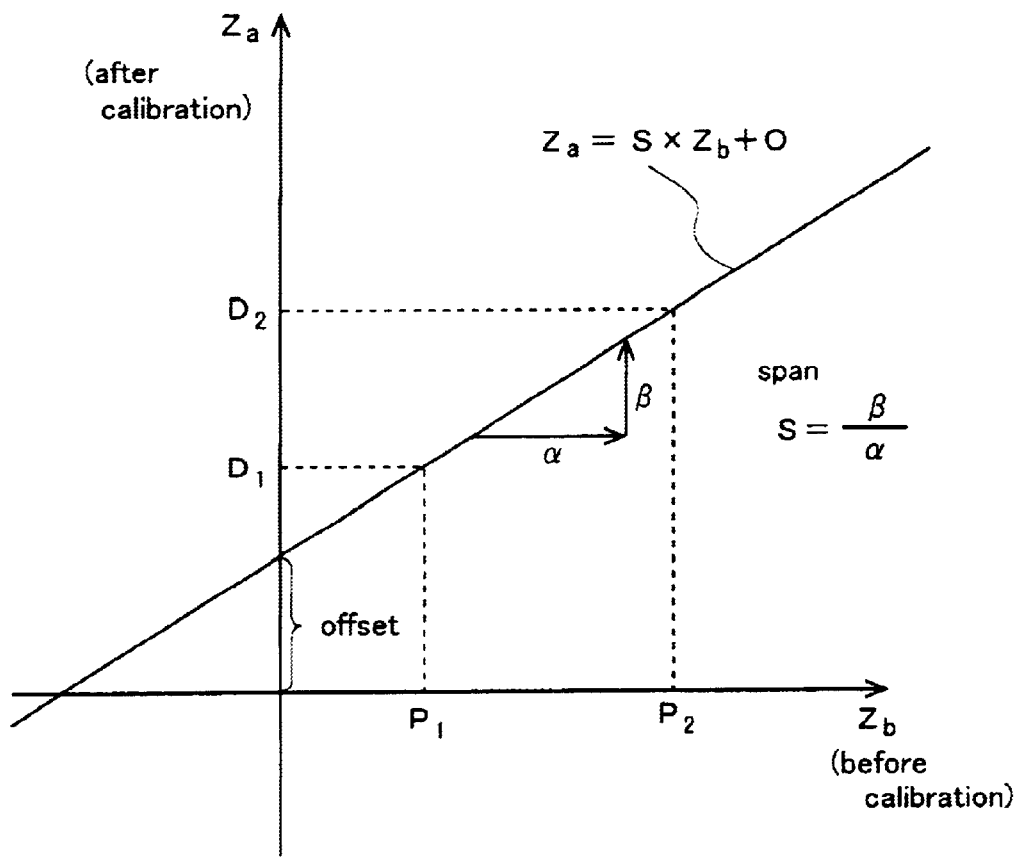
FIG. 43 is a view showing the algorithm for the calibration operation for the computation of the thickness of a transparent member.

FIG. 43 shows a diagram illustrating the algorithm for the calibration in the computation for measuring the thickness of a transparent member. As shown in the drawing, if the measurement displacements before calibration are assumed as P1 and P2, the displacement of the front and back surfaces of the transparent member after calibration are D1 and D2. In other words, to find the actual thickness D2-D1 from the apparent thickness P2-P1, it is necessary to make the span S and offset 0 known to the system.

Figure 34:
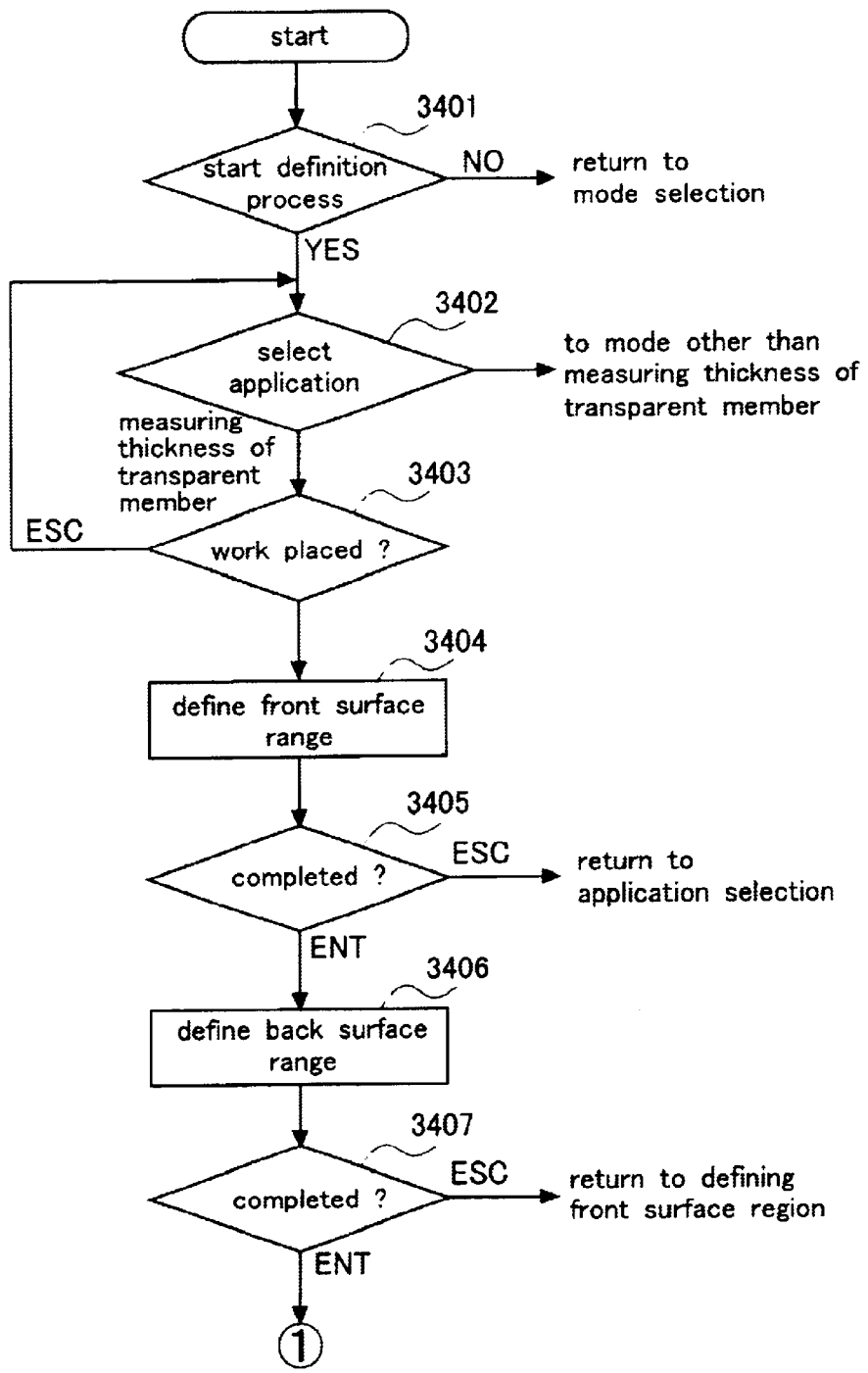
FIG. 34 is a flow chart showing the calibration process for the computation of the thickness of a transparent member (part 1)

Once the process illustrated in FIG. 34 is started based on such an assumption, the state for waiting the definition process is produced (step 3401). When a prescribed procedure is conducted for starting the definition process under this condition (yes in step 3401), the state for waiting the selection of an application is produced (step 3402). When an application is selected by following a prescribed procedure (thickness measurement of a transparent member in step 3402), the state for waiting the completion of the placement of a work piece is produced (step 3403). (See FIGS. 37 and 38)

Then, a transparent member serving as a reference is placed, the surface is designated (step 3404), completion of the designation step is indicated (step 3405), the back surface is designated (step 3406), completion of the designation step is indicated (ENT in step 3407), and the measurement of the surface P1 (mm) is conducted (prior to calibration) (step 3501).

When this measurement step is completed in a normal manner (yes in step 3502), the input of the surface position D1 (mm) (following calibration) and the input of the back surface P2 (mm) (prior to calibration) are executed (steps 3503 and 3504). When these measurement steps are completed in a normal manner (yes in step 3505), the input of the back surface position D2 (mm) (following calibration) is executed, and the program flow proceeds to the process shown in FIG. 36 including the steps of executing the calibration (step 3601), setting OUT0 (thickness) (step 3602), and setting OUT1 (front surface of the glass plate) and OUT2 (front surface of the glass plate) (step 3603). (See FIGS. 39 to 42)

Thus, the operator is enabled to execute the calibration process that is required for measuring the thickness of a transparent member easily without requiring any special knowledge or skill.

INDUSTRIAL APPLICABILITY

As can be appreciated from the foregoing description, according to the present invention, even when a spurious reflective line beam image appears within the field of view of the two-dimensional imaging device due to an improper measurement condition such as external light, and the number of measurement point coordinates exceeds an expected number, a desired displacement can be brought back into a measurable state by using a displacement measurement algorithm incorporated in the sensor simply by the operator defining a measurement object range so as to exclude the light image due to the external light.

According to the present invention, even when it has become impossible to contain the gradation level of the reflected line beam light image which appears in the field of view of the two-dimensional imaging device as two mutually separated lines in the direction of displacement measurement within a prescribed range over the entire reflected line beam light image, in spite of the operation of the automatic gradation adjustment function, in such a case as when the measurement object consists of a transparent plate having metallic film having a high reflectivity level formed over its back surface as is the case with the glass plate of a CRT or an LCD panel, simply by the operator defining measurement object ranges independently for the individual reflected line beam light images, the measurement point coordinate can be determined even with respect to the part of the reflected line beam light image having a gradation level falling out of the prescribed range by using a displacement measurement algorithm incorporated in the sensor, and a desired displacement can be brought back into a measurable state as a result.

According to the present invention, even when it has become impossible to contain the gradation level of the reflected line beam light image which appears in the field of view of the two-dimensional imaging device as two mutually separated lines in the direction perpendicular to the direction of displacement measurement within a prescribed range over the entire reflected line beam light image, in spite of the operation of the automatic gradation adjustment function, in such a case as when the measurement object consisting of a step is measured by impinging a line beam across the step and there is a large difference in reflectivity between the upper and lower surfaces of the step, simply by the operator defining measurement object ranges separately for the upper and lower surfaces of the step, the measurement point coordinate can be determined even with respect to the part of the reflected line beam light image having a gradation level falling out of the prescribed range by using a displacement measurement algorithm incorporated in the sensor, and a desired displacement can be brought back into a measurable state as a result.

According to the present invention, even when the measurement object such as a glass plate has moved vertically during the process of measuring its thickness or when a step has moved laterally during the measurement of the step, the measurement object ranges can be made to follow such movements, and the measurement is enabled at all times.

According to the present invention, there is provided a visual displacement sensor which can notify the operator the cause in an accurate manner through guide display even when the measurement is rendered impossible due to various reasons such as the presence of external light, the difference in reflectivity between the front and back surfaces of a transparent member, and the difference in reflectivity between the upper and lower surfaces of a step.

What is claimed is:

1. A visual displacement sensor, comprising:
    a light emitting device for impinging a line beam onto an object to be measured at a prescribed angle;
    a two-dimensional imaging device for capturing an image of the object to be measured, on which the line beam is impinged, from a different angle;
    measurement object range defining means for defining one or more than one measurement object range within a field of view of the two-dimensional imaging device;
    measurement point coordinate determining means for determining one or more than one measurement point coordinate contained in the defined measurement object range according to the image captured by the two-dimensional imaging device; and
    displacement measuring means for measuring a desired displacement according to the determined one or more than one measurement point coordinate.

2. A visual displacement sensor according to claim 1, wherein the one or more than one measurement object range is defined by the measurement object range defining means with respect to a position and length in a direction of displacement measurement in the field of view of the two-dimensional imaging device.

3. A visual displacement sensor according to claim 1, wherein the one or more than one measurement object range is defined by the measurement object range defining means with respect to a position and length in a direction perpendicular to a direction of displacement measurement in the field of view of the two-dimensional imaging device.

4. A visual displacement sensor according to claim 1, wherein the one or more than one measurement object range is defined by the measurement object range defining means with respect to a position and length both in a direction of displacement measurement and a direction perpendicular to a direction of displacement measurement in the field of view of the two-dimensional imaging device.

5. A visual displacement sensor according to claim 1, wherein the measurement point coordinate determining means determines one or more than one measurement point according to an image extracted from the image captured by the two-dimensional imaging device by masking the area other than the defined one or more than one measurement object range.

6. A visual displacement sensor according to claim 1, wherein the measurement point coordinate determining means provisionally determines one or more than one measurement point according to an entire image captured by the two-dimensional imaging device, and finally determines one or more than one measurement point by comparing the provisionally determined one or more than one measurement point with a counterpart in the defined one or more than one measurement object range.

7. A visual displacement sensor according to claim 1, further comprising monitor image editing means for displaying information on a state of a raw image captured by the two-dimensional imaging device on an image monitor screen.

8. A visual displacement sensor according to claim 7, wherein the information on a state of the raw image comprises the raw image itself and/or a line bright waveform corresponding to the raw image.

9. A visual displacement sensor according to claim 1, further comprising monitor image editing means for displaying information on a state of the masked image extracted from a raw image captured by the two-dimensional imaging device by masking a part thereof other than the defined measurement object range on an image monitor screen.

10. A visual displacement sensor according to claim 9, wherein the information on a state of the masked image comprises the masked image itself and/or a line bright waveform corresponding to the masked image.

11. A visual displacement sensor according to claim 1, further comprising monitor image editing means for displaying information corresponding to the measurement object range defined in the field of view of the two-dimensional imaging device on an image monitor screen.

12. A visual displacement sensor according to claim 11, wherein the information corresponding to the measurement object range comprises a boundary position and/or a value indicating a boundary of the measurement object range on a raw image captured by the two-dimensional imaging device or a masked image derived from the raw image.

13. A visual displacement sensor according to claim 1, further comprising monitor image editing means for displaying information corresponding to the measurement point coordinate determined in the field of view of the two-dimensional imaging device on an image monitor screen.

14. A visual displacement sensor according to claim 13, wherein the information corresponding to the measurement point coordinate comprises a value indicating a measurement point coordinate position and/or measurement point coordinate on the a raw image captured by the two-dimensional imaging device or a masked image derived from the raw image.

15. A visual displacement sensor according to claim 1, further comprising a graphical user interface (GUI) for enabling the defining, changing and canceling of the measurement object range in the field of view of the two-dimensional imaging device with an operation on an image monitor screen.

16. A visual displacement sensor, comprising:
    a light emitting device for impinging a tine beam onto an object to be measured at a prescribed angle;
    a two-dimensional imaging device for capturing an image of the object to be measured on which the line beam is impinged from a different angle, measurement object range defining means for defining more than one measurement object range having a designated position and length in the direction of displacement measurement within a field of view of the two-dimensional imaging device;

measurement point coordinate determining means having a gradation adjusting function for determining one or more than one measurement point coordinate contained in the defined measurement object range according to the image captured by the two-dimensional imaging device and adjusting at least one line beam light image gradation if the corresponding measurement object range contains one or more line beam light image; and displacement measuring means for measuring a desired displacement according to the determined one or more than one measurement point coordinate.

17. A visual displacement sensor according to claim 16, wherein the measurement point coordinate determining means having a gradation adjusting function comprises:

masked image generating means for generating a masked image by masking the part of a raw image captured by the two-dimensional imaging device other than the defined measurement object range; and measurement point coordinate determining means for adjusting the light image gradation of the at least one line beam light image to a value suitable for measurement and determining a measurement point coordinate by changing an image capturing condition of the two-dimensional imaging device when the corresponding masked image contains at least one line beam light image.

18. A visual displacement sensor according to claim 16, wherein the measurement point coordinate determining means having a gradation adjusting function comprises:

provisional measurement point coordinate determining means for adjusting the light image gradation of the at least one line beam light image to a value suitable for measurement provisionally and determining a measurement point coordinate by changing an image capturing condition of the two-dimensional imaging device when a raw image captured by the two-dimensional imaging device contains at least one line beam light image; and final measurement point coordinate determining means for finally determining a measurement point coordinate by comparing the provisionally determined measurement point coordinate with the defined measurement object range.

19. A visual displacement sensor according to claim 16, further comprising monitor image editing means for displaying information corresponding to a state of a raw image captured by the two-dimensional imaging device on an image monitor screen.

20. A visual displacement sensor according to claim 19, wherein the information on a state of the raw image comprises the raw image itself and/or a line bright waveform corresponding to the raw image.

21. A visual displacement sensor according to claim 17, further comprising monitor image editing means for displaying information on a state of the masked image extracted from the raw image captured by the two-dimensional imaging device by masking a part thereof other than the defined measurement object range on an image monitor screen, to form a masked image.

22. A visual displacement sensor according to claim 21, wherein the information on a state of the masked image comprises the masked image itself and/or a line bright waveform corresponding to the masked image.

23. A visual displacement sensor according to claim 16, further comprising monitor image editing means for displaying information corresponding to the measurement object range defined in the field of view of the two-dimensional imaging device on the image monitor screen.

24. A visual displacement sensor according to claim 23, wherein the information corresponding to the measurement object range comprises a boundary position and/or a value indicating a boundary of the measurement object range on a raw image captured by the two-dimensional imaging device or a masked image derived from the raw image.

25. A visual displacement sensor according to claim 16, further comprising monitor image editing means for displaying information corresponding to the measurement point coordinate determined in the field of view of the two-dimensional imaging device on an image monitor screen.

26. A visual displacement sensor according to claim 25, wherein the information corresponding to the measurement point coordinate comprises a value indicating a measurement point coordinate position and/or measurement point coordinate on a raw image captured by the two-dimensional imaging device or masked image derived from the raw image.

27. A visual displacement sensor according to claim 16, further comprising monitor image editing means for displaying information corresponding to an image capturing condition for each measurement object range used for determining a measurement point coordinate on an image monitor screen.

28. A visual displacement sensor according to claim 27, wherein the information corresponding to an image capturing condition comprises a value or graphic diagram indicating a sensitivity for image capturing.

29. A visual displacement sensor according to claim 16, further comprising a graphical user interface (GUI) for enabling the defining, changing and canceling of the measurement object range in the field of view of the two-dimensional imaging device with an operation on an image monitor screen.

30. A visual displacement sensor according to claim 16, further comprising a range automatic tracking means for tracking a change in a measurement displacement with respect to a reference surface of a measurement object and moving at least one measurement object range in a direction of displacement measurement direction.

31. A visual displacement sensor according to claim 30, wherein the range automatic tracking means is adapted to move a measurement object range containing a line beam image from a surface different from the reference surface of the measurement object.

32. A visual displacement sensor, comprising:

a light emitting device for impinging a line beam onto an object to be measured at a prescribed angle;

a two-dimensional imaging device for capturing an image of the object to be measured on which the line beam is impinged from a different angle;

measurement object range defining means for defining more than one measurement object range having a designated position and length in a direction perpendicular to the direction of displacement measurement within a field of view of the two-dimensional imaging device;

measurement point coordinate determining means having a gradation adjusting function for determining one or more than one measurement point coordinate contained in the defined measurement object range according to the image captured by the two-dimensional imaging device and adjusting at least one line beam light image gradation if the corresponding measurement object range contains one or more line beam light image; and displacement measuring means for measuring a desired displacement according to the determined one or more than one measurement point coordinate.

33. A visual displacement sensor according to claim 32, wherein the measurement point coordinate determining means having a gradation adjusting function comprises:

masked image generating means for generating a masked image by masking a part of a raw image captured by the two-dimensional imaging device other than the defined measurement object range; and measurement point coordinate determining means for adjusting the light image gradation of the at least one line beam light image to a value suitable for measurement and determining a measurement point coordinate by changing an image capturing condition of the two-dimensional imaging device when the corresponding masked image contains at least one line beam light image.

34. A visual displacement sensor according to claim 32, wherein the measurement point coordinate determining means having a gradation adjusting function comprises:

provisional measurement point coordinate determining means for adjusting the light image gradation of the at least one line beam light image to a value suitable for measurement and provisionally determining a measurement point coordinate by changing an image capturing condition of the two-dimensional imaging device when the raw image captured by the two-dimensional imaging device contains at least one line beam light image; and final measurement point coordinate determining means for finally determining a measurement point coordinate by comparing the provisionally determined measurement point coordinate with the defined measurement object range.

35. A visual displacement sensor according to claim 32, further comprising monitor image editing means for displaying information corresponding to a state of a raw image captured by the two-dimensional imaging device on an image monitor screen.

36. A visual displacement sensor according to claim 35, wherein the information on a state of the raw image comprises the raw image itself and/or a line bright waveform corresponding to the raw image.

37. A visual displacement sensor according to claim 33, further comprising monitor image editing means for displaying information on a state of the masked image extracted from the raw image captured by the two-dimensional imaging device by masking a part thereof other than the defined measurement object range on an image monitor screen.

38. A visual displacement sensor according to claim 37, wherein the information on a state of the masked image comprises the masked image itself and/or a line bright waveform corresponding to the masked image.

39. A visual displacement sensor according to claim 32, further comprising monitor image editing means for displaying information corresponding to the measurement object range defined in the field of view of the two-dimensional imaging device on an image monitor screen.

40. A visual displacement sensor according to claim 39, wherein the information corresponding to the measurement object range comprises a boundary position and/or a value indicating a boundary of the measurement object range on a raw image captured by the two-dimensional imaging device or a masked image derived from the raw image.

41. A visual displacement sensor according to claim 32, further comprising monitor image editing means for displaying information corresponding to the measurement point coordinate determined in the field of view of the two-dimensional imaging device on an image monitor screen.

42. A visual displacement sensor according to claim 41, wherein the information corresponding to the measurement point coordinate comprises a value indicating a measurement point coordinate position and/or measurement point coordinate on the raw image or masked image.

43. A visual displacement sensor according to claim 32, further comprising monitor image editing means for displaying information corresponding to an image capturing condition for each measurement object range used for determining a measurement point coordinate on an image monitor screen.

44. A visual displacement sensor according to claim 43, wherein the information corresponding to an image capturing condition comprises a value or graphic diagram indicating a sensitivity for image capturing.

45. A visual displacement sensor according to claim 32, further comprising a graphical user interface (GUI) for enabling the defining, changing and canceling of the measurement object range in the field of view of the two-dimensional imaging device with an operation on an image monitor screen.

46. A visual displacement sensor, comprising:

a light emitting device for impinging a line beam onto an object to be measured at a prescribed angle;

a two-dimensional imaging device for capturing an image of the object to be measured on which the line beam is impinged from a different angle;

measurement object range defining means for defining more than one measurement object range having a designated position and length in both the direction of displacement measurement and a direction perpendicular to the direction of displacement measurement with a two-dimensional expanse within a field of view of the two-dimensional imaging device;

measurement point coordinate determining means having a gradation adjusting function for determining one or more than one measurement point coordinate by taking into account the defined measurement object range according to the image captured by the two-dimensional imaging device and adjusting the gradation of each line beam light image; and displacement measuring means for measuring a desired displacement according to the determined one or more than one measurement point coordinate.

47. A visual displacement sensor according to claim 46, wherein the measurement point coordinate determining means having a range determining function comprises:

masked image generating means for generating a masked image by masking a part of a raw image captured by the two-dimensional imaging device other than the defined measurement object range; and measurement point coordinate determining means for adjusting the light image gradation of the at least one line beam light image to a value suitable for measurement and determining a measurement point coordinate by changing the image capturing condition of the two-dimensional imaging device for each line beam light image in the masked image.

48. A visual displacement sensor according to claim 46, wherein the measurement point coordinate determining means having a range determining function comprises:

provisional measurement point coordinate determining means for adjusting the light image gradation of the at least one line beam light image to a value suitable for measurement and provisionally determining a measurement point coordinate by changing an image capturing condition of the two-dimensional imaging device for each line beam image contained in the raw image captured by the two-dimensional imaging device; and final measurement point coordinate determining means for finally determining a measurement point coordinate by comparing the provisionally determined measurement point coordinate with the defined measurement object range.

49. A visual displacement sensor according to claim 46, further comprising monitor image editing means for displaying information corresponding to a state of a raw image captured by the two-dimensional imaging device on an image monitor screen.

50. A visual displacement sensor according to claim 49, wherein the information on a state of the raw image comprises the raw image itself and/or a line bright waveform corresponding to the raw image.

51. A visual displacement sensor according to claim 47, further comprising monitor image editing means for displaying information on a state of the masked image extracted from the raw image captured by the two-dimensional imaging device by masking a part thereof other than the defined measurement object range on an image monitor screen.

52. A visual displacement sensor according to claim 51, wherein the information on a state of the masked image comprises the masked image itself and/or a line bright waveform corresponding to the masked image.

53. A visual displacement sensor according to claim 46, further comprising monitor image editing means for displaying information corresponding to the measurement object range defined in the field of view of the two-dimensional imaging device on an image monitor screen.

54. A visual displacement sensor according to claim 53, wherein the information corresponding to the measurement object range comprises a boundary position and/or a value indicating a boundary of the measurement object range on a raw image captured by the two-dimensional imaging device or a masked image derived from the raw image.

55. A visual displacement sensor according to claim 46, further comprising monitor image editing means for displaying information corresponding to the measurement point coordinate determined in the field of view of the two-dimensional imaging device on the image monitor screen.

56. A visual displacement sensor according to claim 55, wherein the information corresponding to the measurement point coordinate consists of a value indicating a measurement point coordinate position and/or measurement point coordinate on the raw image or masked image.

57. A visual displacement sensor according to claim 46, further comprising monitor image editing means for displaying information corresponding to an image capturing condition for each measurement object range used for determining a measurement point coordinate on an image monitor screen.

58. A visual displacement sensor according to claim 57, wherein the information corresponding to an image capturing condition comprises a value or graphic diagram indicating a sensitivity for image capturing.

59. A visual displacement sensor according to claim 46, further comprising a graphical user interface (GUI) for enabling the defining, changing and canceling of the measurement object range in the field of view of the two-dimensional imaging device with an operation on an image monitor screen.

60. A visual displacement sensor, comprising:

a light emitting device for impinging a line beam onto an object to be measured at a prescribed angle;

a two-dimensional imaging device for capturing an image of the object to be measured, on which the line beam is impinged, from a different angle;

measurement object range defining means for defining one or more than one measurement object range within a field of view of the two-dimensional imaging device;

measurement point coordinate determining means for determining one or more than one measurement point coordinate contained in the defined measurement object range according to the image captured by the two-dimensional imaging device;

displacement measuring means for measuring a desired displacement according to the determined one or more than one measurement point coordinate; and defined range moving means for moving at least one of the one or more than one measurement object range that are defined according to information derived from the image captured by the two-dimensional imaging device.

61. A visual displacement sensor according to claim 60, wherein, when it is determined that a reference surface has moved according to the image captured by the two-dimensional imaging device, the defined range moving means moves the measurement object range corresponding to a surface which, with the reference surface forms a pair of surfaces in the direction of displacement measurement following the movement of the reference surface.

62. A visual displacement sensor according to claim 61, wherein the determination that the reference surface has moved is made in response to a change in the displacement measured by using the measurement object range defined in advance according to the reference surface.

63. A visual displacement sensor according to claim 60, wherein, when it is determined that a boundary line of a step on the measurement object has moved according to the image captured by the two-dimensional imaging device, the defined range moving means moves a pair of measurement object ranges which are respectively defined on either side of the step boundary line, in a direction perpendicular to the direction of displacement measurement following the movement of the step boundary line.

64. A visual displacement sensor according to claim 62, wherein the determination that the step boundary line has moved is made in response to a movement of an intersection between the measured displacement along the length of the line beam and a prescribed displacement threshold value in a direction perpendicular to the direction of displacement measurement.

65. A visual displacement sensor according to claim 64, wherein the prescribed displacement threshold value is defined so as to follow the measured value of the reference step surface forming the step.

* * * * *